US012562555B2

(12) United States Patent　　　　　　(10) Patent No.: US 12,562,555 B2
O'Connell et al.　　　　　　　　　　　　(45) Date of Patent: Feb. 24, 2026

(54) APPARATUS, SYSTEM AND METHOD FOR LIFTING AND MANIPULATING CONDUCTORS

(71) Applicant: Quanta Associates, L.P., Houston, TX (US)

(72) Inventors: Daniel Neil O'Connell, Burnaby (CA); Raymond Henry Jodoin, Burnaby (CA); Benjamin James Harvey, Burnaby (CA); John Christopher Green, Calgary (CA); Stanley Giang, Calgary (CA)

(73) Assignee: Quanta Associates, L.P., Houston, TX (US)

( * ) Notice: Subject to any disclaimer, the term of this patent is extended or adjusted under 35 U.S.C. 154(b) by 1224 days.

(21) Appl. No.: 17/200,440

(22) Filed: Mar. 12, 2021

(65) Prior Publication Data

US 2021/0305790 A1　　　Sep. 30, 2021

Related U.S. Application Data

(60) Provisional application No. 62/989,190, filed on Mar. 13, 2020.

(30) Foreign Application Priority Data

Mar. 12, 2020　(CA) ...................................... 3093662
Sep. 15, 2020　(CA) ...................................... 3093146

(51) Int. Cl.
H02G 1/04　　　　(2006.01)
B66C 1/68　　　　(2006.01)
(Continued)

(52) U.S. Cl.
CPC ................. H02G 1/04 (2013.01); B66C 1/68 (2013.01); B66C 23/66 (2013.01); B66C 23/18 (2013.01)

(58) Field of Classification Search
CPC .......... H02G 1/02; H02G 1/0416; H02G 7/00; H02G 7/05; H02G 7/053; B66F 11/044;
(Continued)

(56) References Cited

U.S. PATENT DOCUMENTS 2,264,685　A　　12/1941　Wells et al.
5,048,797　A　　9/1991　Theurer et al.
(Continued)

FOREIGN PATENT DOCUMENTS

CA　　　2772799　C　　7/2014
CN　　　1171862　A　　1/1998
(Continued)

OTHER PUBLICATIONS

Young, Lee, PCT International Search Report and Written Opinion of the International Searching Authority for PCT/US2021/022203, Jun. 9, 2021, 9 pages, Alexandria, United States of America.
(Continued)

*Primary Examiner* — Brian D Keller
*Assistant Examiner* — Alberto Saenz
(74) *Attorney, Agent, or Firm* — FINNEGAN, HENDERSON, FARABOW, GARRETT & DUNNER, LLP

(57) ABSTRACT

A system for lifting a sub-conductor bundle having a plurality of spaced-apart sub-conductors comprises a single point lifter base and an accessory mounted onto a free end of a support. The support is electrically insulated and comprises one or two tiers of elongate insulators extending away from the base. The base is for mounting the support onto a distal end of a boom. The accessory has at least one wire cage mounted on a cart, the cart mounted on an arcuate track and adapted for free translation along the inner side of the track between first and second ends of the track. The wire cage is in a first orientation when the cart is positioned at the (Continued)

first end of the track, and in a second orientation when the cart is positioned at the second end of the track, the first and second orientations perpendicular to one another.

19 Claims, 59 Drawing Sheets

(51) Int. Cl.
  *B66C 23/18* (2006.01)
  *B66C 23/66* (2006.01)
(58) Field of Classification Search
  CPC ......... B66F 11/046; B66C 1/68; B66C 23/18;
    B66C 23/66; G02B 6/4471
  USPC ................ 254/134.3 R; 248/68.1, 74.4, 74.1
  See application file for complete search history.

(56) References Cited

U.S. PATENT DOCUMENTS

| | | | |
|---|---|---|---|
| 5,952,609 | A | 9/1999 | Uremovic |
| 7,535,132 | B2 | 5/2009 | Devine et al. |
| 8,573,562 | B2 | 11/2013 | Devine et al. |
| 9,938,117 | B2 | 4/2018 | Fritel et al. |
| 2004/0135133 | A1 | 7/2004 | Fujii |
| 2007/0125596 | A1 | 6/2007 | Krejci |
| 2010/0133490 | A1 | 6/2010 | Devine et al. |
| 2011/0011987 | A1* | 1/2011 | Lessard .................... H02G 1/02 |
| | | | 248/49 |
| 2012/0175575 | A1* | 7/2012 | Devine .................... H02G 1/02 |
| | | | 254/134.3 PA |
| 2014/0138145 | A1 | 5/2014 | Argyle et al. |
| 2014/0209843 | A1 | 7/2014 | Devine et al. |
| 2014/0259649 | A1 | 9/2014 | Graham |
| 2015/0014050 | A1 | 1/2015 | Tufari |
| 2015/0325985 | A1 | 11/2015 | O'Connell et al. |
| 2015/0357802 | A1* | 12/2015 | Devine .................. B66C 23/68 |
| | | | 294/81.6 |

| | | | |
|---|---|---|---|
| 2019/0012352 | A1 | 1/2019 | Bhave et al. |
| 2019/0123525 | A1 | 4/2019 | O'Connell et al. |
| 2020/0350752 | A1 | 11/2020 | Yao et al. |

FOREIGN PATENT DOCUMENTS

| | | | |
|---|---|---|---|
| CN | 204333860 | U | 5/2015 |
| CO | 2016/0003877 | A | 3/2017 |
| DE | 102017130190 | A1 | 6/2019 |
| JP | 3557311 | B2 | 8/2004 |
| JP | 3973931 | B2 | 9/2007 |

OTHER PUBLICATIONS

Daniel Burwell, Canadian Intellectual Property Office Examination Report for Patent Application No. 3,170,631, Nov. 8, 2023, 3 pages, Canadian Intellectual Property Office, Canada.

Javier Jorge, Canadian Intellectual Property Office Examination Report for Patent Application No. 3,093,146, Nov. 9, 2023, 5 pages, Canadian Intellectual Property Office, Canada.

Javier Jorge, Canadian Intellectual Property Office Examination Report for Patent Application No. 3,093,662, Nov. 9, 2023, 5 pages, Canadian Intellectual Property Office, Canada.

Max Albert Mainhard Hidalgo, Notification Resolution of an Expert Opinion (New Law) on CL2022-02485, Mar. 5, 2024, 19 pages, Chile Patent Office, Santiago, Chile.

Max Albert Mainhard Hidalgo, Notification Resolution of the Expert's Reply (New Regulation) on CL2022-02485, Aug. 14, 2024, 23 pages, Chile Patent Office, Santiago, Chile.

Karine Hestroffer, Supplementary European Search Report for EP 21 76 6902, Mar. 18, 2024, 12 pages, European Patent Office, Munich, Germany.

Karine Hestroffer, Supplementary European Search Report for EP 21 76 7871, Oct. 24, 2023, 18 pages, European Patent Office, Munich, Germany.

Office Action for counterpart Colombian patent application No. NC2022/0012927, dated Sep. 15, 2025 (16 pages).

* cited by examiner

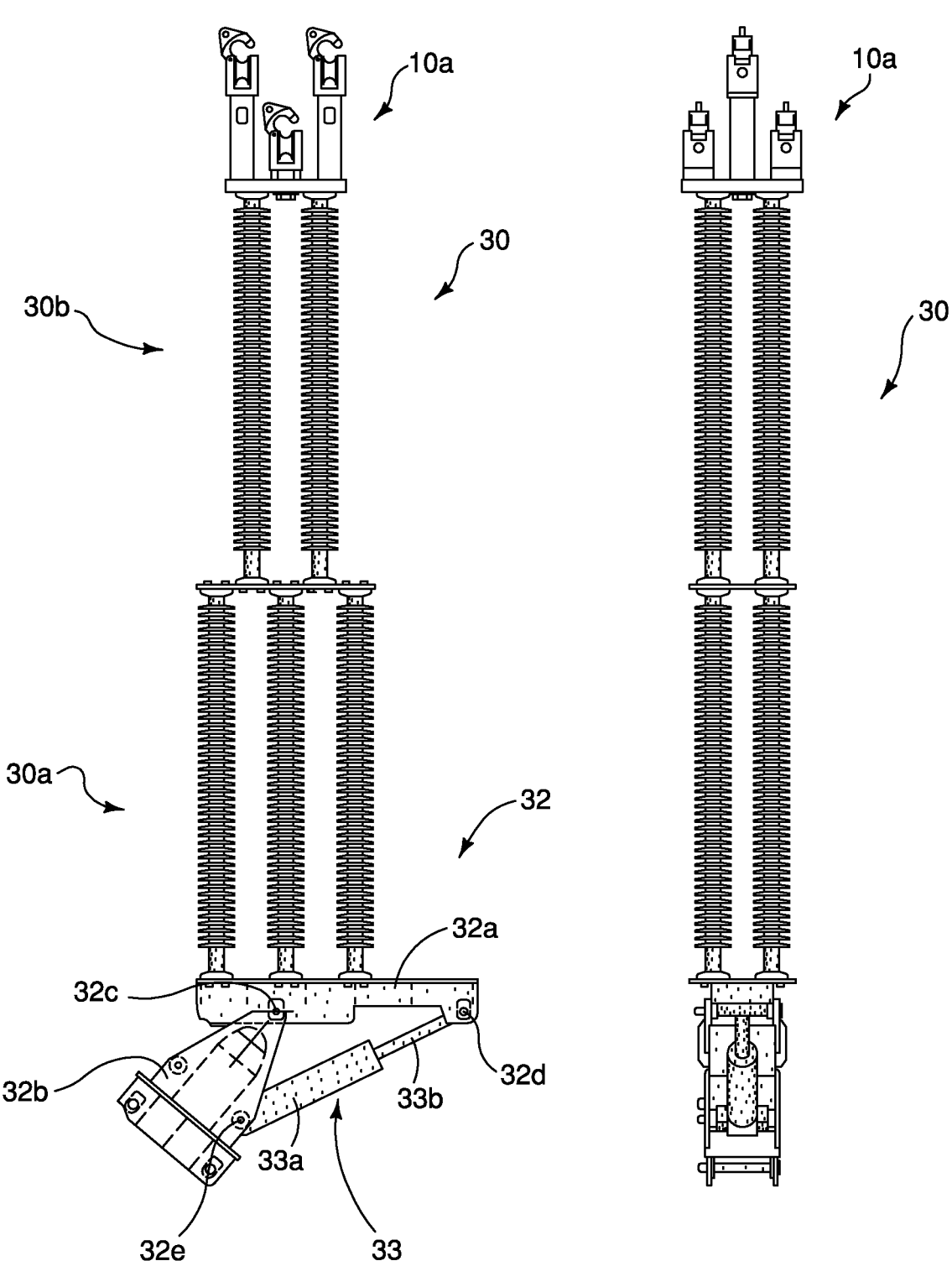
FIG. 30            FIG. 31

80

47←

84

47←

84c

80

82

84

84c

90a

90b

APPARATUS, SYSTEM AND METHOD FOR LIFTING AND MANIPULATING CONDUCTORS

CROSS-REFERENCE TO RELATED APPLICATIONS

This application claims priority to U.S. Provisional Patent Application No. 62/989,190 filed on Mar. 13, 2020, entitled "Method and Apparatus for Lifting and Manipulating Conductors", the entirety of which is incorporated herein by reference.

TECHNICAL FIELD

The present disclosure herein relates to the field of apparatuses, systems and methods for manipulating such conductors or sub-conductor bundles.

BACKGROUND

As described in Applicant's U.S. Pat. No. 8,573,562, high voltage transmission and distribution lines are typically strung between a series of spaced-apart support structures or poles. The conductors are connected to insulators mounted on poles or suspended from cross arms extending from the upper end of transmission or distribution poles, or to conductor support points built into transmission structures. Periodically, it is necessary to replace or repair the poles or structures, cross arms and insulators to maintain the electrical circuit in good working order. It is preferable if this maintenance and repair work can be performed without de-energizing the conductors, referred to as "hot line" work, in order to avoid, for example an interruption of service.

Hot line work is a potentially hazardous undertaking. Safety regulations require that linemen maintain a minimum work clearance or "limit of approach distance" from energized conductors. The limit of approach distance varies depending upon the voltage of the conductors. The higher the voltage, the larger the limit of approach distance required.

Auxiliary cross arms for temporarily lifting and supporting energized conductors from below are well known. Such cross arms are typically mounted onto the booms of crane or truck booms, or jibs of bucket trucks.

As also described in Applicant's U.S. Pat. No. 7,535,132, alternating current is generated in a three-phase configuration. Each of the three phases, commonly referred to as the A phase, B phase and C phase, have their own separate conductor, cable(s) or wire(s). Each separate, single conductor may, itself, also be referred to in the industry as a "phase." It is appreciated by one skilled in the art, that in some systems, multiple carry the power load for a particular phase. This may be done in instances when a load is greater than a single conductor can accommodate. In such cases the multiple (bundled) sub-conductors are often located adjacent to one another and may hang from the same insulator or insulators.

A manipulator for manipulating multiple sub-conductors in a single phase bundle is disclosed in the Applicant's U.S. Pat. No. 8,573,562. In particular, a manipulator for supporting and separating sub-conductors in an energized single phase bundle is described as including a rigid support member and first and second actuators mounted on the support member, wherein each actuator is independently actuable of the other. Insulators are mounted on each actuator. A selectively releasable coupler is mounted on each insulator for selectively releasable coupling of each insulator to a corresponding sub-conductor. The actuators extend corresponding insulators independently of one another from the support member to thereby separate from each other the distal ends of each insulator.

SUMMARY

Single Point Lifter Comprising Stacked Insulators

Lifting a conductor or bundle of sub-conductors during, for example, energized maintenance, often requires picking the conductor or bundle of sub-conductors for temporary relocation while maintaining the electrical insulation required for the high voltage in the conductor or bundle of sub-conductors. Typically, the higher the voltage, the longer the required length of the insulator supporting the conductor or sub-conductor bundle. However, for heavy conductors carrying high voltage, a very long insulator will typically not have the required strength to sufficiently resist bending while supporting the conductor or bundle of sub-conductors when the insulator is angled from the vertical or cantilevered, for example, such as occurs when the conductor has been lifted and then rotated so as to be moved laterally away from its original position to increase clearance for access by a lineman.

Applicant has discovered that, in some embodiments of a conductor lifter, a two-tier insulator stack having an upper tier of multiple insulators mounted on top of lower tier of multiple insulators, affords the required level of electrical insulation for high voltage live conductors and sub-conductor bundles while providing improved compression and bending strength so that the weight of the conductor or sub-conductors may be held and supported when the insulator stack is either vertical or cantilevered, or at least angled on the end of a crane or truck boom so as to be off-vertical. Thus for example, the lower or first tier of the two-tier insulator stack may have six individual parallel insulators of equal length and providing equal electrical insulation mounted on a base, for example in a 2×3 configuration, which insulators are equally spaced apart from one another on a rectangular base. A plate may be mounted across the upper ends of the insulators in the lower tier. The upper or second tier may have, for example, four individual parallel insulators of equal length and providing equal electrical insulation, which are mounted onto the plate, for example in a 2×2 configuration. The spacing between the insulators in the lower tier may be substantially the same spacing as between the insulators in the upper tier so that the footprint of the insulators in the upper tier is smaller than the footprint of the lower tier. The upper tier may advantageously be centred on the lower tier. This example is not intended to be limiting; other examples of configurations may include: four insulators on the bottom and two on the top; and two insulators on the bottom and one on the top. In some embodiments, the upper and lower tiers may have the same number of insulators; for example, four insulators on the upper tier and four insulators on the lower tier.

Other embodiments may include elongate insulators in each of the first or second tiers that are not parallel to each other. For example, some embodiments may include two or more insulators on the bottom tier that are angled towards one another, such that the spacing between each insulator at the bottom end of the first tier is greater than the spacing between each insulator at the top end of the tier. Similarly, two or more insulators on the upper tier of the insulator stack may be angled towards each other, such that the spacing between each insulator at the bottom end of the second tier is greater than the spacing between each insulator at the top end of the tier. The angled insulators in one or both tiers may be arranged to form a truss of insulators.

Rotating Head Conductor Lifter

A rotating head conductor lifter accessory, which is configured to hold and manipulate two or more sub-conductors of a conductor bundle, in one embodiment includes two conductor wire cages mounted onto a swivelling plate. The swivelling plate is mounted to a carriage block. The carriage block is slidably and rotatably mounted on a curved track. As used herein, "rotatably mounted" on the curved track means that the carriage is rotatably mounted on the curved track in the sense that the carriage block rotates about a center of curvature of the curved track, as will be appreciated from the detailed description below.

The rotating head conductor lifter may be mounted on the end of an electrically insulated, single-point lifter. Rotating both the insulators of the single point lifter and the rotating head conductor lifter accessory mounted thereon, while supporting a pair of sub-conductors in the two conductor wire cages of the accessory, moves the pair of sub-conductors while maintaining their original orientation, for example, a substantially horizontal or a substantially vertical orientation. The rotating head conductor lifter accessory enables the pair of sub-conductors to move along a travel arc corresponding to the arc of the curved track while supported on the carriage block, back and forth between the horizontal and vertical orientations of the single point lifter, while the sub-conductors remain in their original orientation relative to one another as the carriage moves along the travel arc. The sub-conductors thus also stay in the bottom of the conductor wire cages, thereby helping to retain the sub-conductors inside the conductor wire cages on the end of the single point lifter, as it is undesirable that the sub-conductors push against the releasable covers (also referred to herein as the doors or gates) that selectively secure the openings of the wire cages.

4

Figure 1:
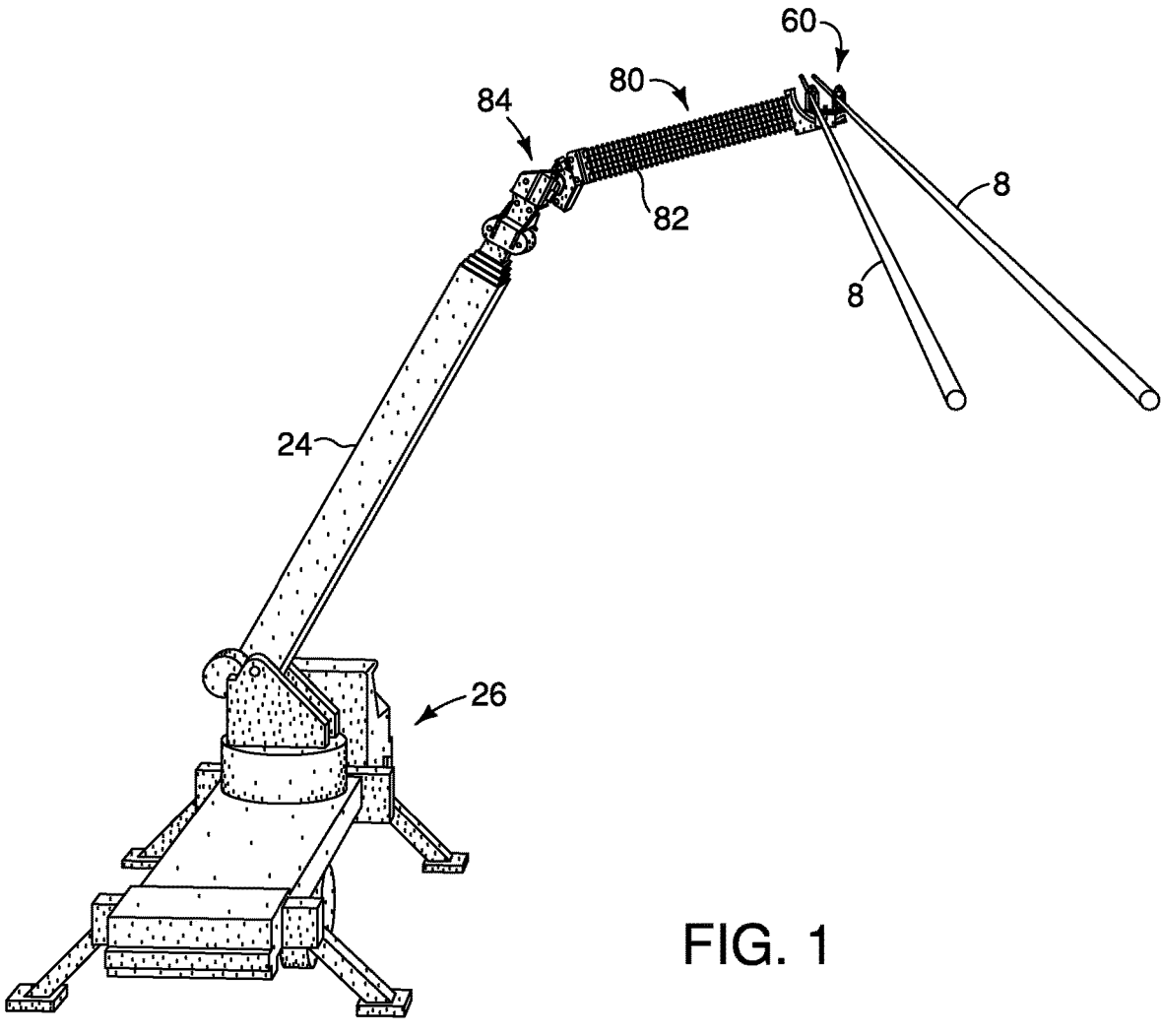
FIG. 1 is a perspective view of a crane boom mounted on a truck, with the rotating head conductor wire lifter assembly of FIG. 13 mounted on the upper end of a single point lifter mounted on the end of the crane or truck boom, with a pair of sub-conductor wires held horizontally on the carriage riding on the track of the rotating head assembly.
Figure 2:
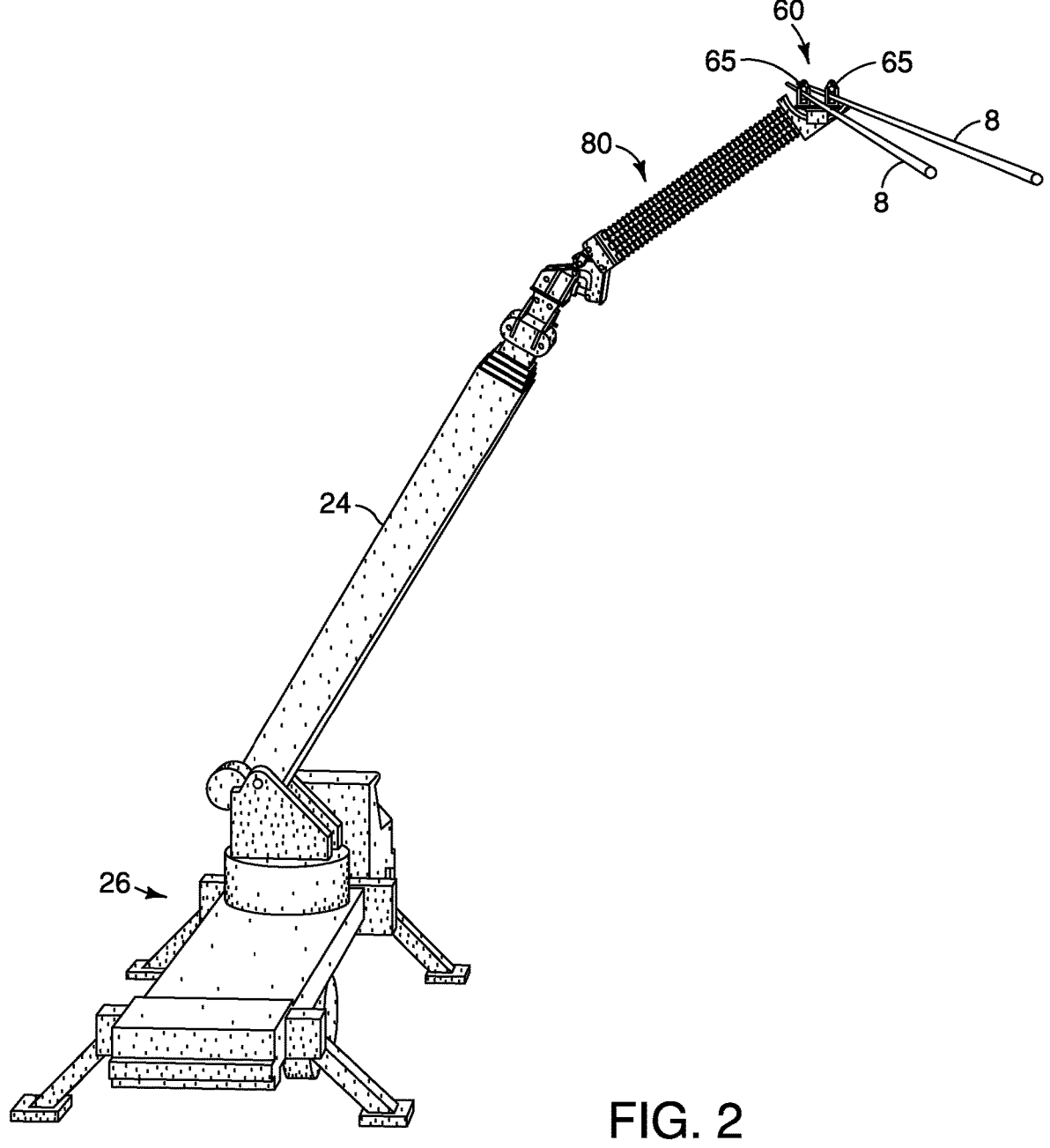
FIG. 2 is the view of FIG. 1 with the single point lifter elevated to a 45 degree angle.
Figure 3:
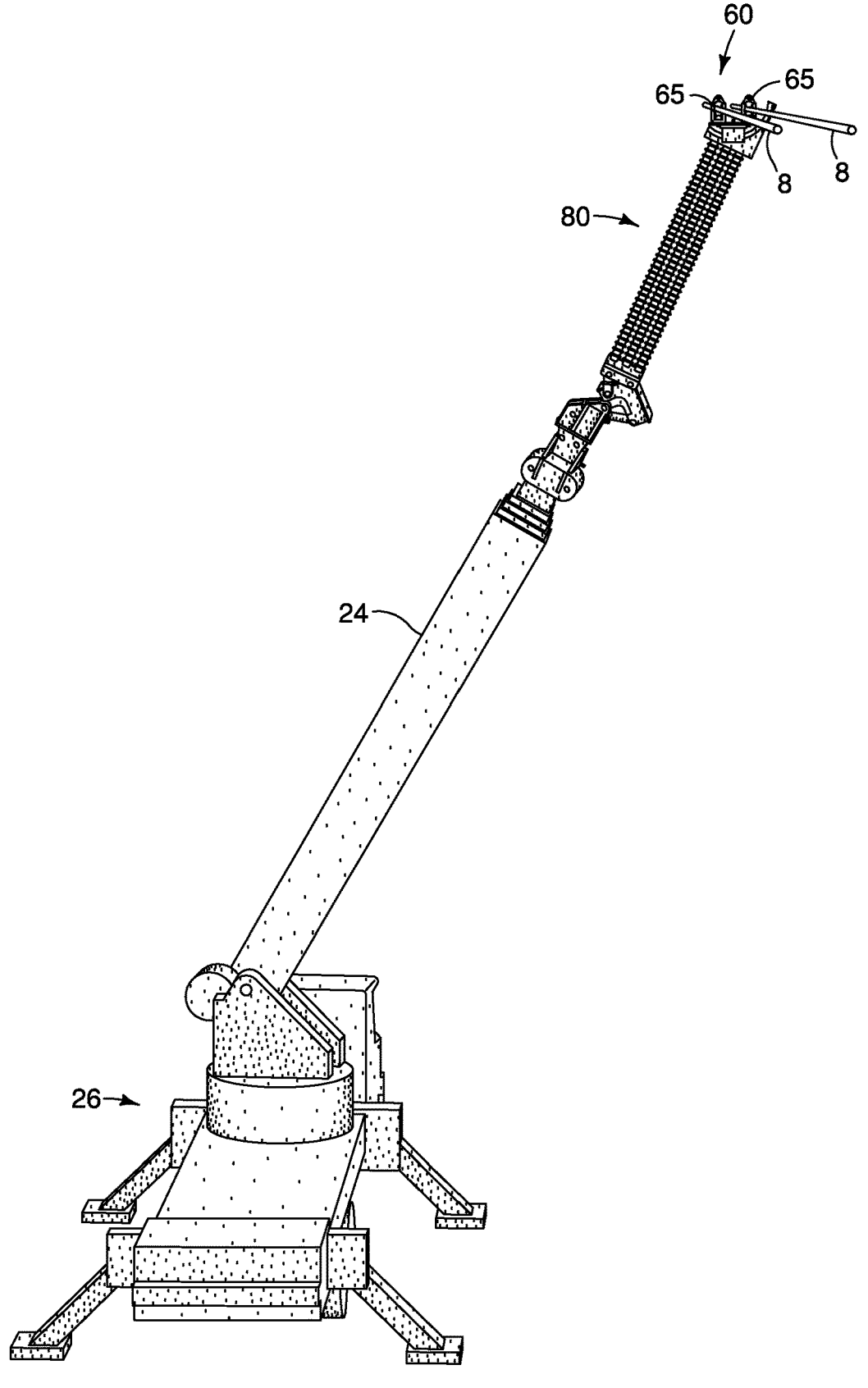
FIG. 3 is the view of FIG. 1 with the single point lifter elevated to a high, e.g. a 60 degree angle.
Figure 4:
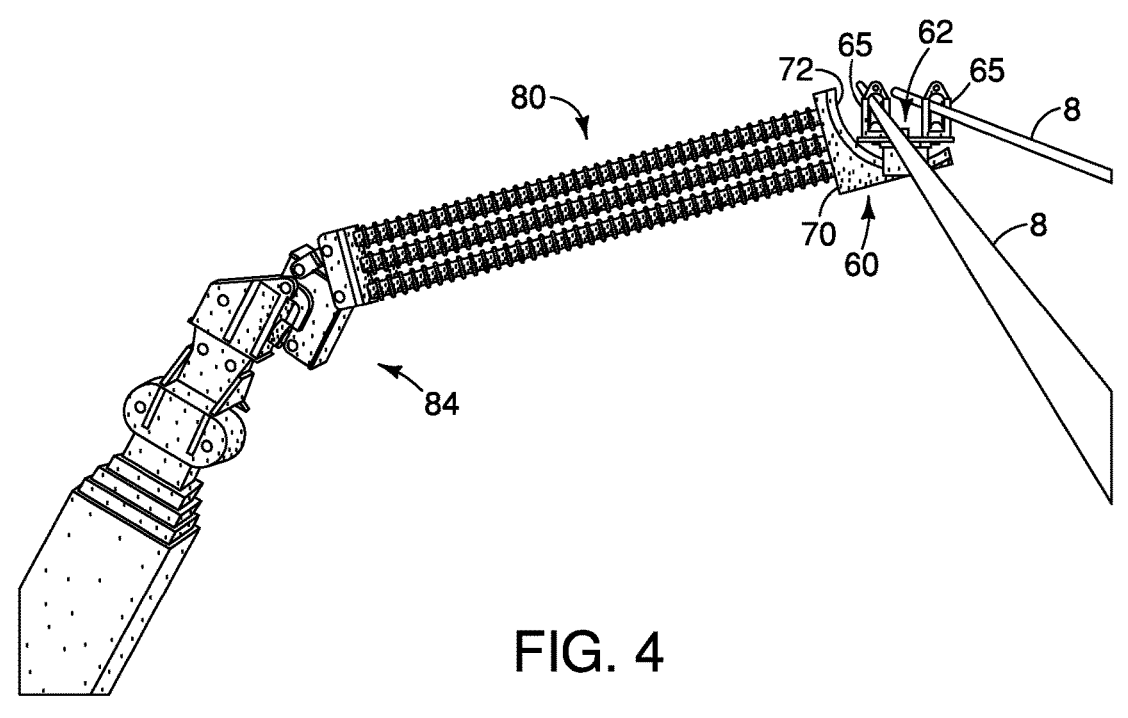
FIG. 4 is an enlarged view of the single point lifter and rotating head assembly of FIG. 1.
Figure 5:
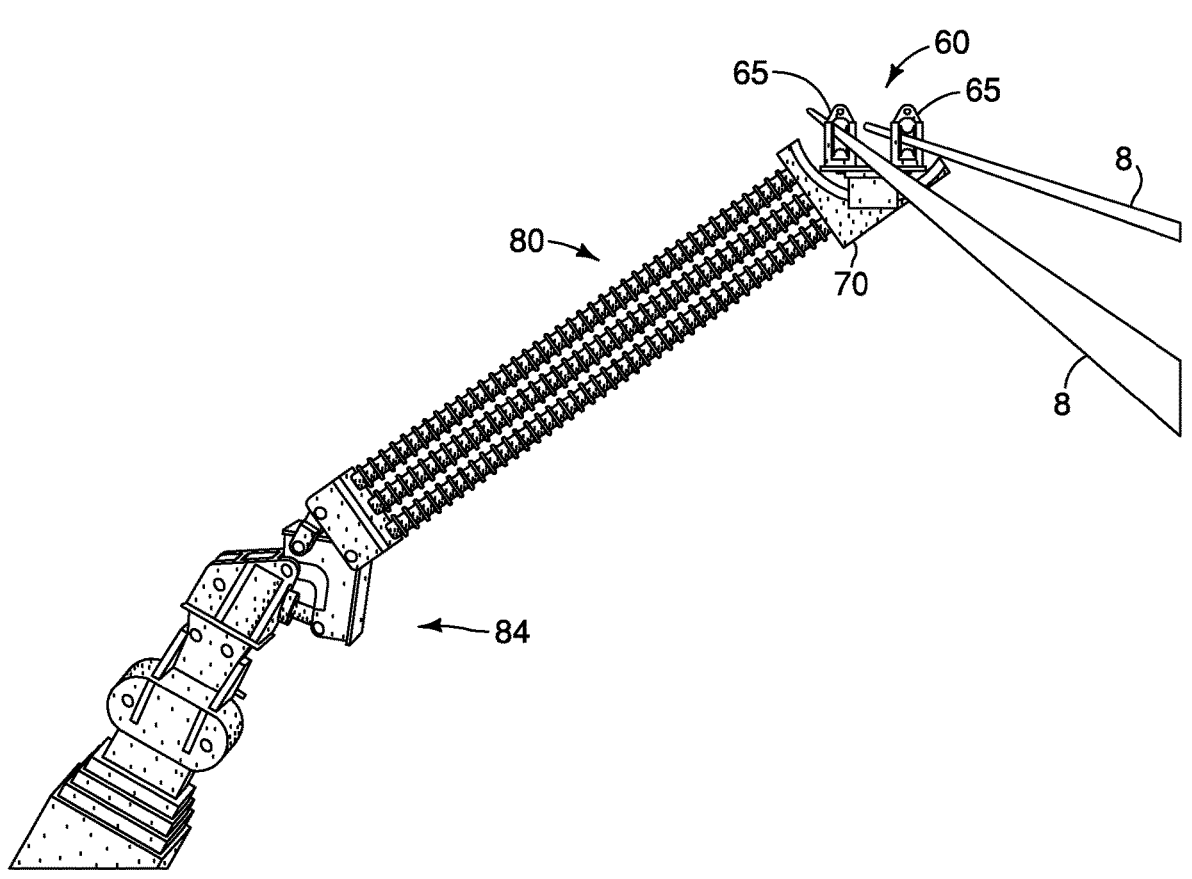
FIG. 5 is an enlarged view of the single point lifter and rotating head assembly of FIG. 2.
Figure 6:
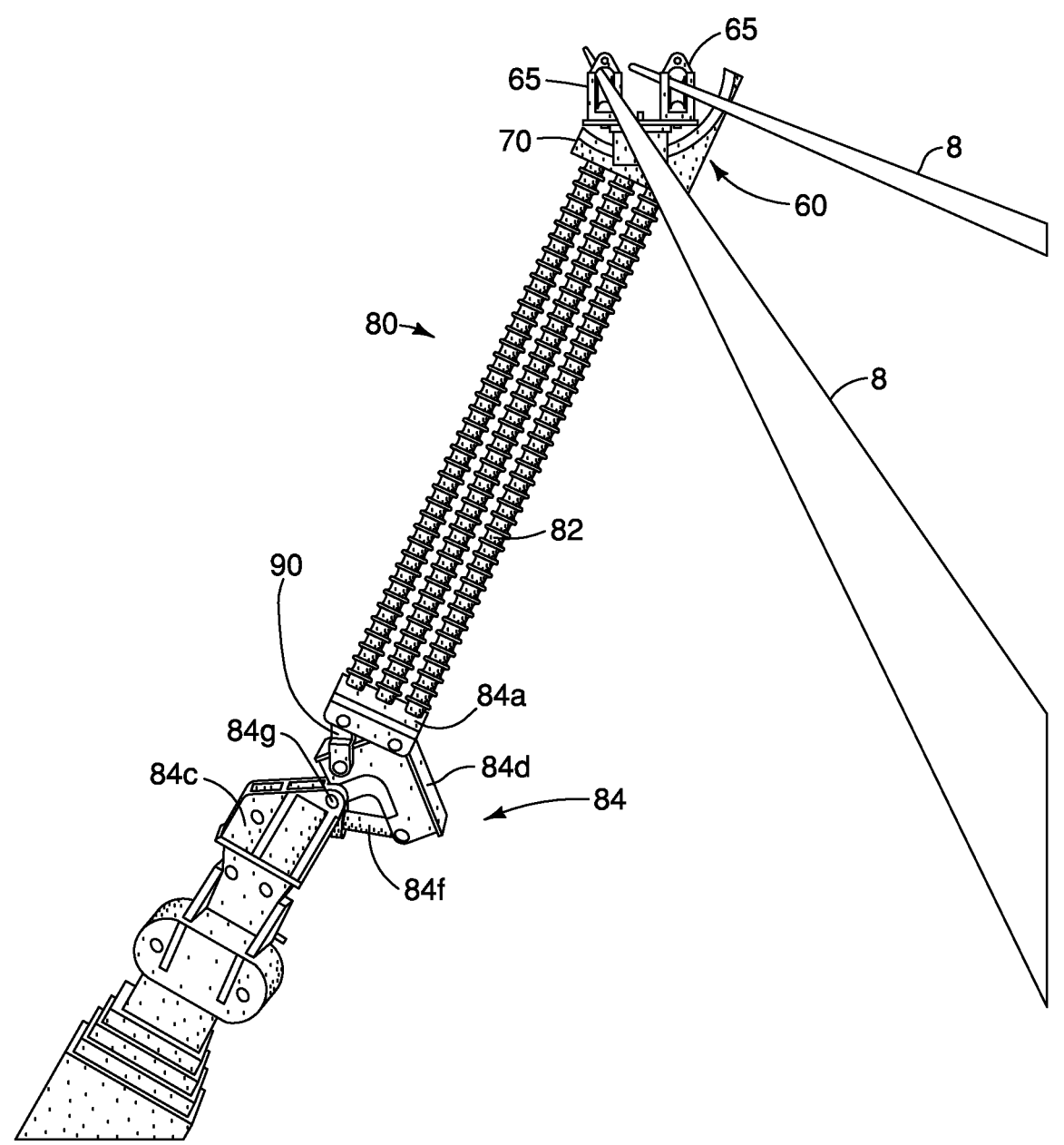
FIG. 6 is an enlarged view of the single point lifter and rotating head assembly of FIG. 3.
Figure 7:
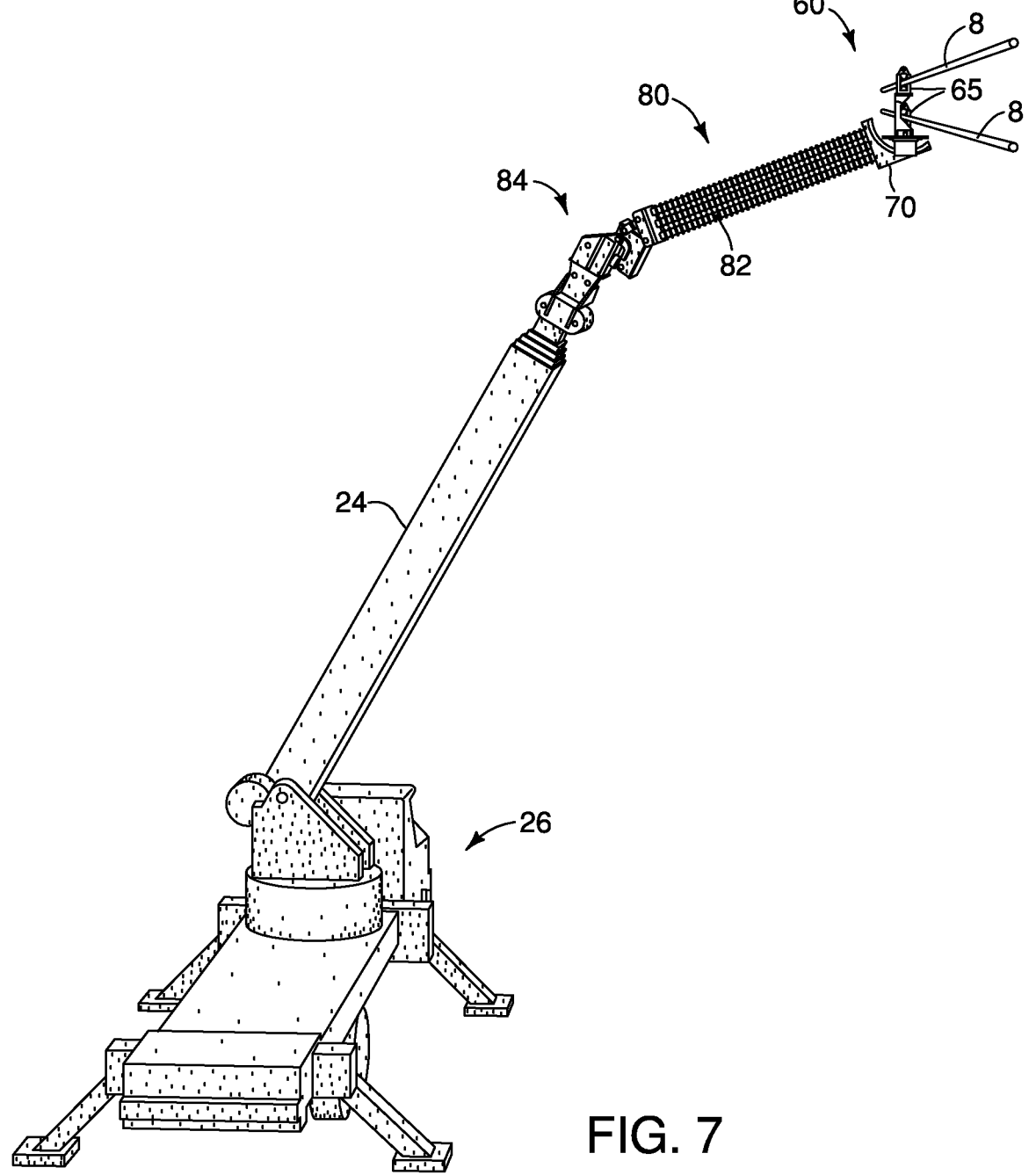
FIG. 7 is the view of FIG. 1 with the pair of conductor wires held vertically on the carriage riding on the track of the rotating head assembly.
Figure 10:
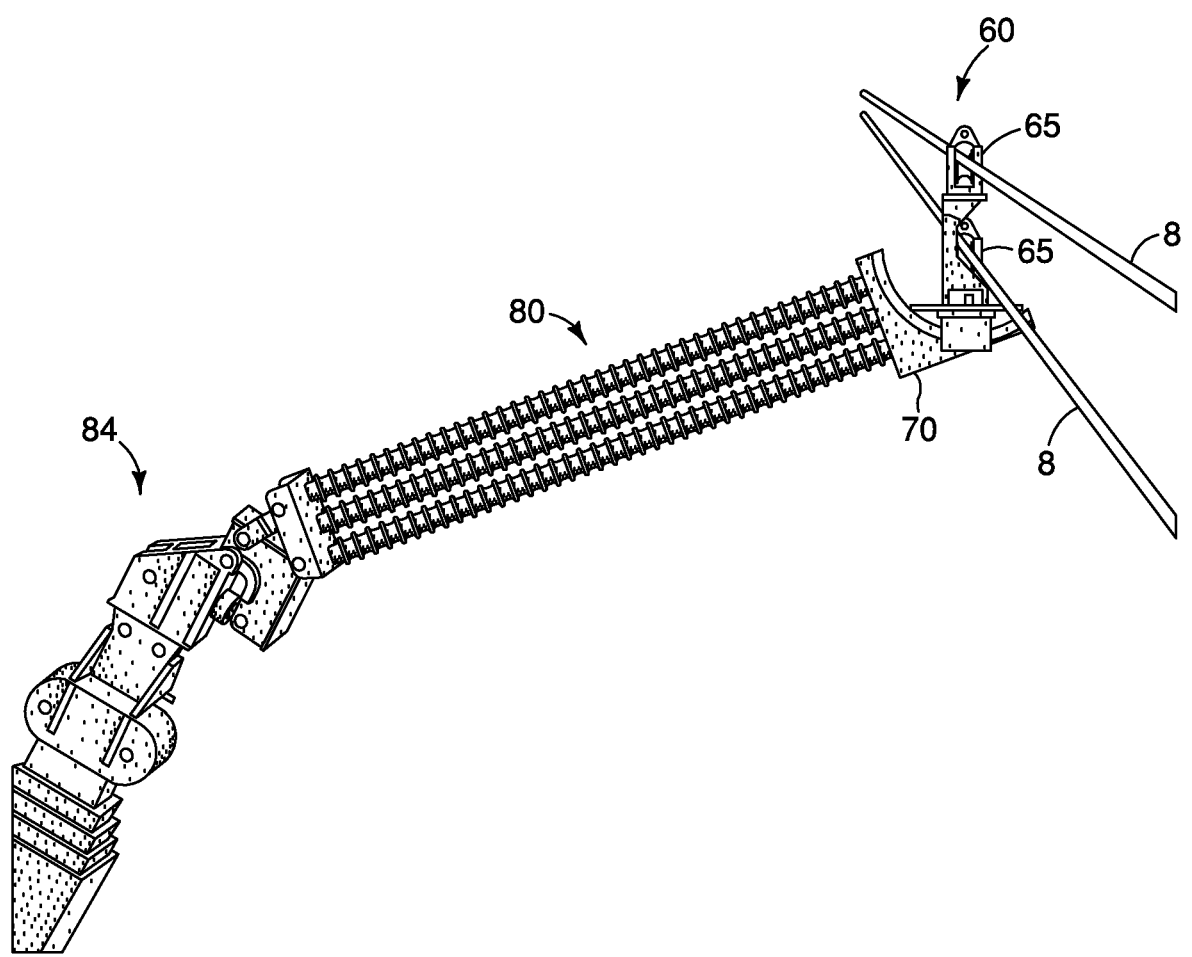

FIG. 10 is an enlarged view of the single point lifter and rotating head assembly of FIG. 7.

Figure 8:
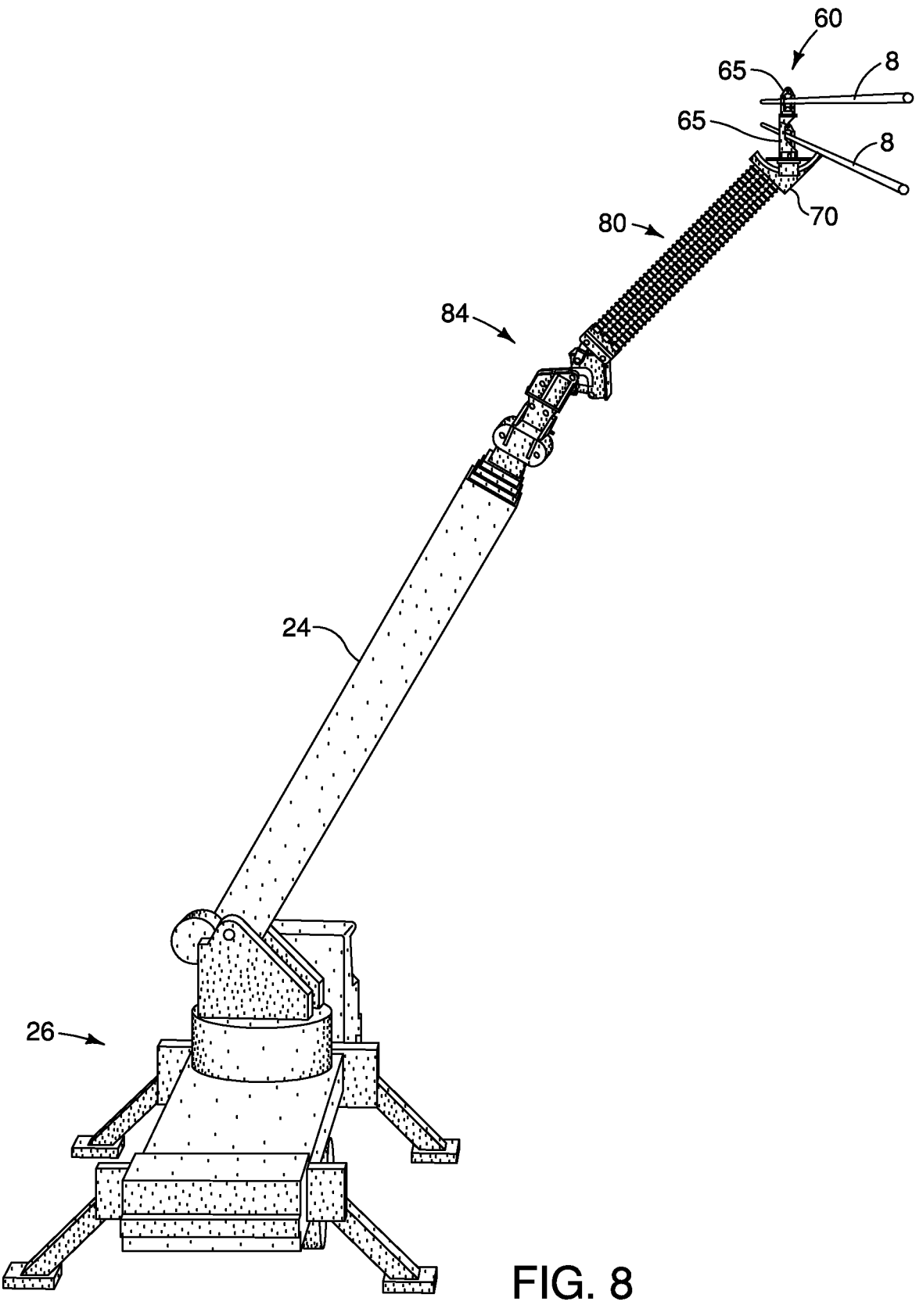
FIG. 8 is the view of FIG. 7 with the single point lifter at a 45 degree angle.
Figure 11:
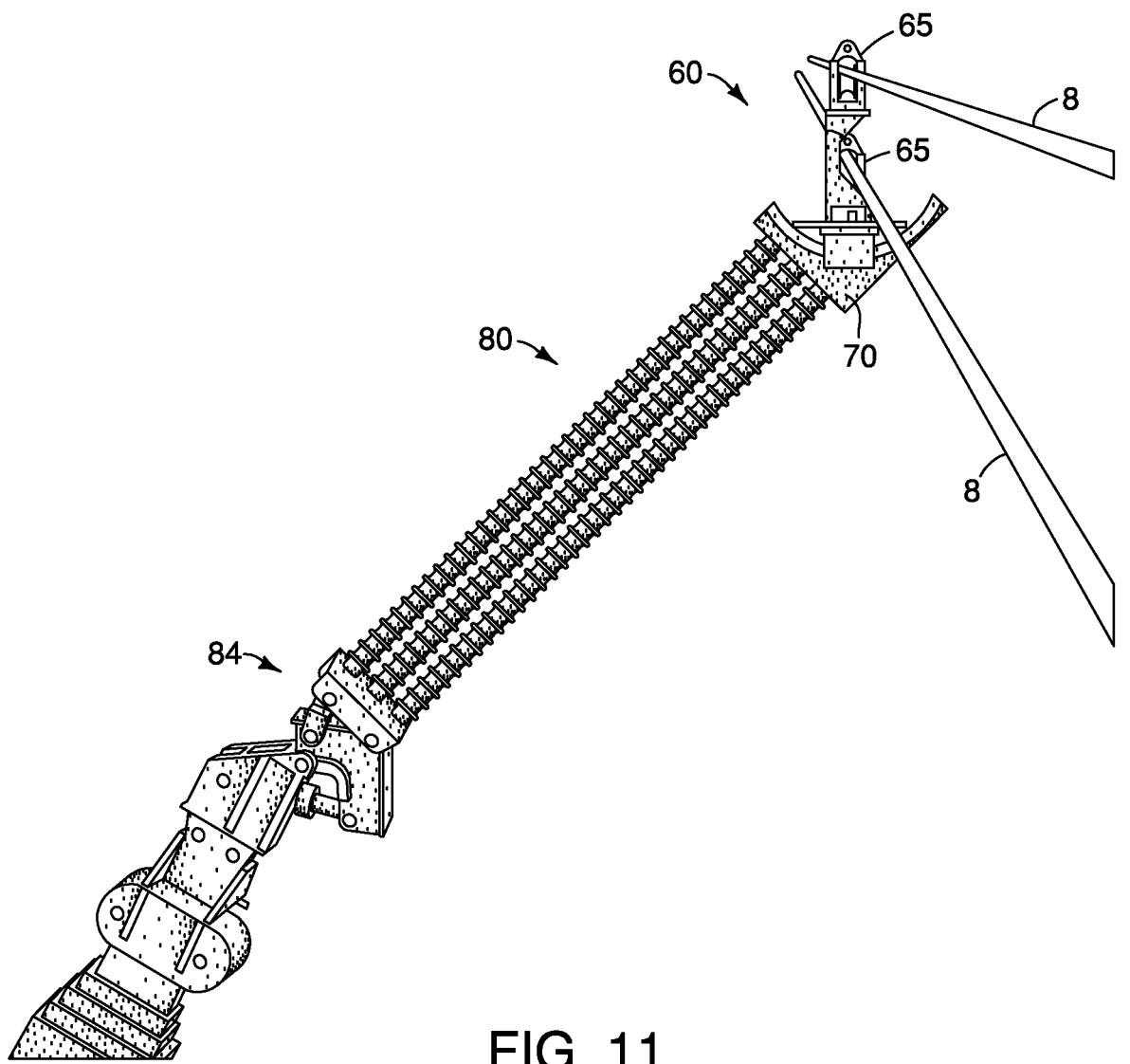

FIG. 11 is an enlarged view of the single point lifter and rotating head assembly of FIG. 8.

Figure 9:
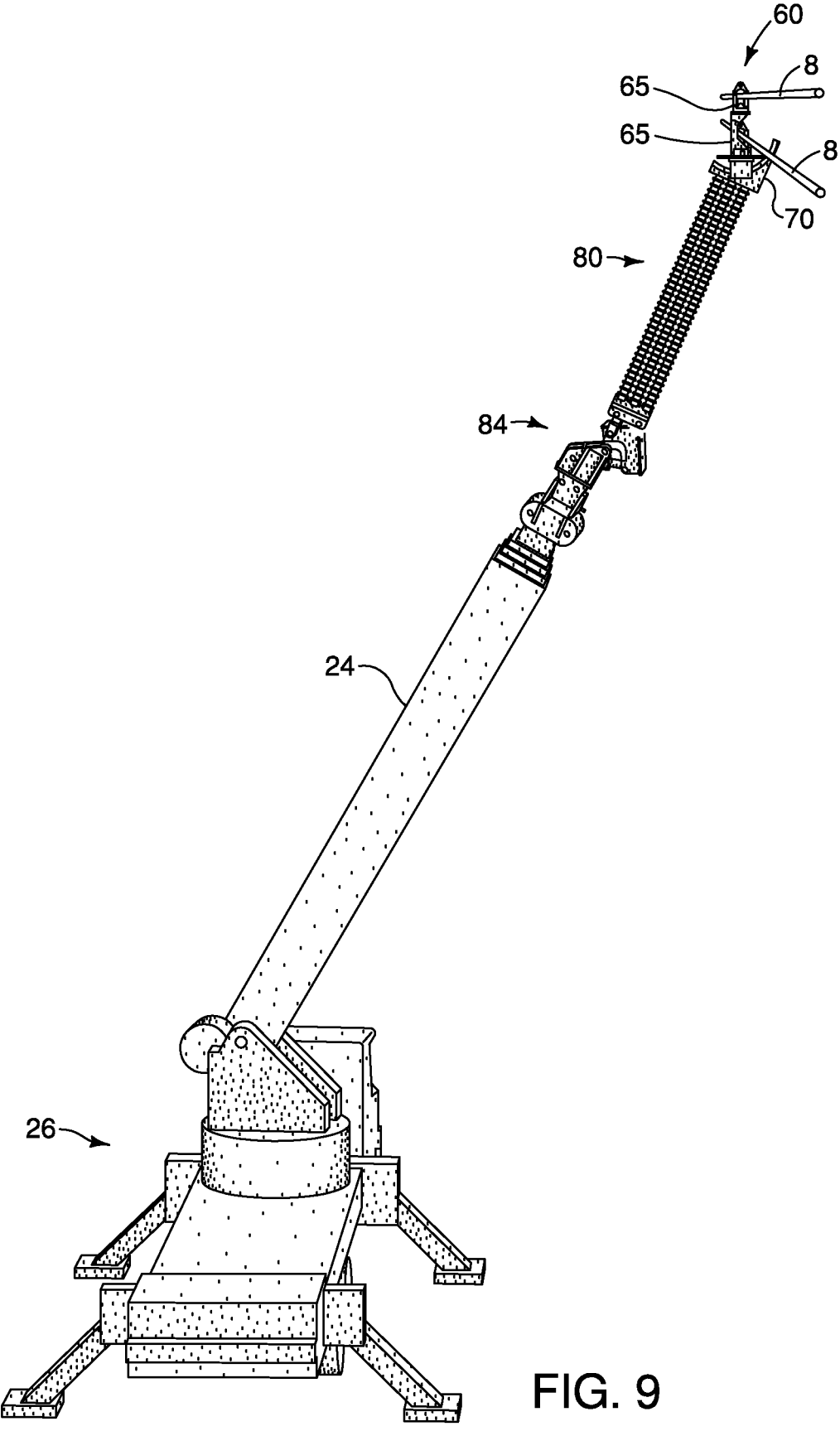
FIG. 9 is the view of FIG. 7 with the single point lifter at a higher angle.
Figure 12:
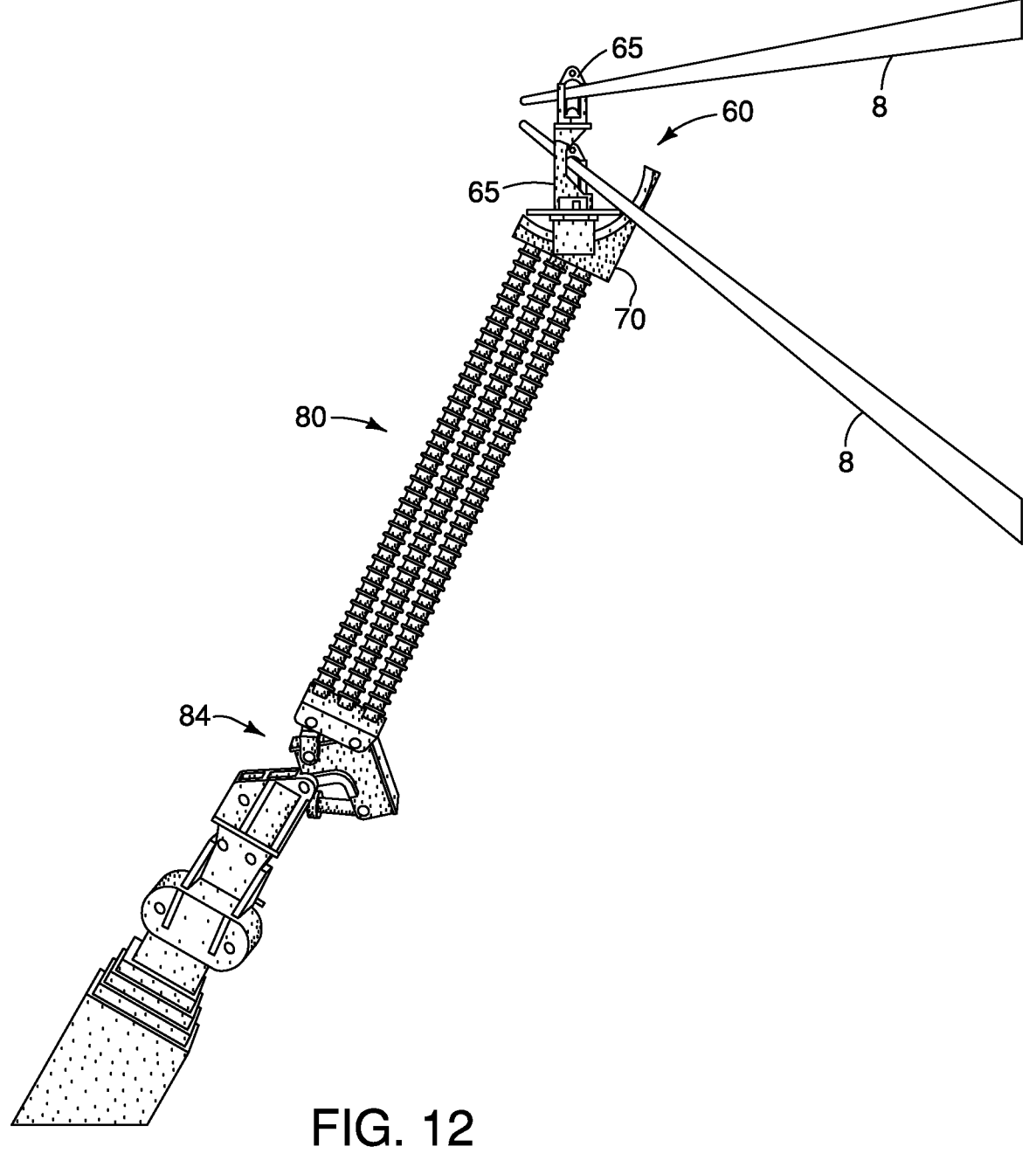

FIG. 12 is an enlarged view of the single point lifter and rotating head assembly of FIG. 9.

Figure 13:
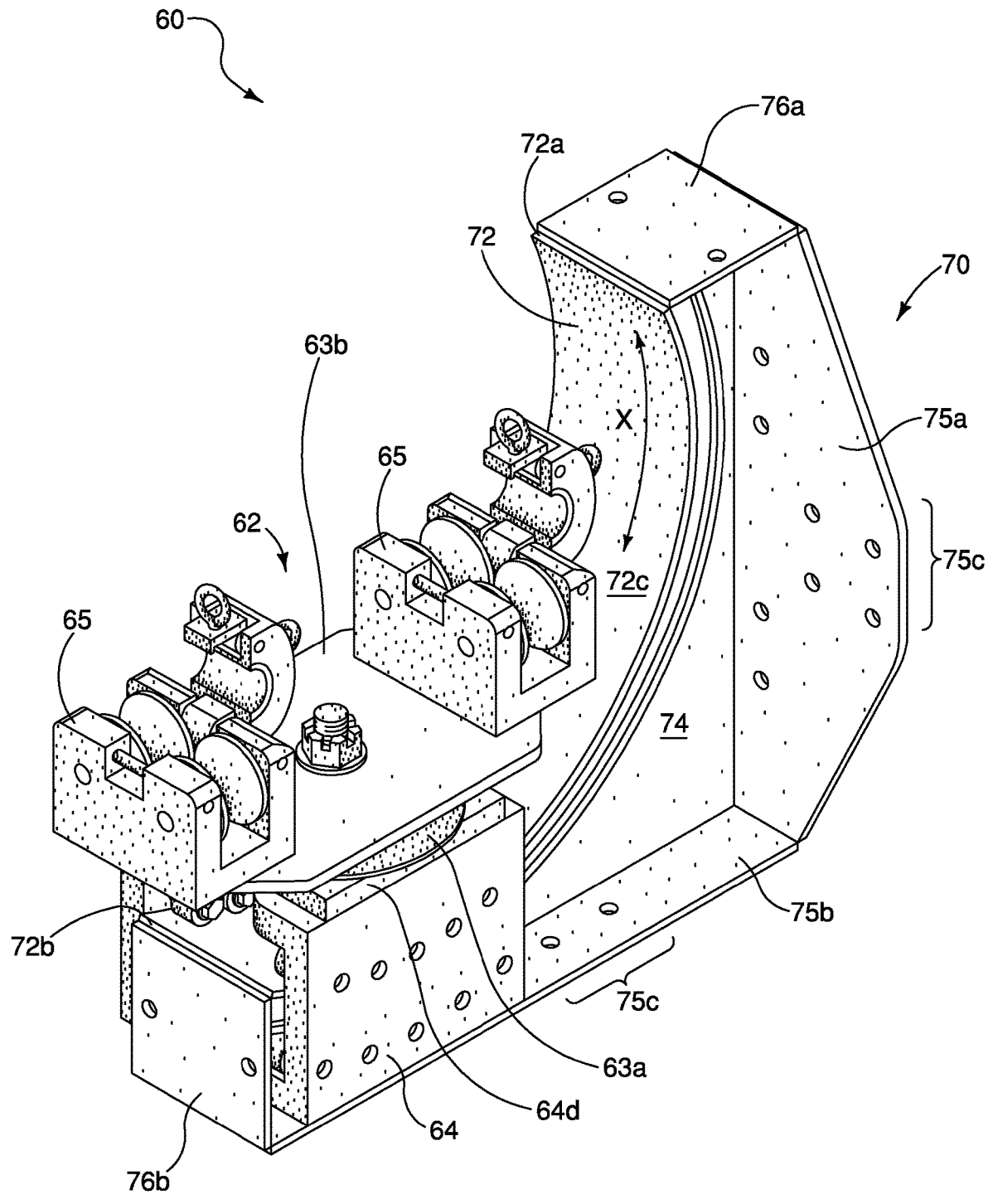

FIG. 13 is a perspective view of an embodiment of a rotating head conductor lifter, in accordance with the present disclosure.

Figure 14:
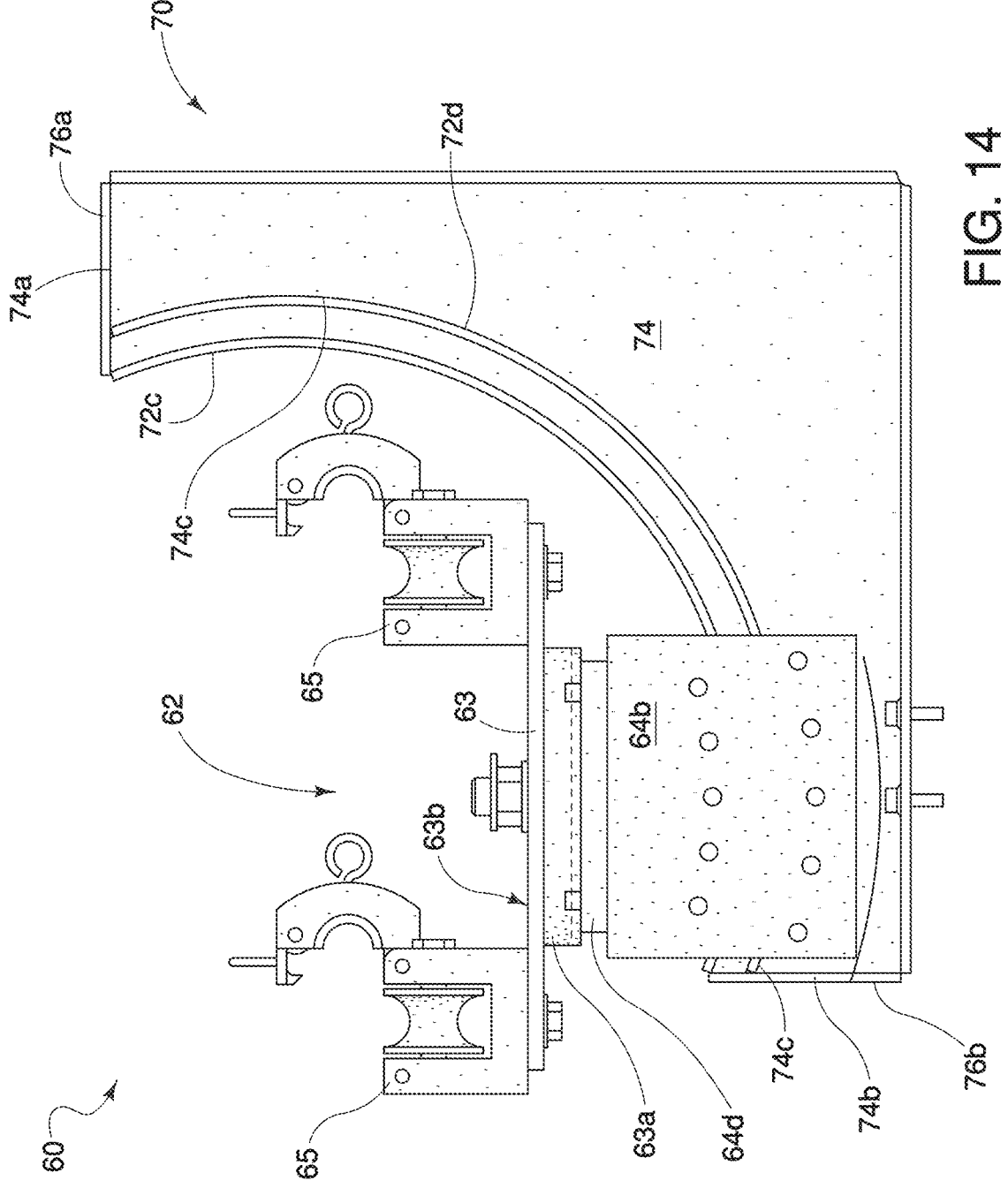

FIG. 14 is a side elevation view of the rotating head conductor lifter of FIG. 13.

Figure 15:
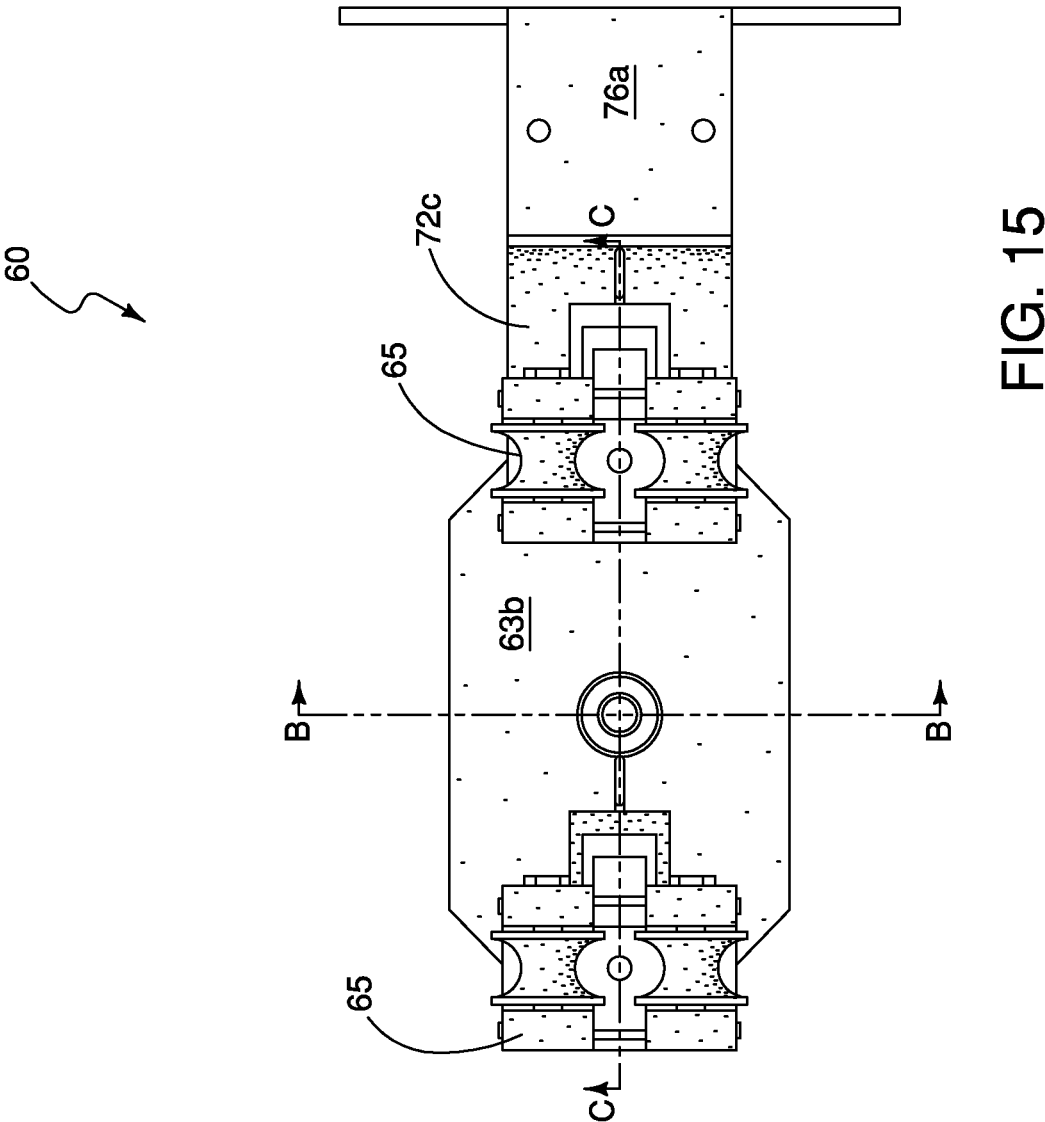

FIG. 15 is a top plan view of the rotating head conductor lifter of FIG. 13.

Figure 16:
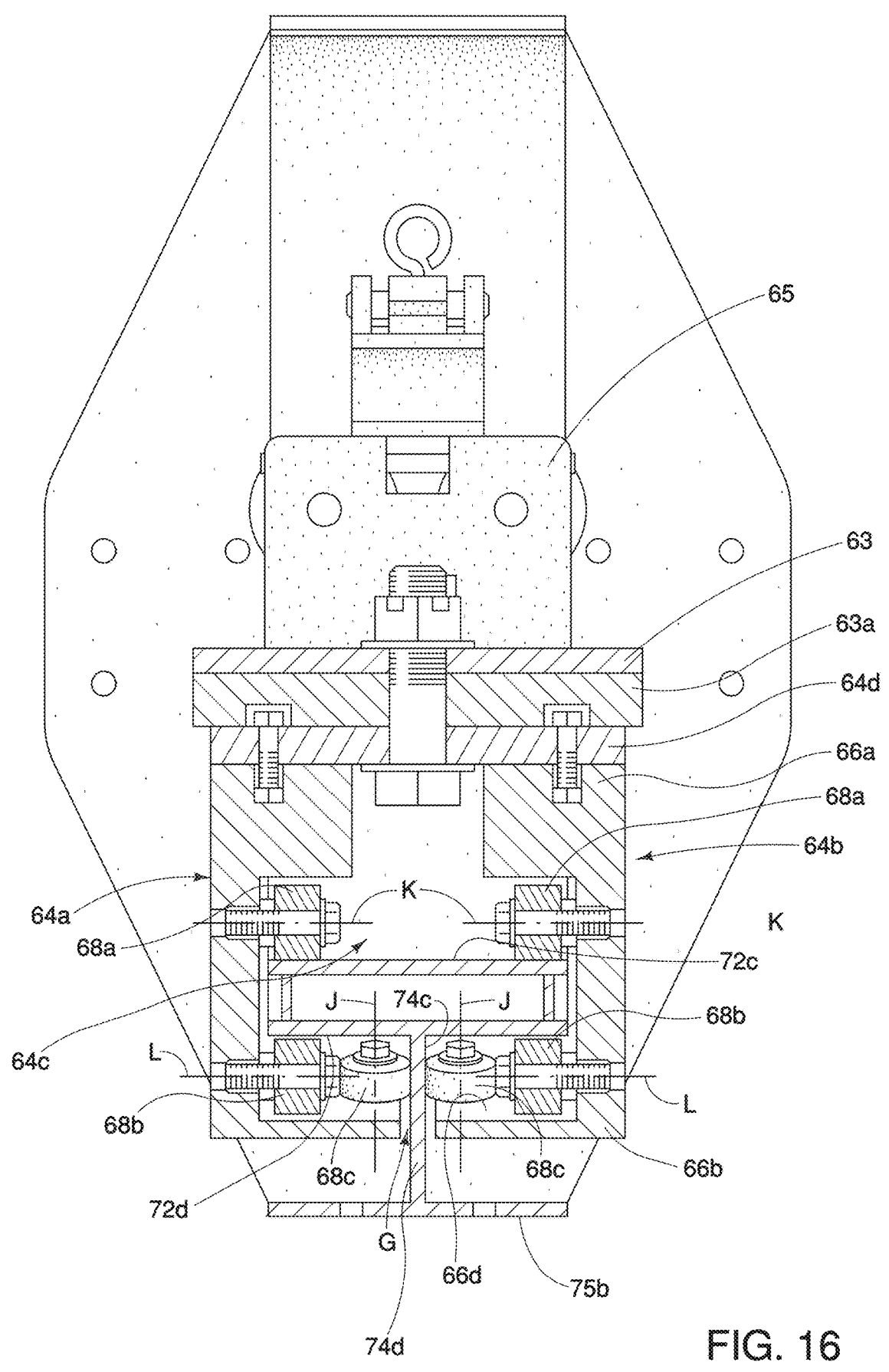

FIG. 16 is a cross-sectional view of the rotating head conductor lifter of FIG. 13, taken along line B-B in FIG. 15.

Figure 17:
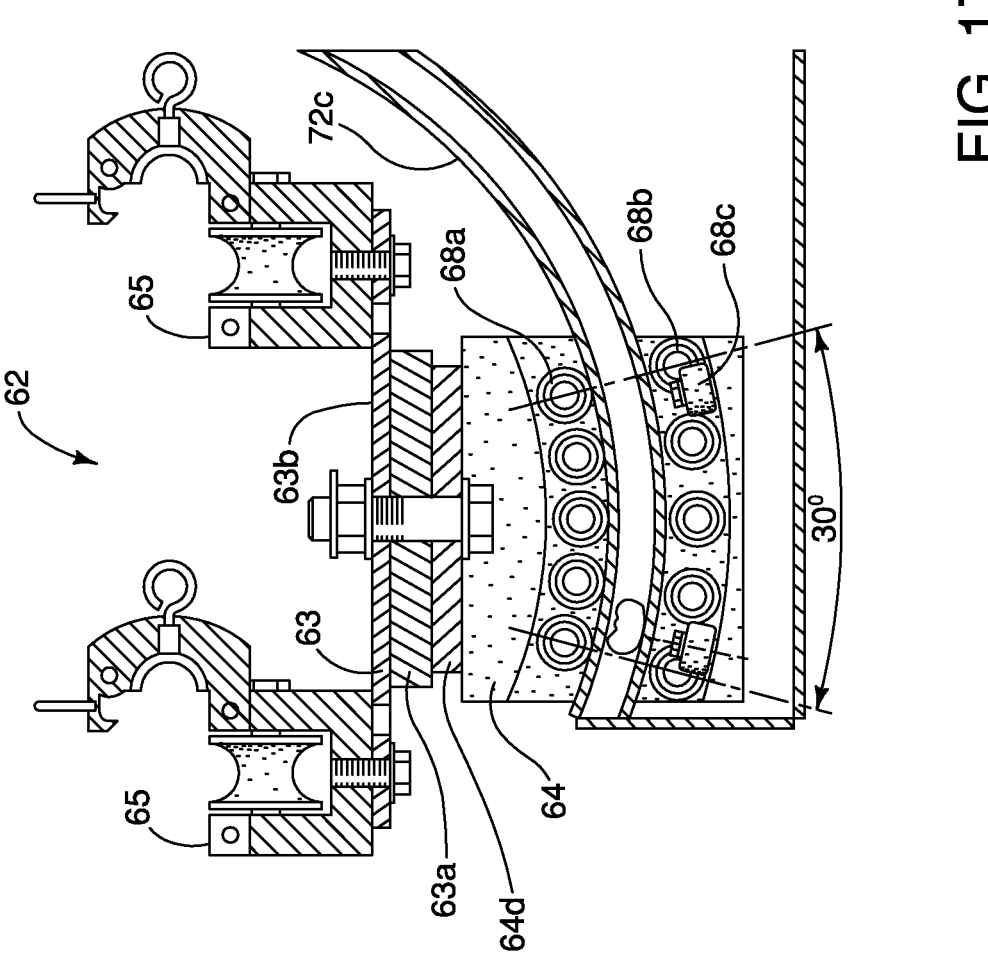

FIG. 17 is a cross-sectional view of the rotating head conductor lifter of FIG. 13, taken along line C-C in FIG. 15.

Figure 18:
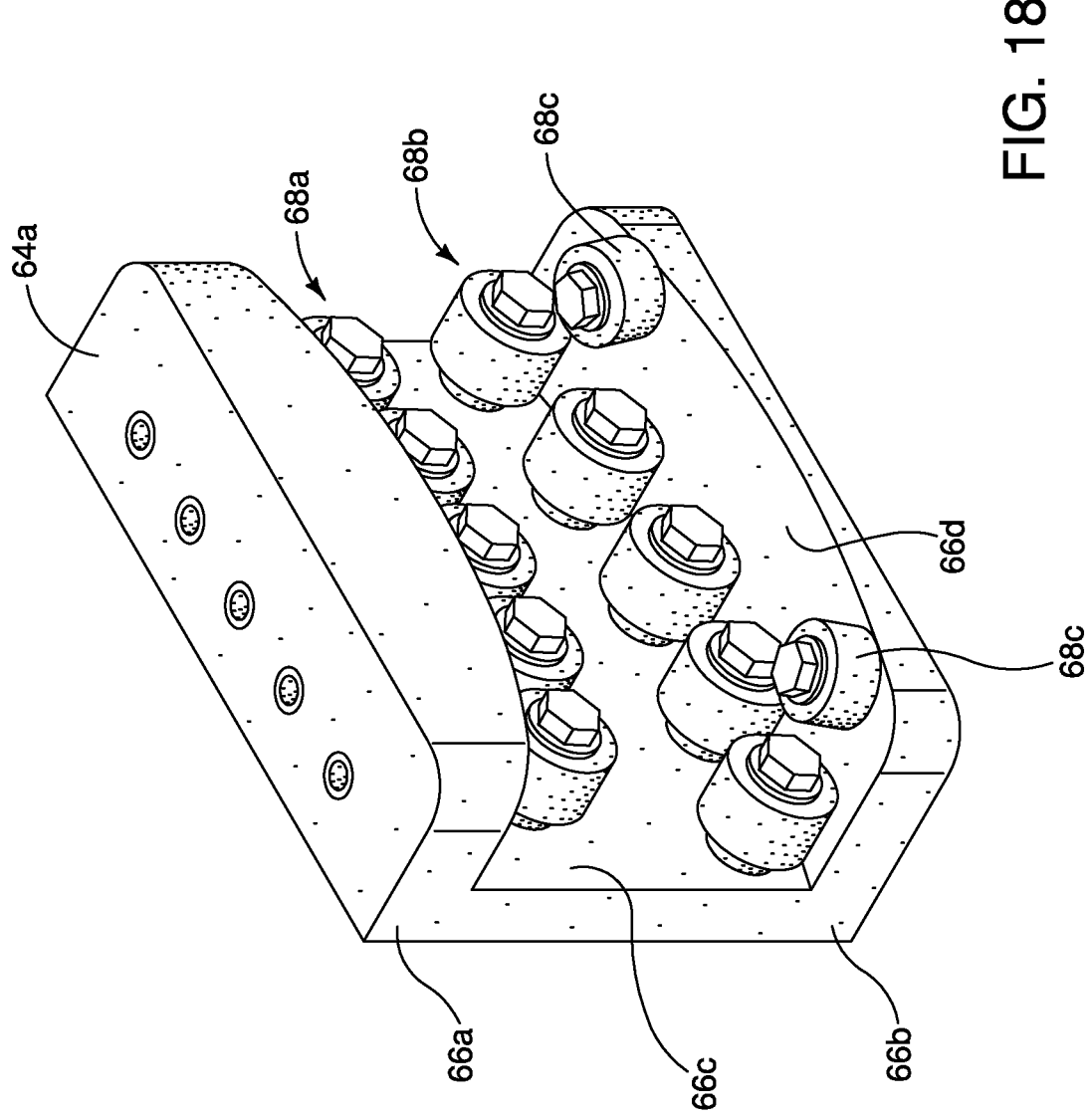

FIG. 18 is a perspective view of a first portion of the carriage block and rollers of the rotating head conductor lifter of FIG. 13.

Figure 19:
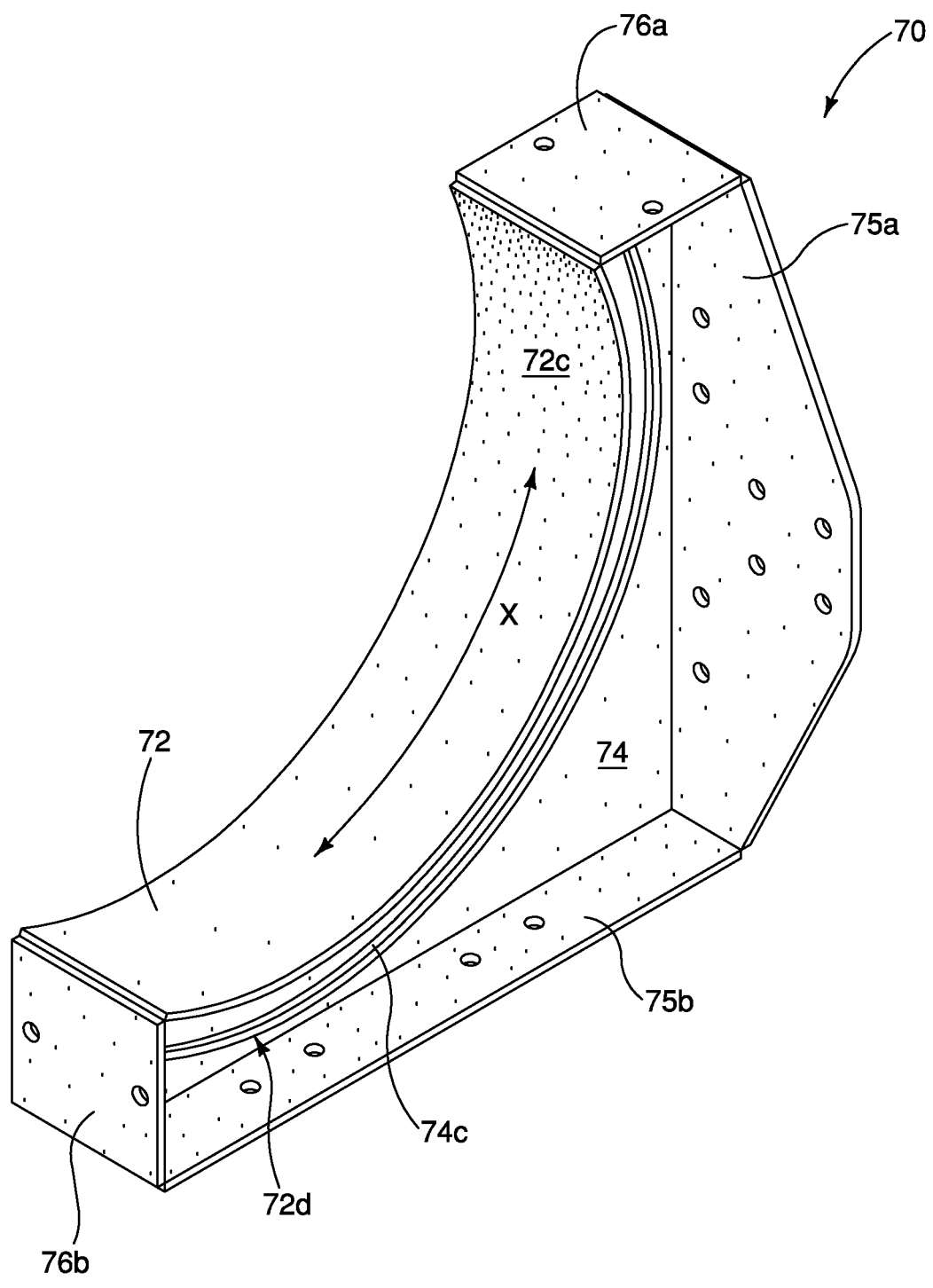

FIG. 19 is a perspective view of the raceway of the rotating head conductor lifter of FIG. 13, with the carriage removed.

Figure 20:
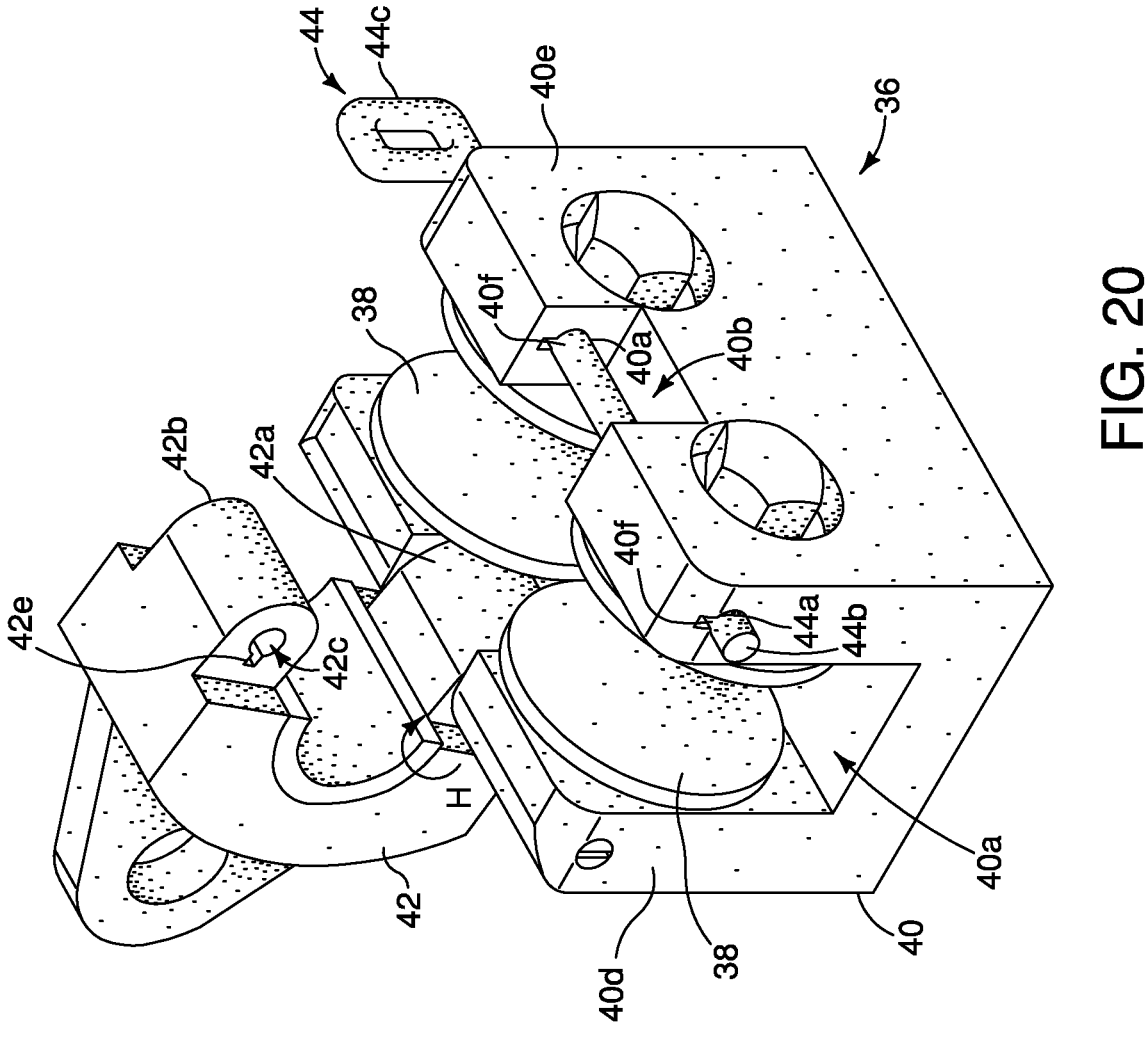

FIG. 20 is a perspective view of a conductor wire cage according to an embodiment, the wire cage including two rollers, showing the wire cage door in an open position.

Figure 21:
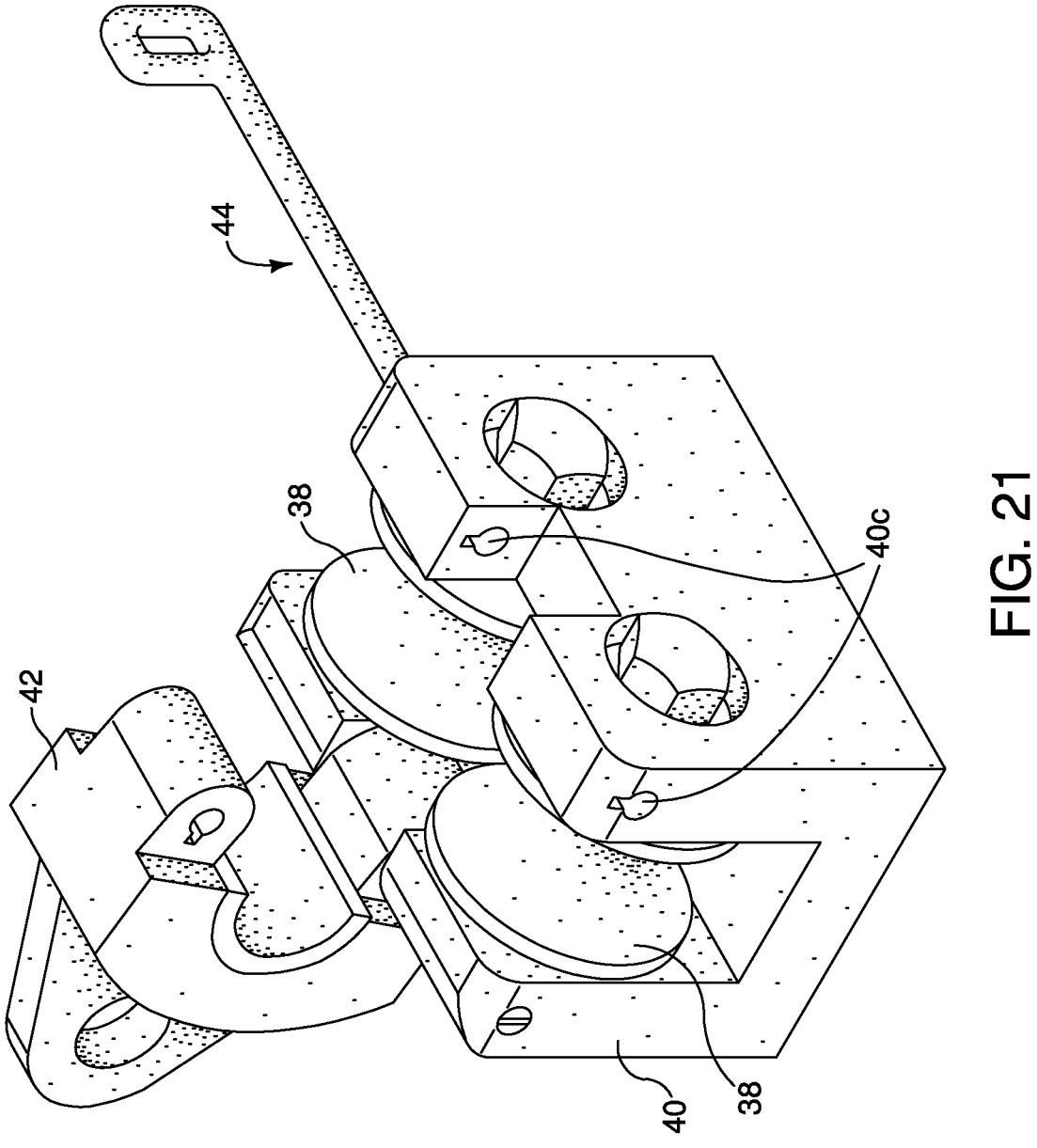

FIG. 21 is a perspective view of the conductor wire cage of FIG. 20, showing the pin in the open position to allow the door to close.

Figure 22:
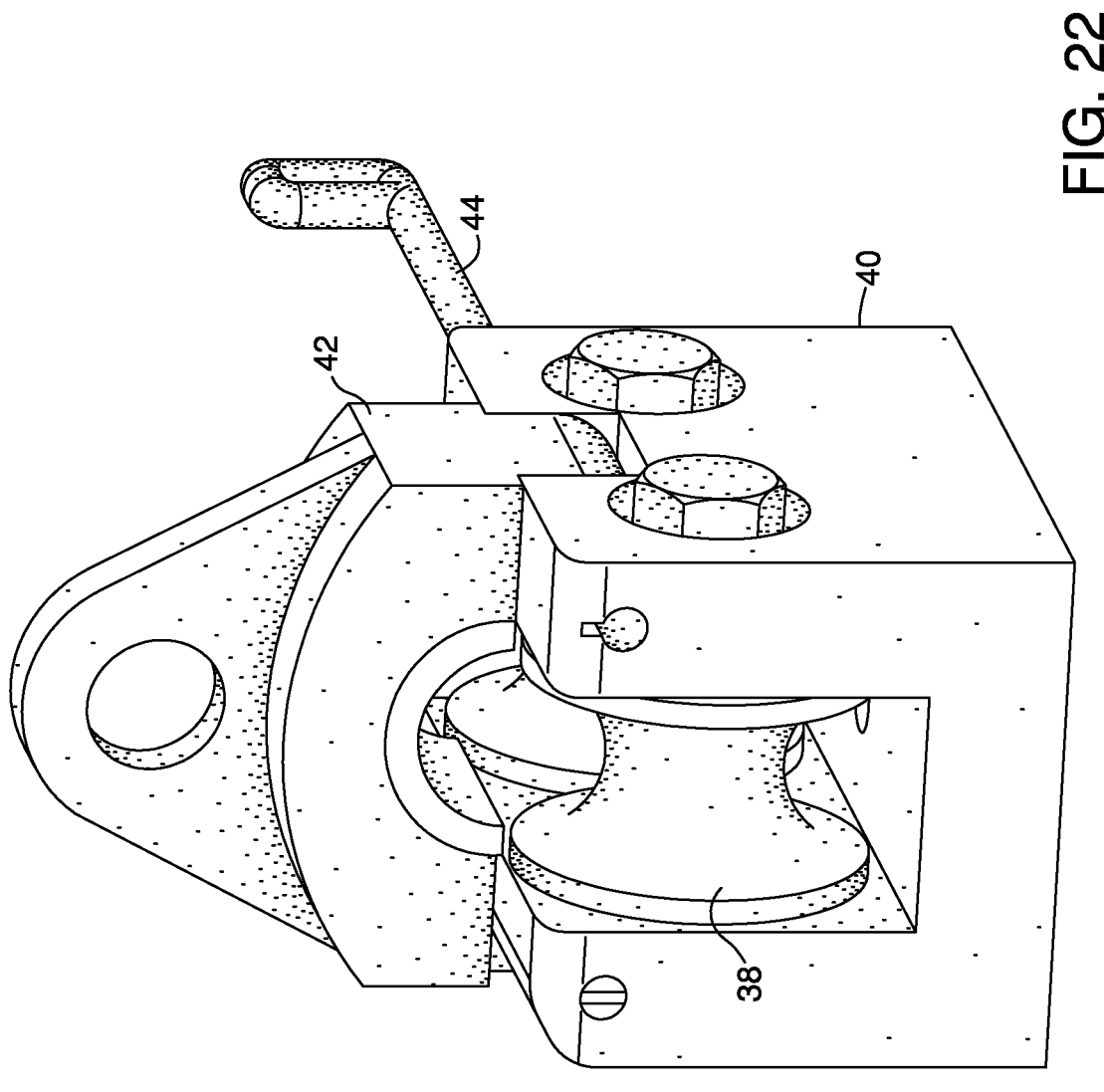

FIG. 22 is a perspective view of the conductor wire cage of FIG. 20, showing the wire cage door in a closed position with the pin in the open position.

Figure 23:
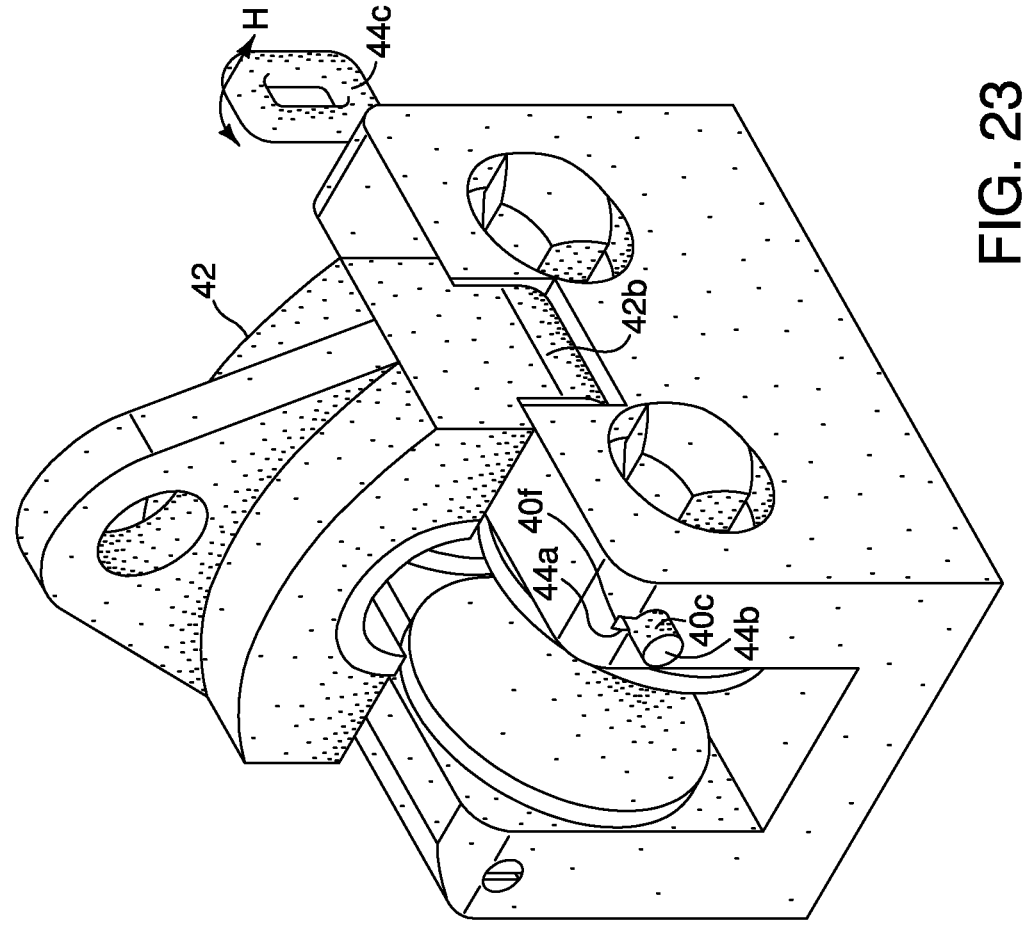

FIG. 23 is a perspective view of the conductor wire cage of FIG. 20, showing the wire cage door in a closed position with the pin pushed in securing the wire cage door.

Figure 24:
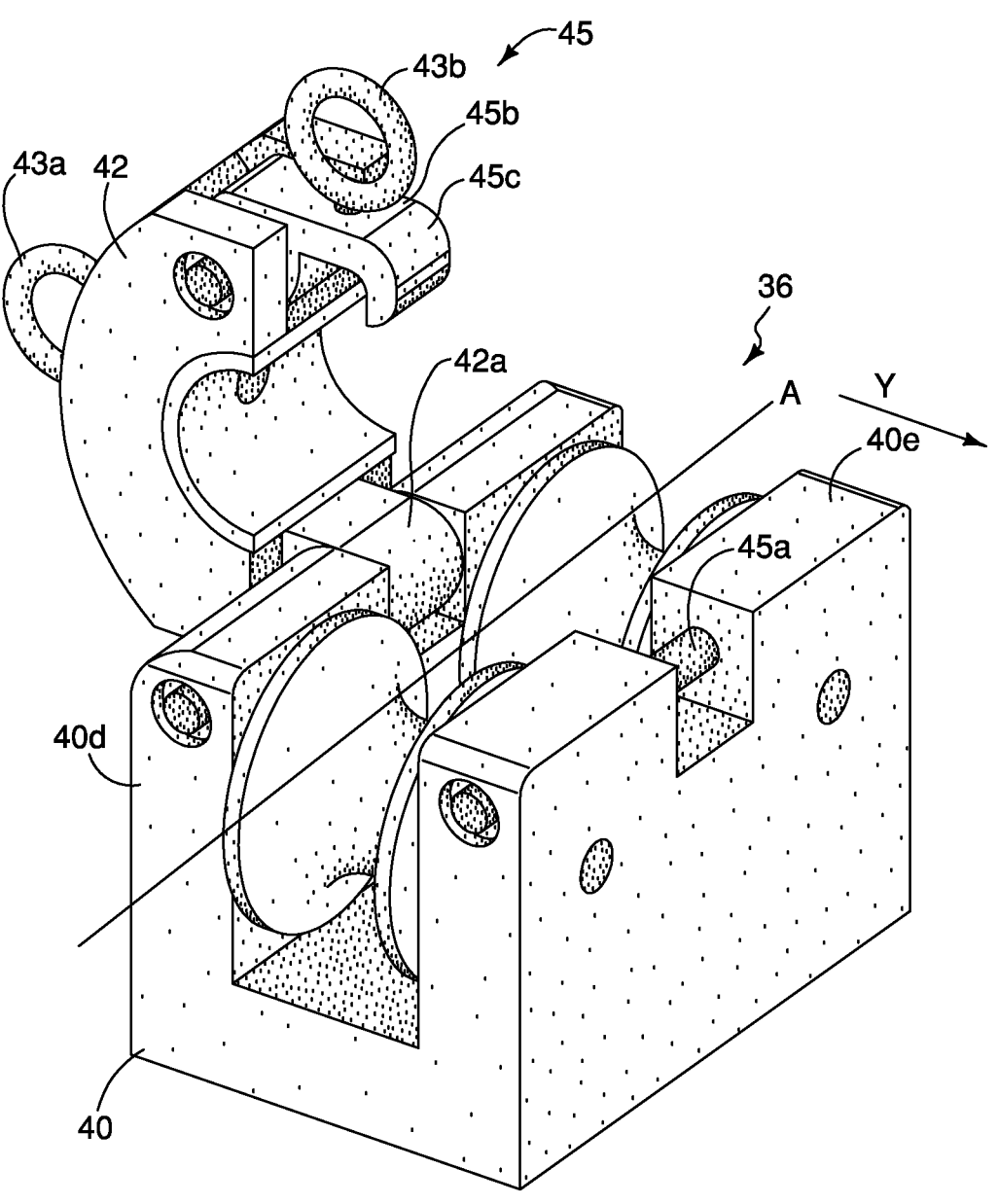

FIG. 24 is a perspective view of a conductor wire cage according to a further embodiment, the wire cage including spring loaded latch and two rollers, showing the wire cage door in an open position.

Figure 25:
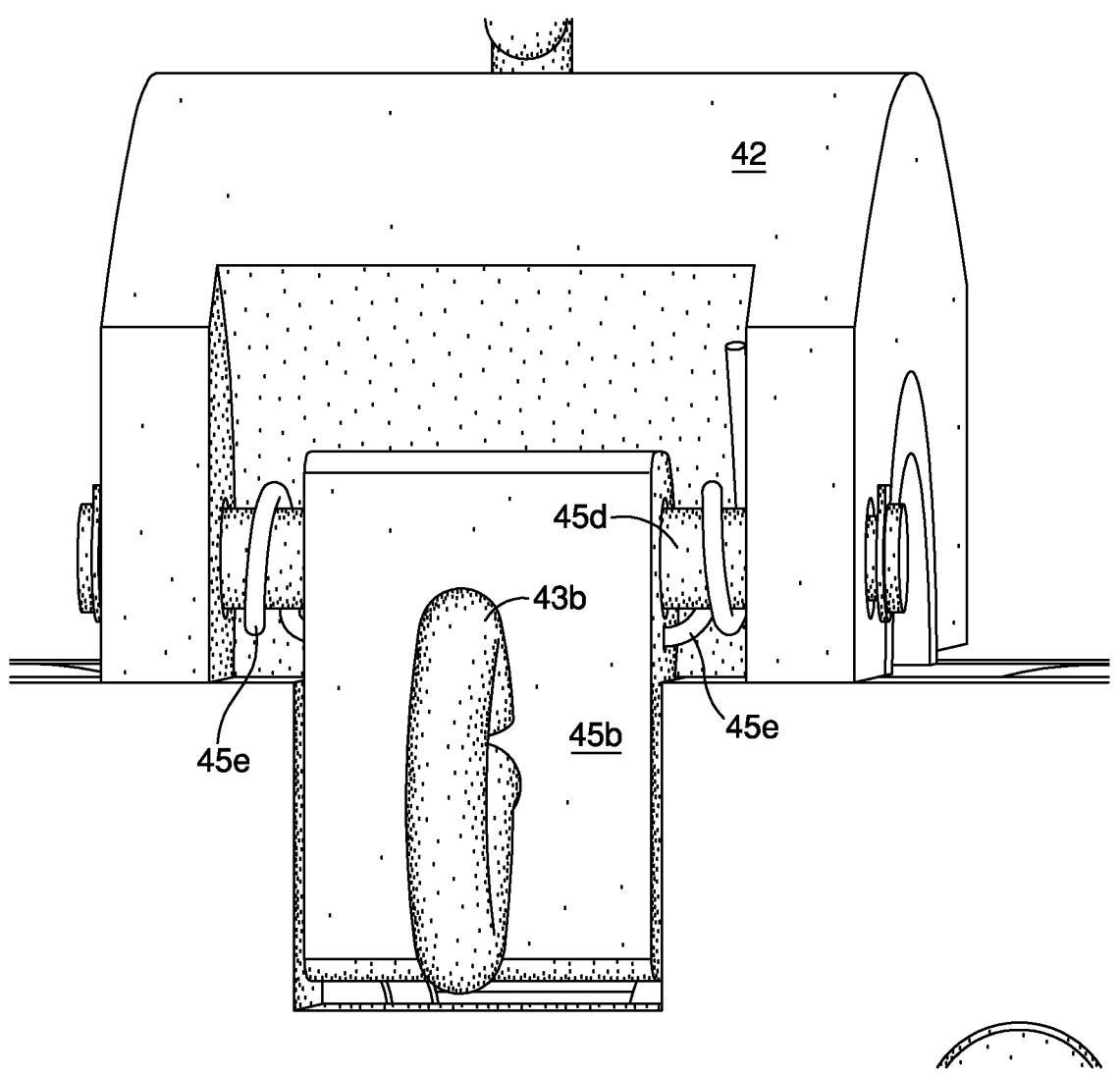

FIG. 25 is a close up view of the spring loaded latch of the wire care of FIG. 24, showing the two torsion springs that maintain the wire cage latch in a closed and latched position.

Figure 26:
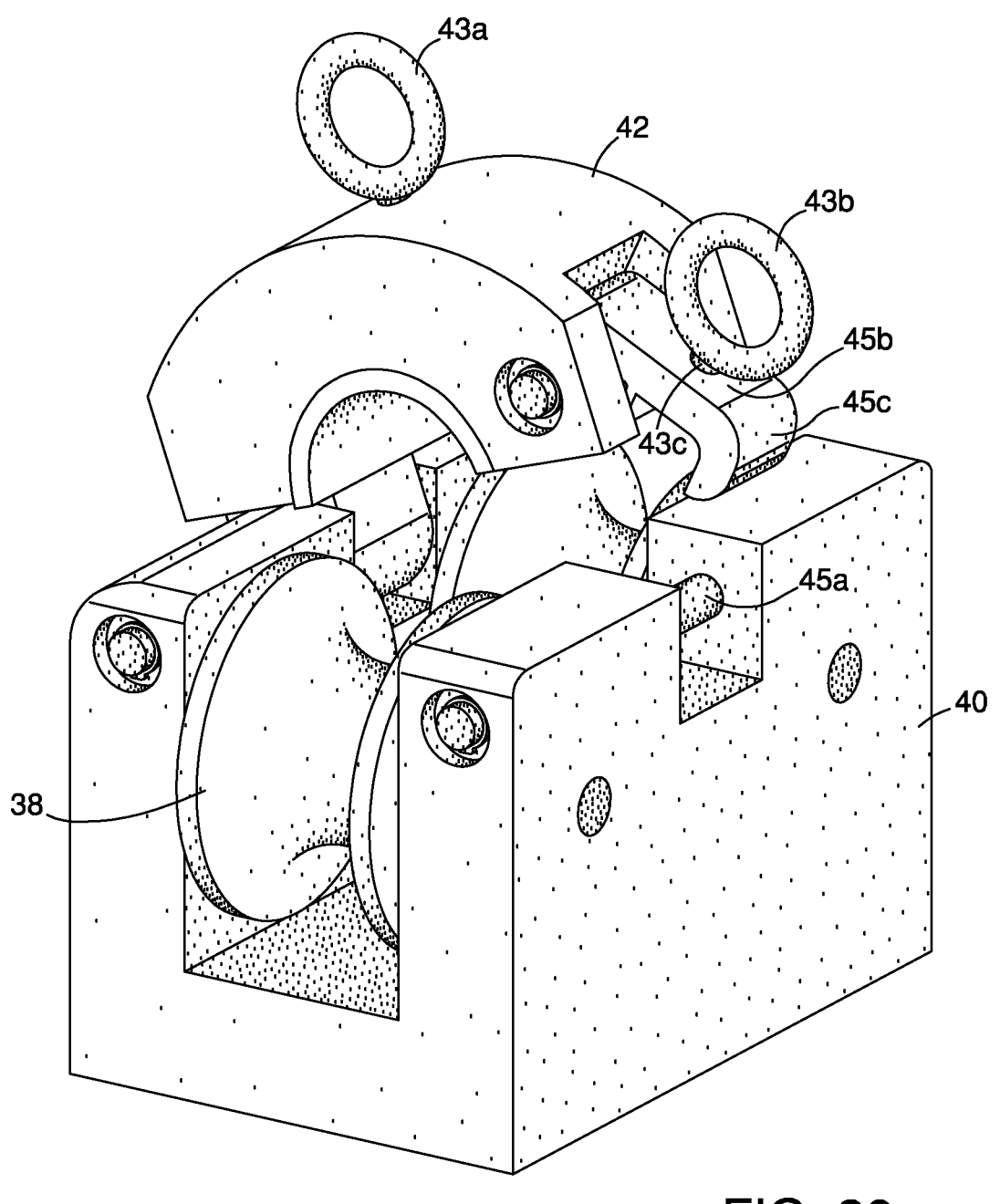

FIG. 26 is a perspective view of the conductor wire cage of FIG. 24, showing the wire door in a partially closed position with the latch in an open position for closing of the wire cage door.

Figure 27:
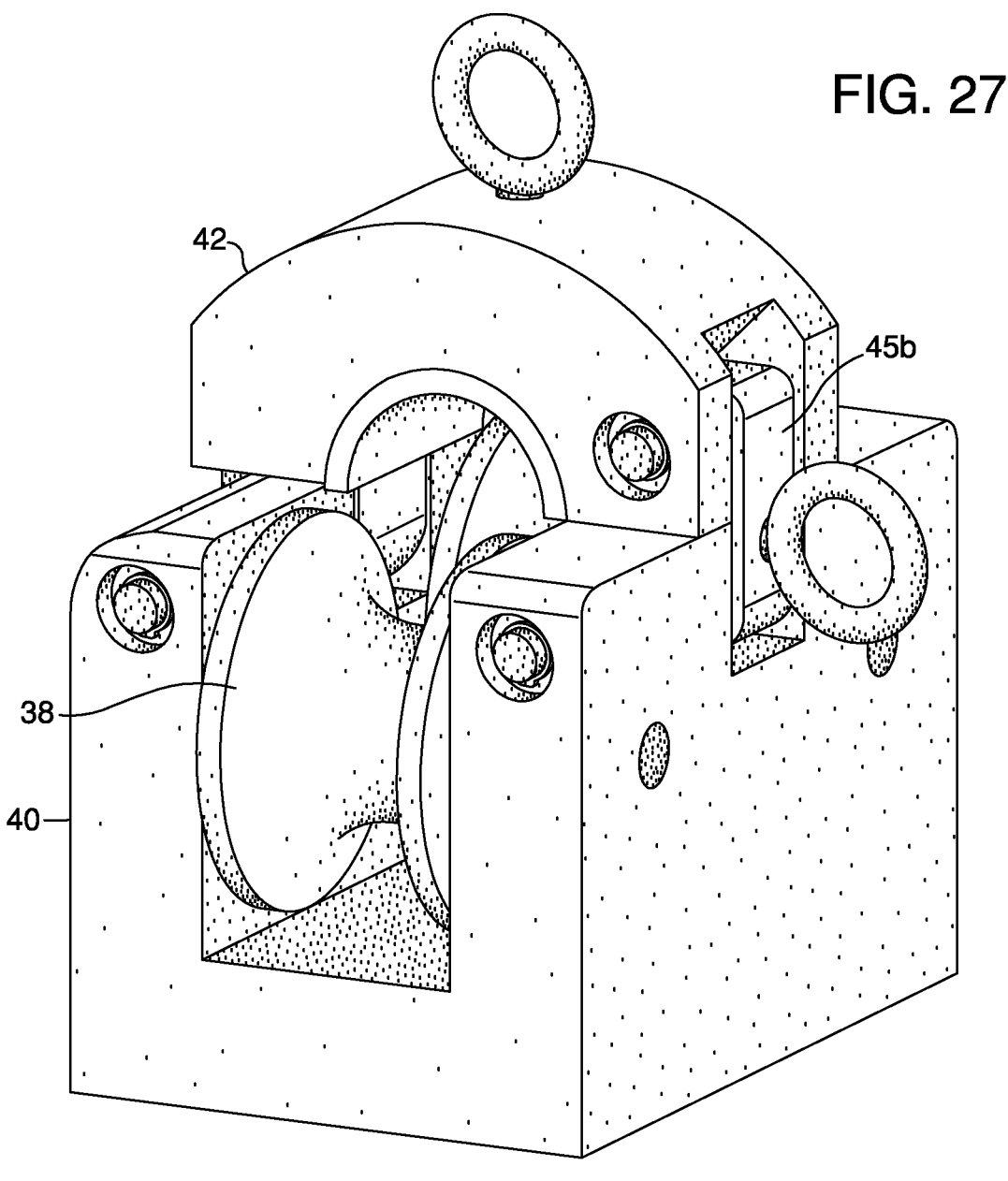

FIG. 27 is a perspective view of the conductor wire cage of FIG. 24, showing the wire cage door in a closed position with the latch closed securing the wire cage door.

Figure 28:
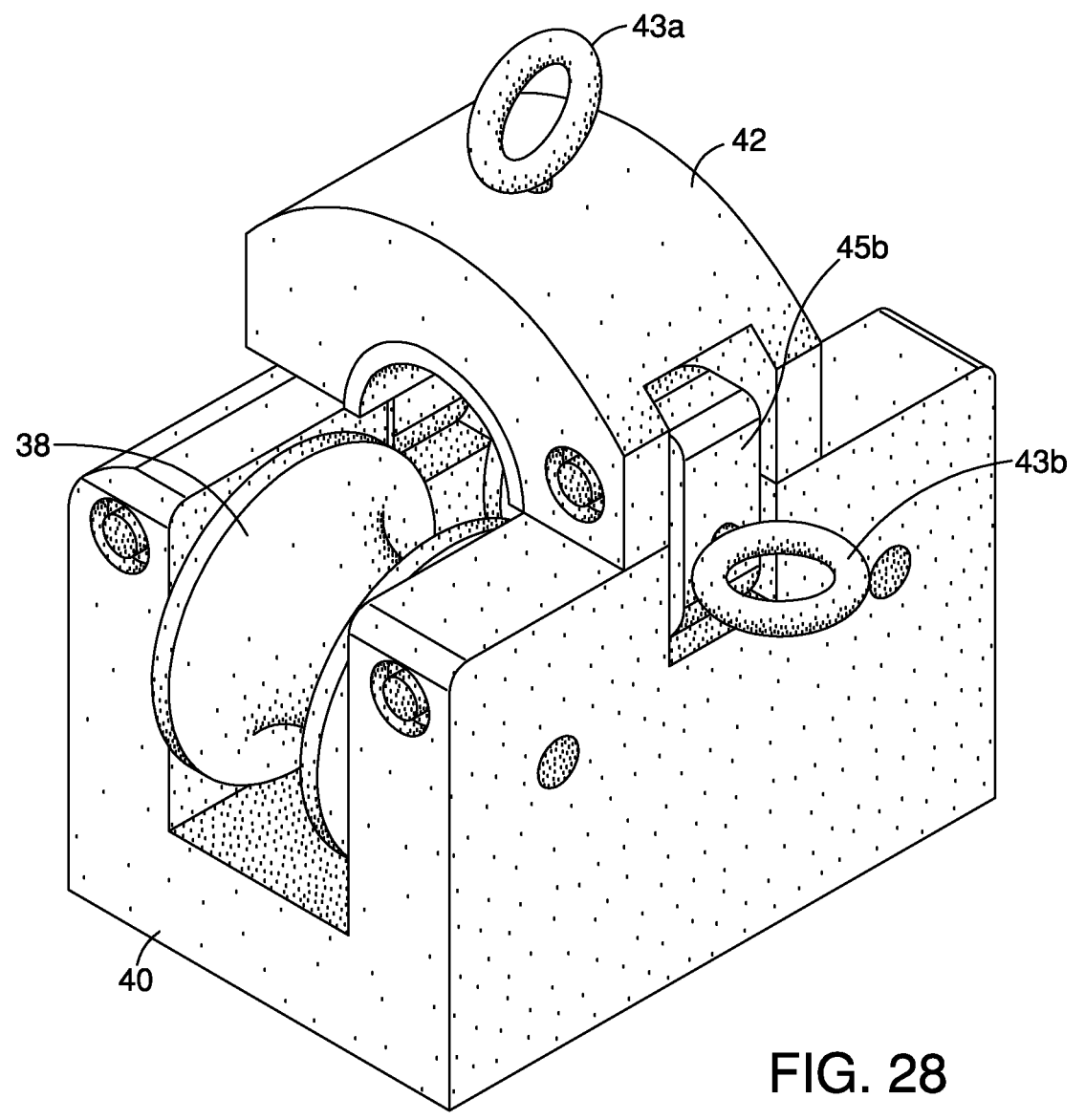

FIG. 28 is a perspective view of the conductor wire cage of FIG. 24, showing the wire cage door in a closed and latched position with the hotstick eyes rotated 90°, illustrating the rotation so as to ease the operation of the wire cage door with an insulated hotstick.

Figure 29:
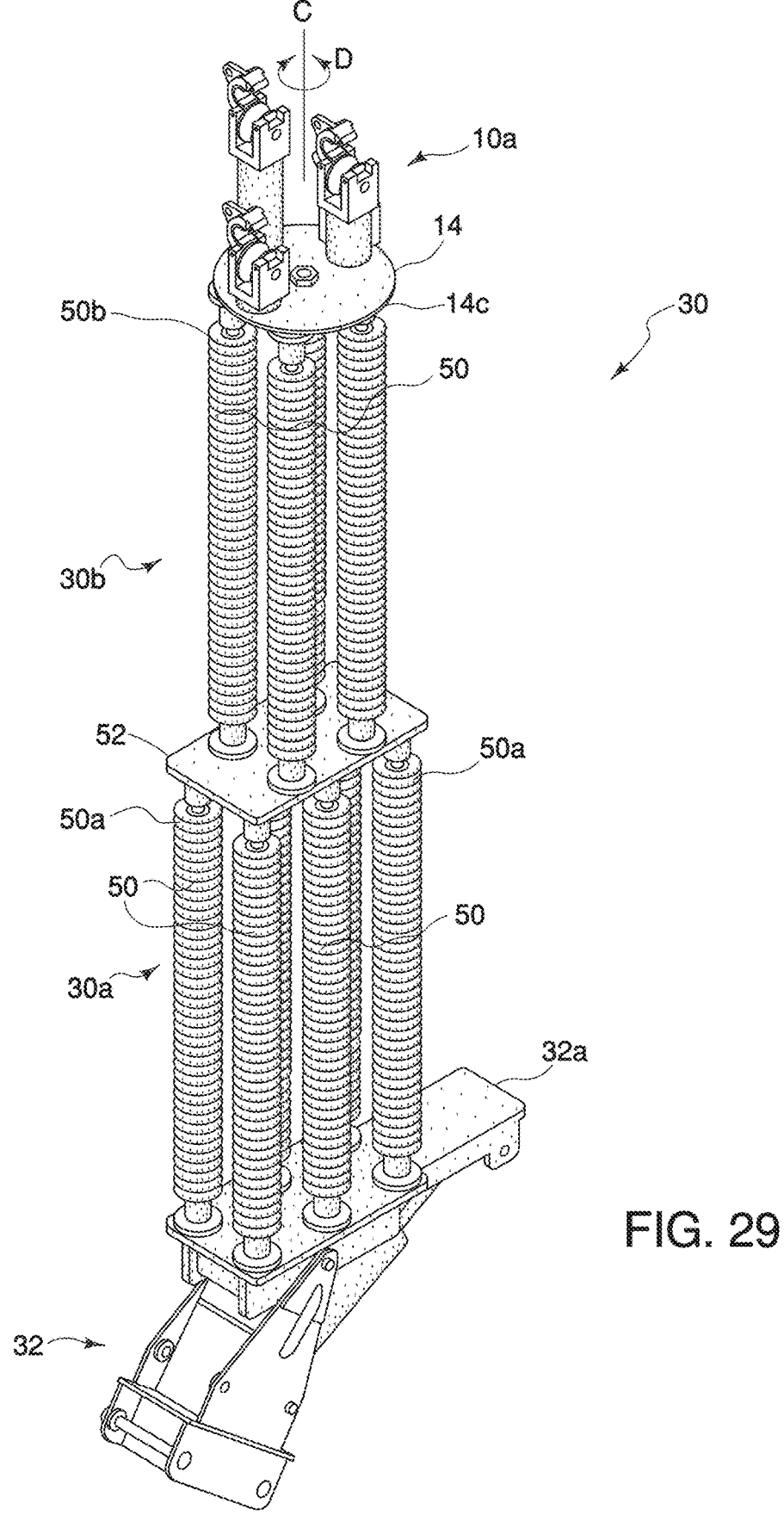

FIG. 29 is a perspective view of an embodiment of a single point lifter, supporting a three sub-conductor bundle lifter at a distal end of the lifter.

FIG. 30 is a side elevation view of the single point lifter of FIG. 29.

FIG. 31 is a front elevation view of the single point lifter of FIG. 29.

Figure 32:
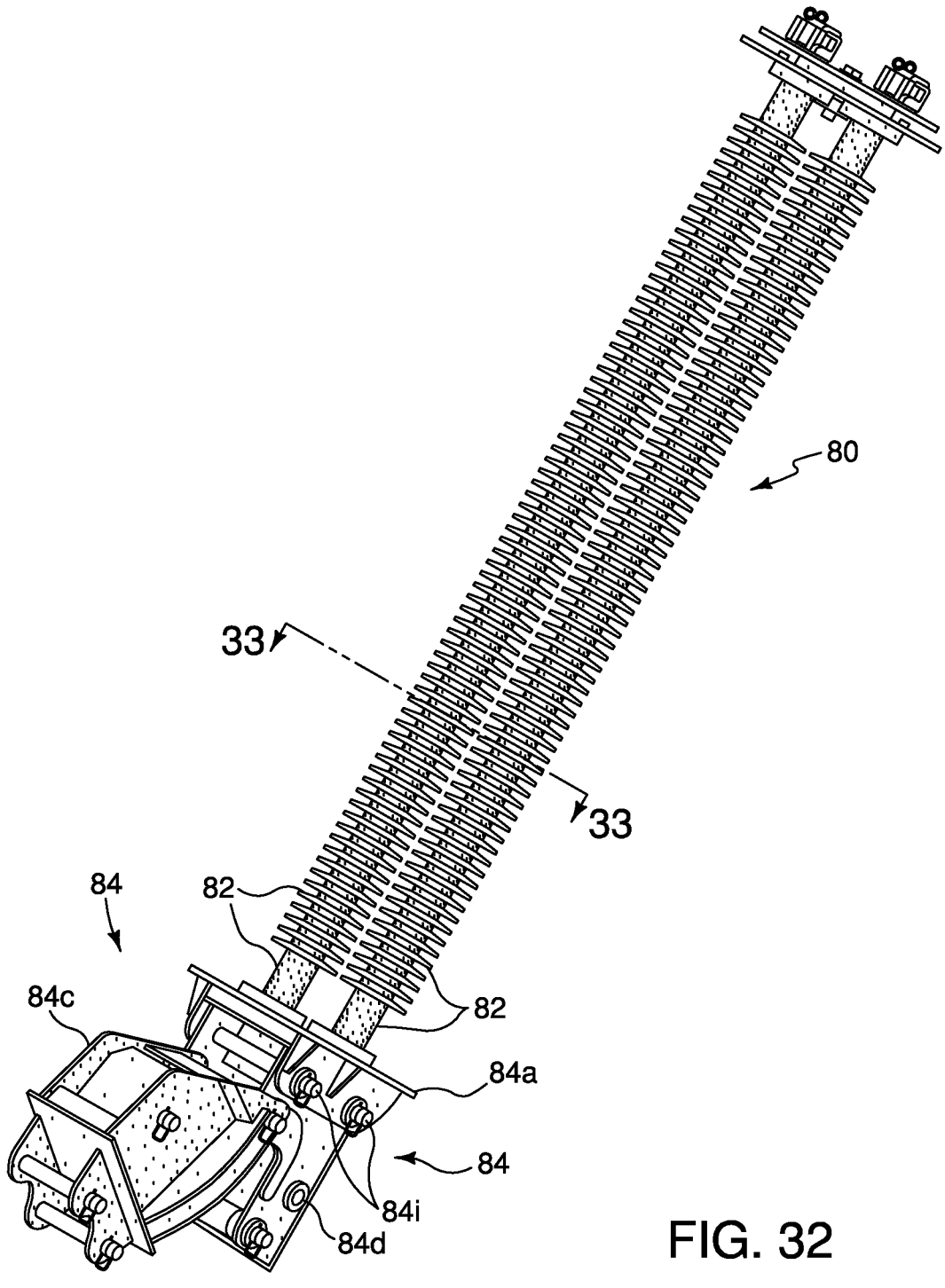

FIG. 32 is a perspective view of a further embodiment of a single point lifter in accordance with the present disclosure.

Figure 33:
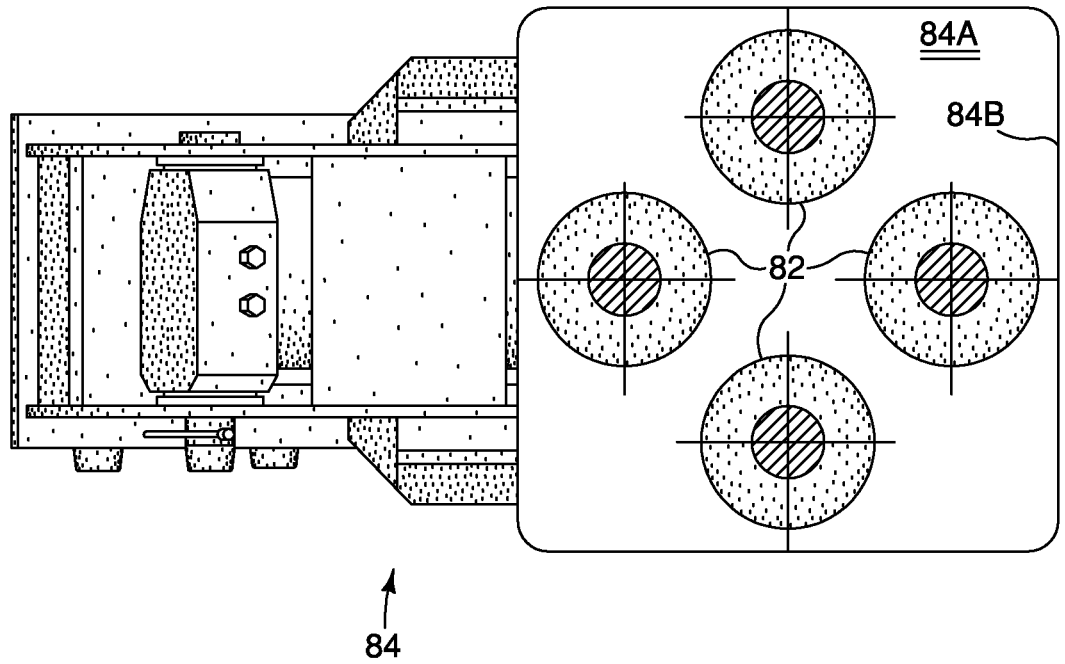

FIG. 33 is a top view illustrating the insulator arrangement along section line 33-33 in FIG. 32 of an embodiment of the single point lifter illustrated in FIG. 32.

Figure 34:
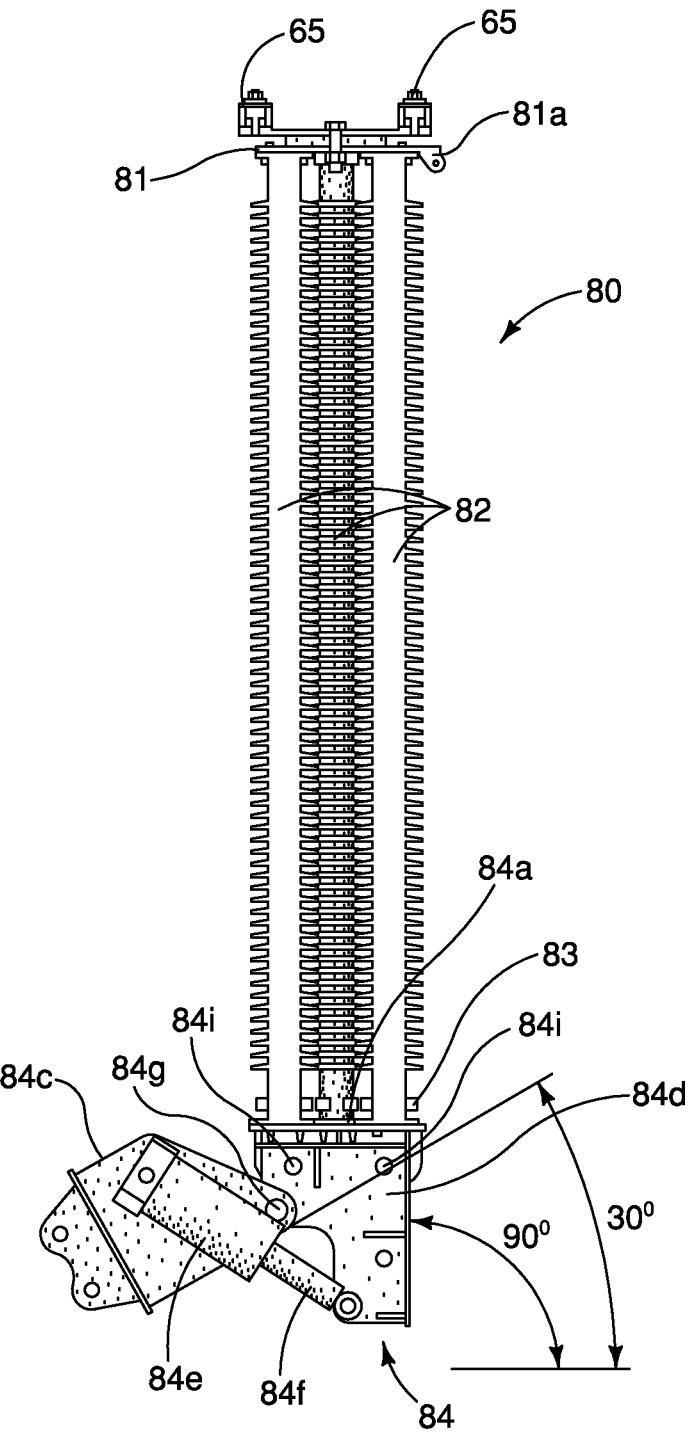

FIG. 34 is a side elevation view of an embodiment of a single point lifter, having an auxiliary lug and an insulator clamp plate, the insulators mounted to the top mount position of the lifter base adapter, with the boom adapter jib at 30° to the horizontal and the elongate insulators at 90° to the horizontal.

Figure 35:
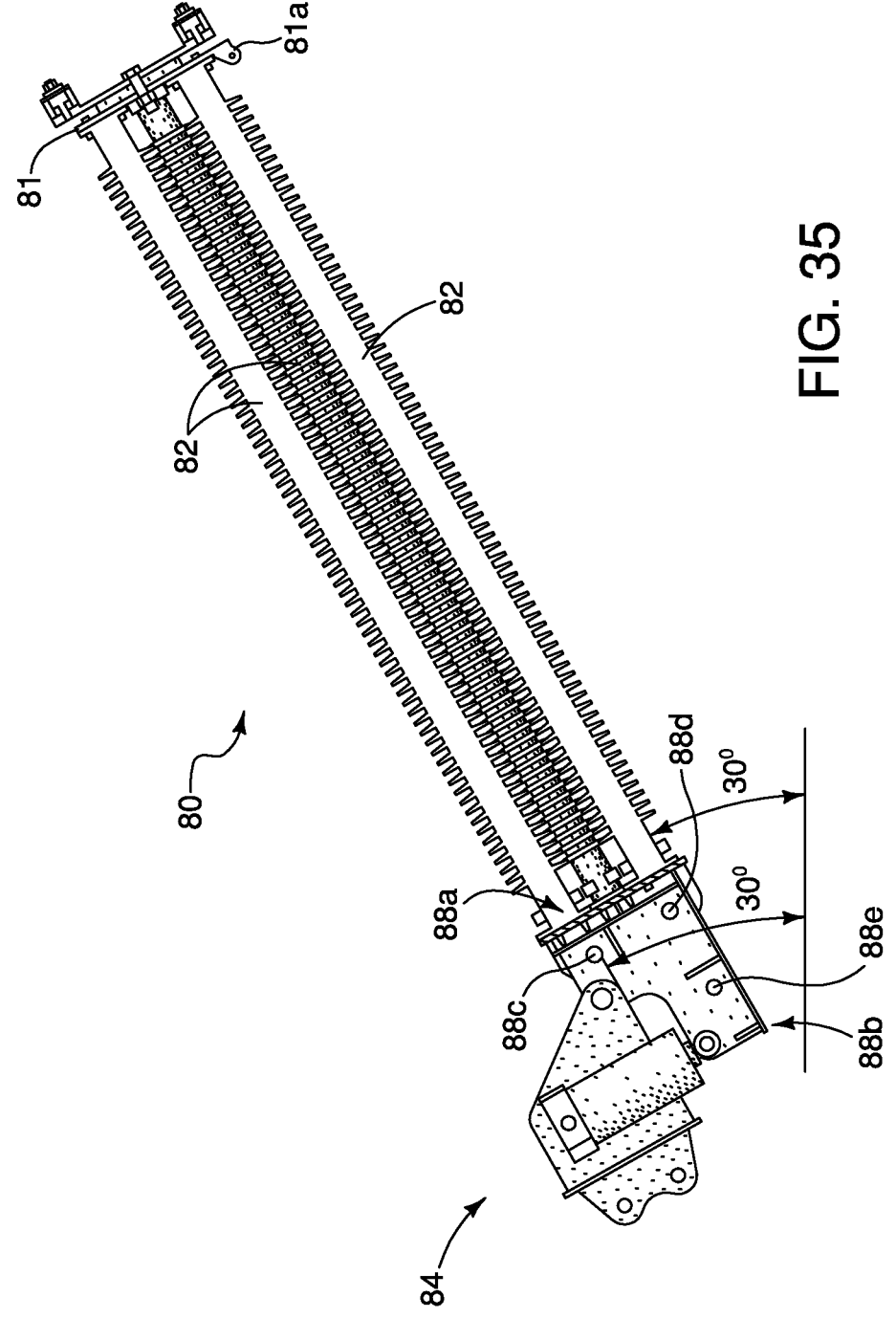

FIG. 35 is a side elevation view of the single point lifter of FIG. 34, the insulators mounted to the top mount position of the lifter base adapter, with the boom adapter jib at 30° to the horizontal and the elongate insulators at 30° to the horizontal.

Figure 36:
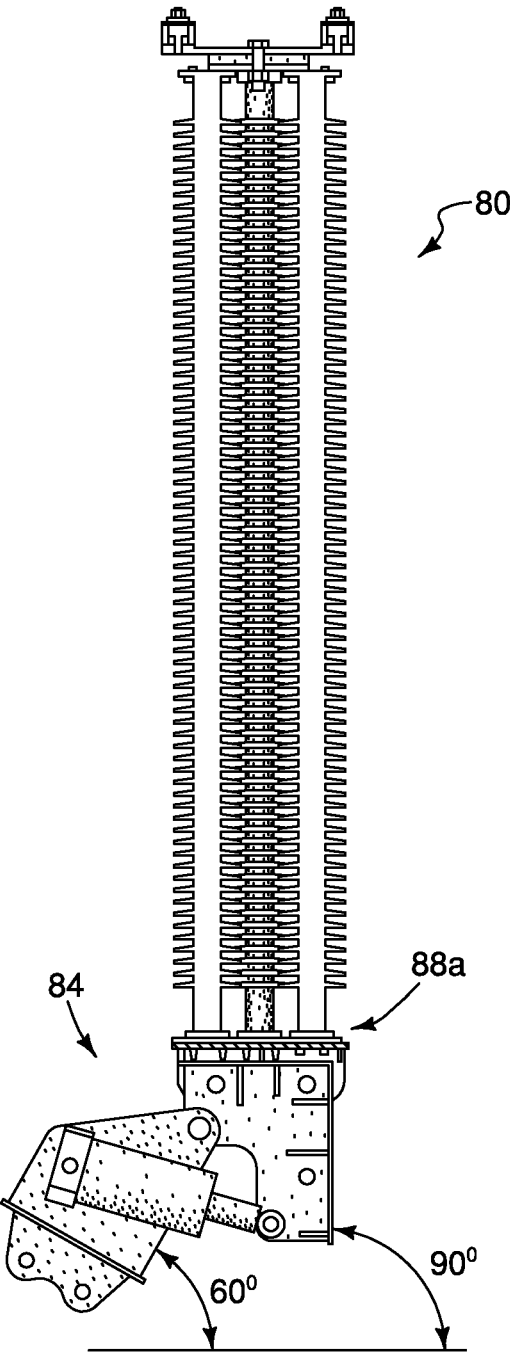

FIG. 36 is a side elevation view of the single point lifter of FIG. 32, the insulators mounted to the top mount position of the lifter base adapter, with the boom adapter jib at 60° to the horizontal and the elongate insulators at 90° to the horizontal.

Figure 37:
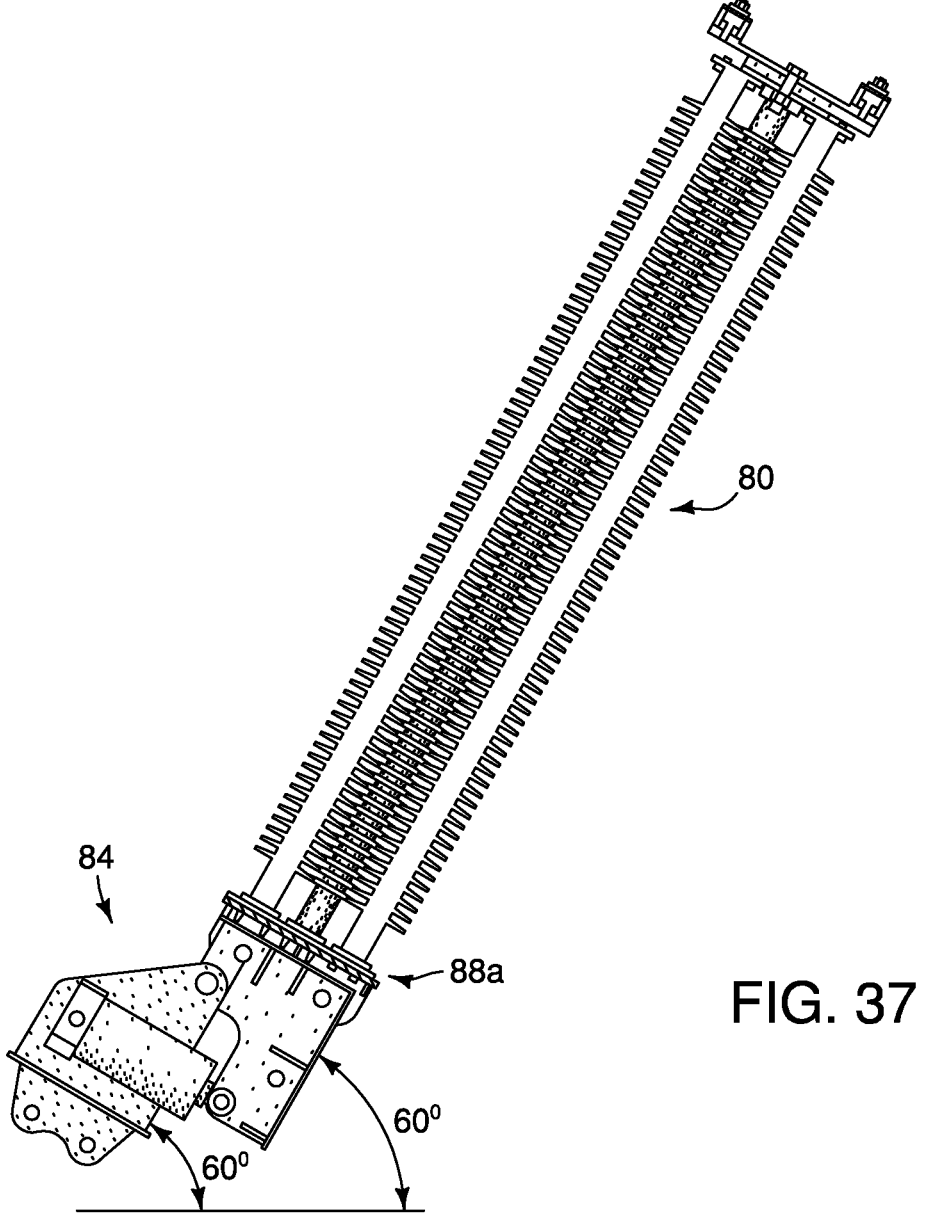

FIG. 37 is a side elevation view of the single point lifter of FIG. 32, the insulators mounted to the top mount position of the lifter base adapter, with the boom adapter jib at 60° to the horizontal and the elongate insulators at 60° to the horizontal.

Figure 38:
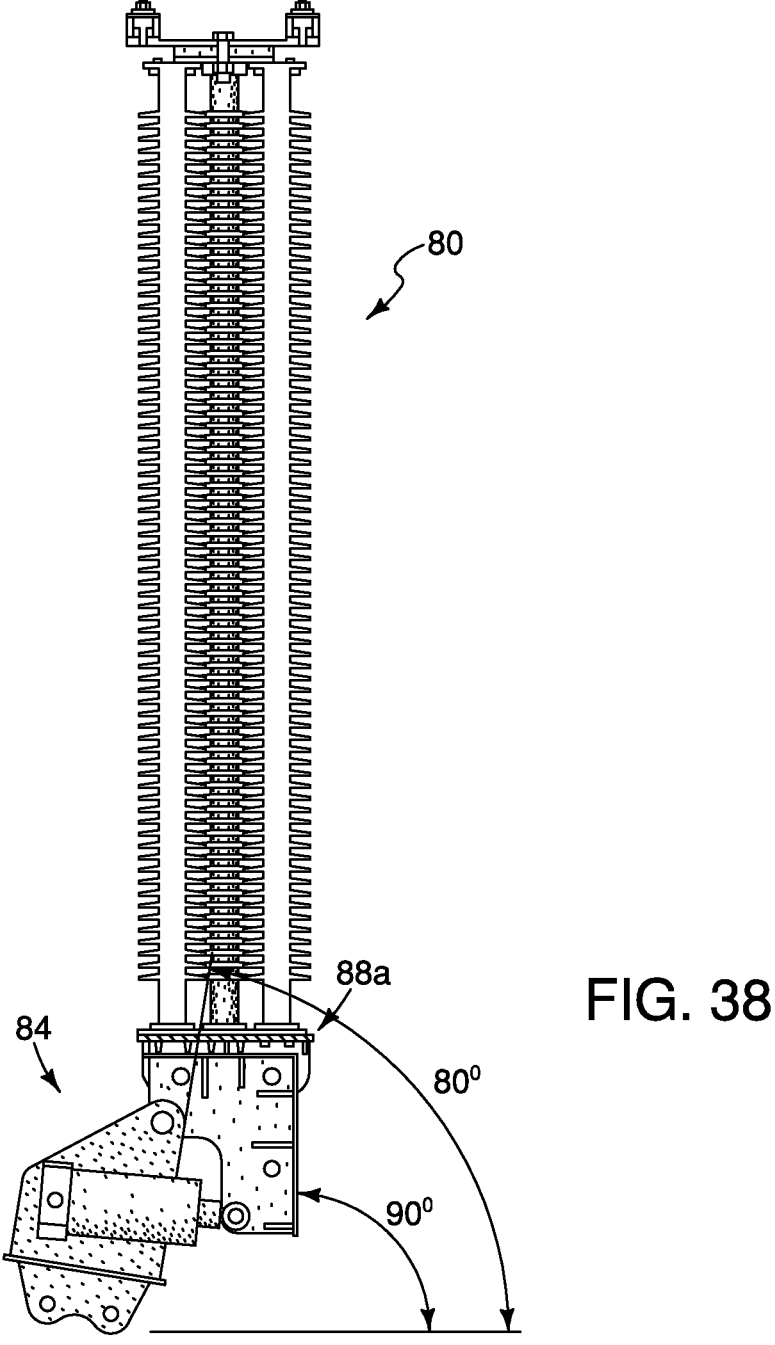

FIG. 38 is a side elevation view of the single point lifter of FIG. 32, the insulators mounted to the top mount position of the lifter base adapter, with the boom adapter jib at 80° to the horizontal and the elongate insulators at 90° to the horizontal.

Figure 39:
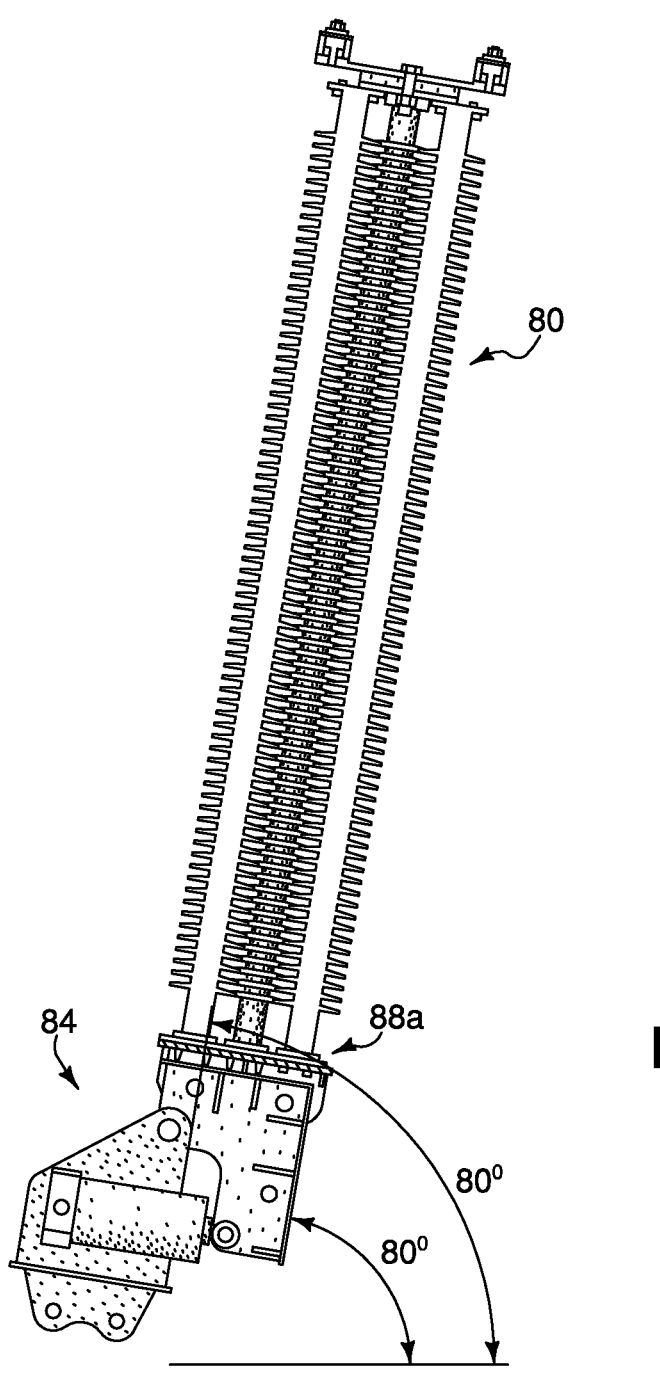

FIG. 39 is a side elevation view of the single point lifter of FIG. 32, the insulators mounted to the top mount position of the lifter base adapter, with the lifter base adapter at 80° to the horizontal and the elongate insulators at 80° to the horizontal.

Figure 40:
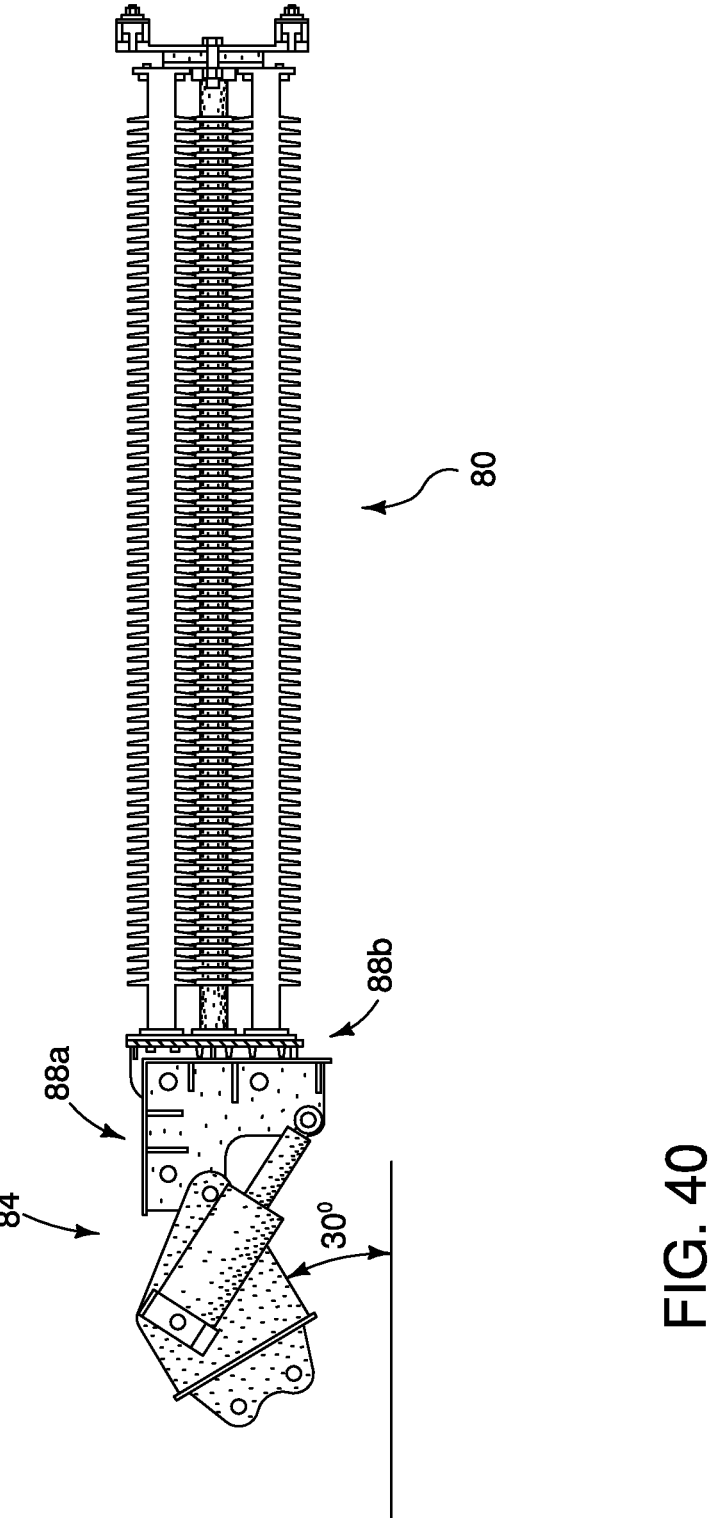

FIG. 40 is a side elevation view of the single point lifter of FIG. 32, the insulators mounted to the front mount position of the lifter base adapter, with the boom adapter jib at 30° to the horizontal and the elongate insulators at 0° to the horizontal.

Figure 41:
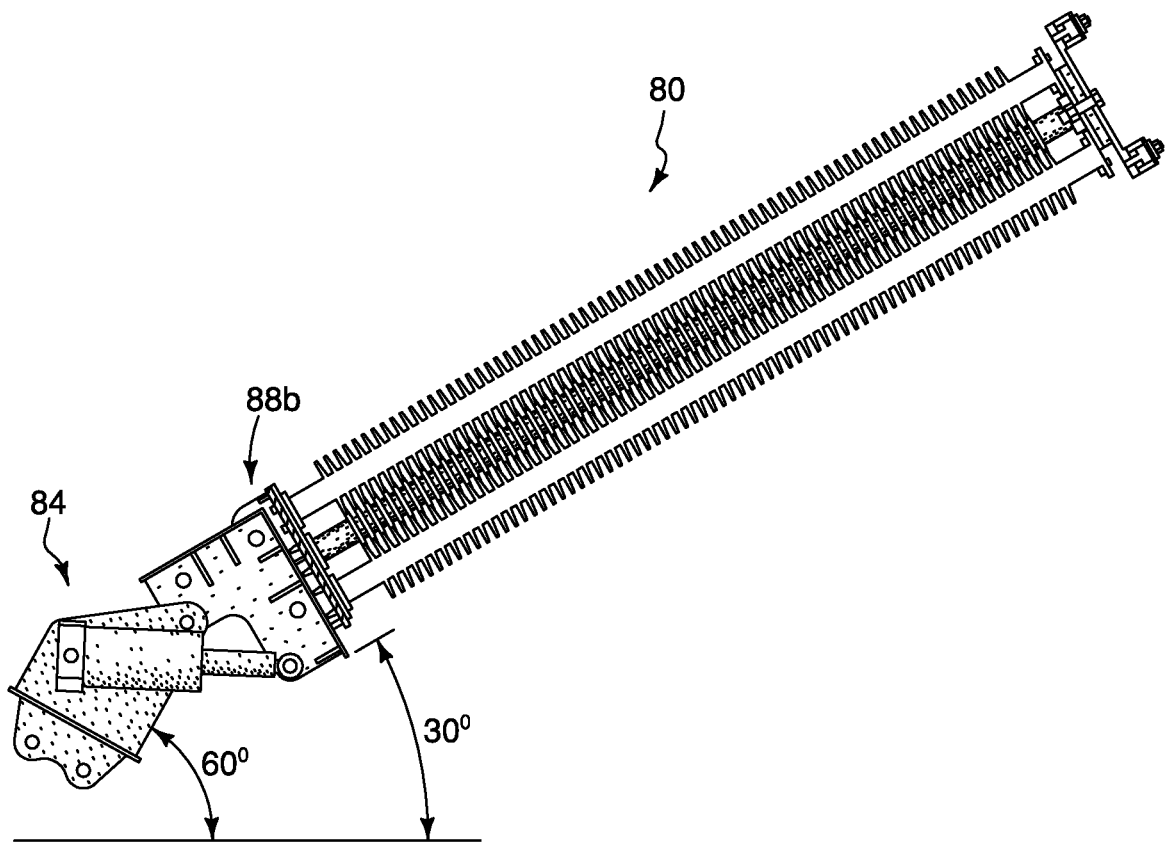

FIG. 41 is a side elevation view of the single point lifter of FIG. 32, the insulators mounted to the front mount position of the lifter base adapter, with the boom adapter jib at 60° to the horizontal and the elongate insulators at 30° to the horizontal.

Figure 42:
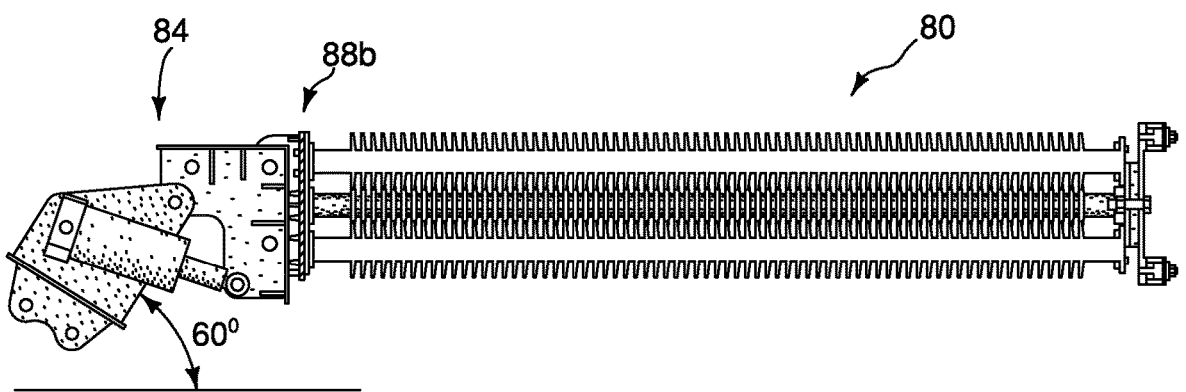

FIG. 42 is a side elevation view of the single point lifter of FIG. 32, the insulators mounted to the front mount position of the lifter base adapter, with the boom adapter jib at 60° to the horizontal and the elongate insulators at 0° to the horizontal.

Figure 43:
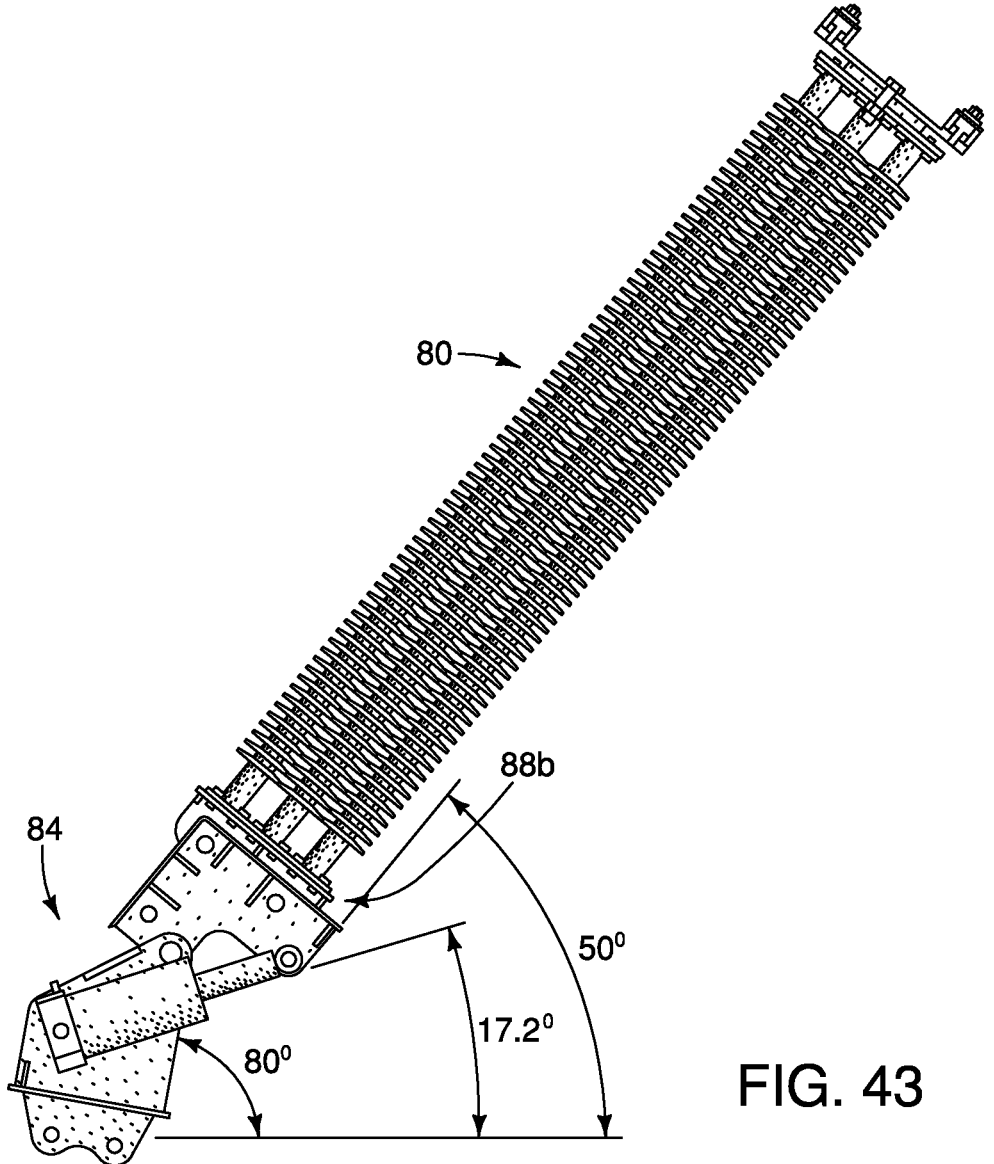

FIG. 43 is a side elevation view of the single point lifter of FIG. 32, the insulators mounted to the front mount position of the lifter base adapter, with the boom adapter jib at 80° to the horizontal and the elongate insulators at 50° to the horizontal.

Figure 44:
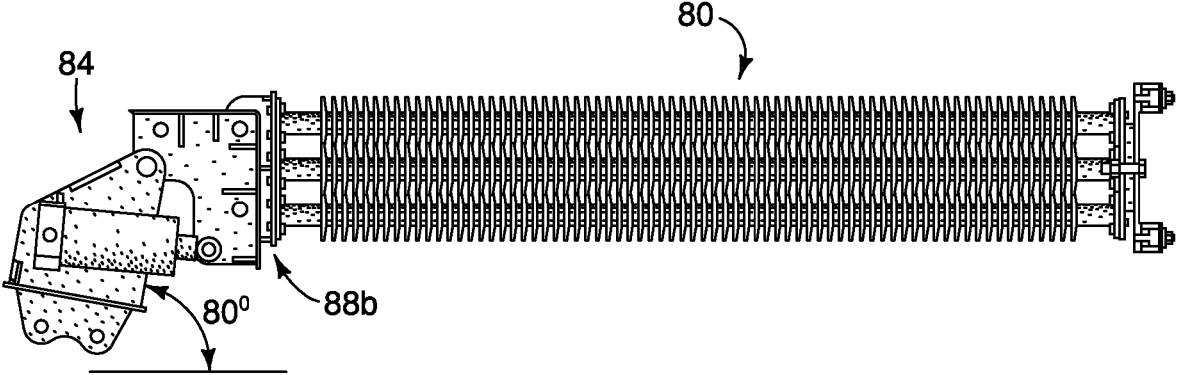

FIG. 44 is a side elevation view of the single point lifter of FIG. 32, the insulators mounted to the front mount position of the lifter base adapter, with the boom adapter jib at 80° to the horizontal and the elongate insulators at 0° to the horizontal.

Figure 45:
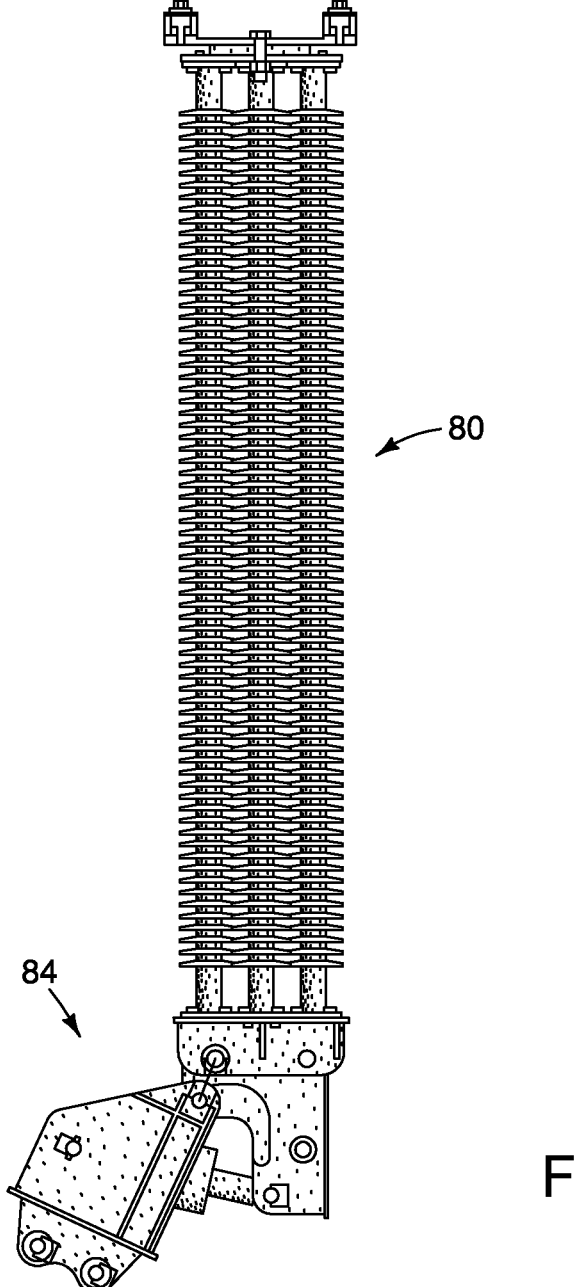

FIG. 45 is a side elevation view of the single point lifter of FIG. 32.

Figure 46:
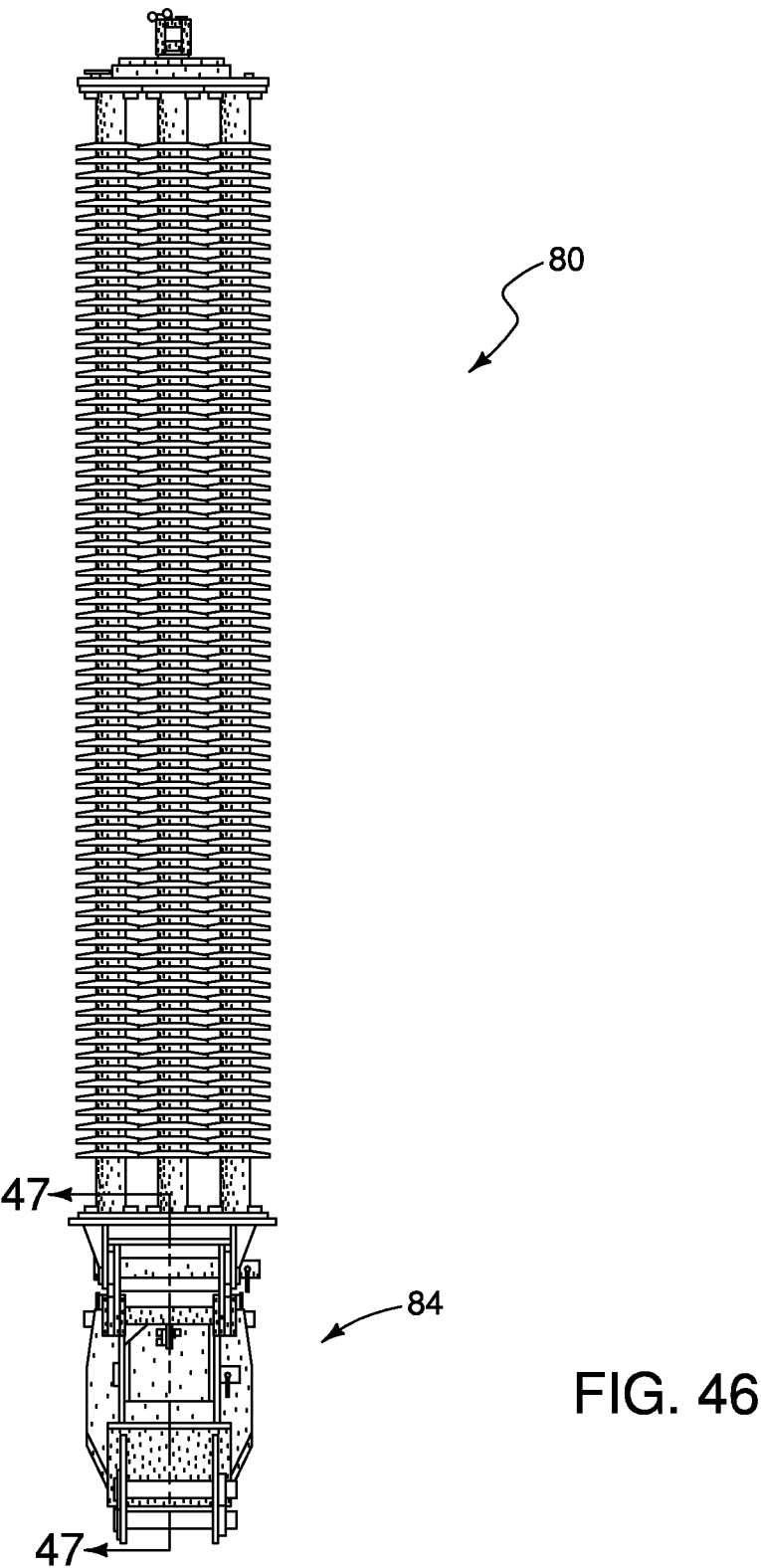

FIG. 46 is a rear elevation view of the single point lifter of FIG. 32.

Figure 47:
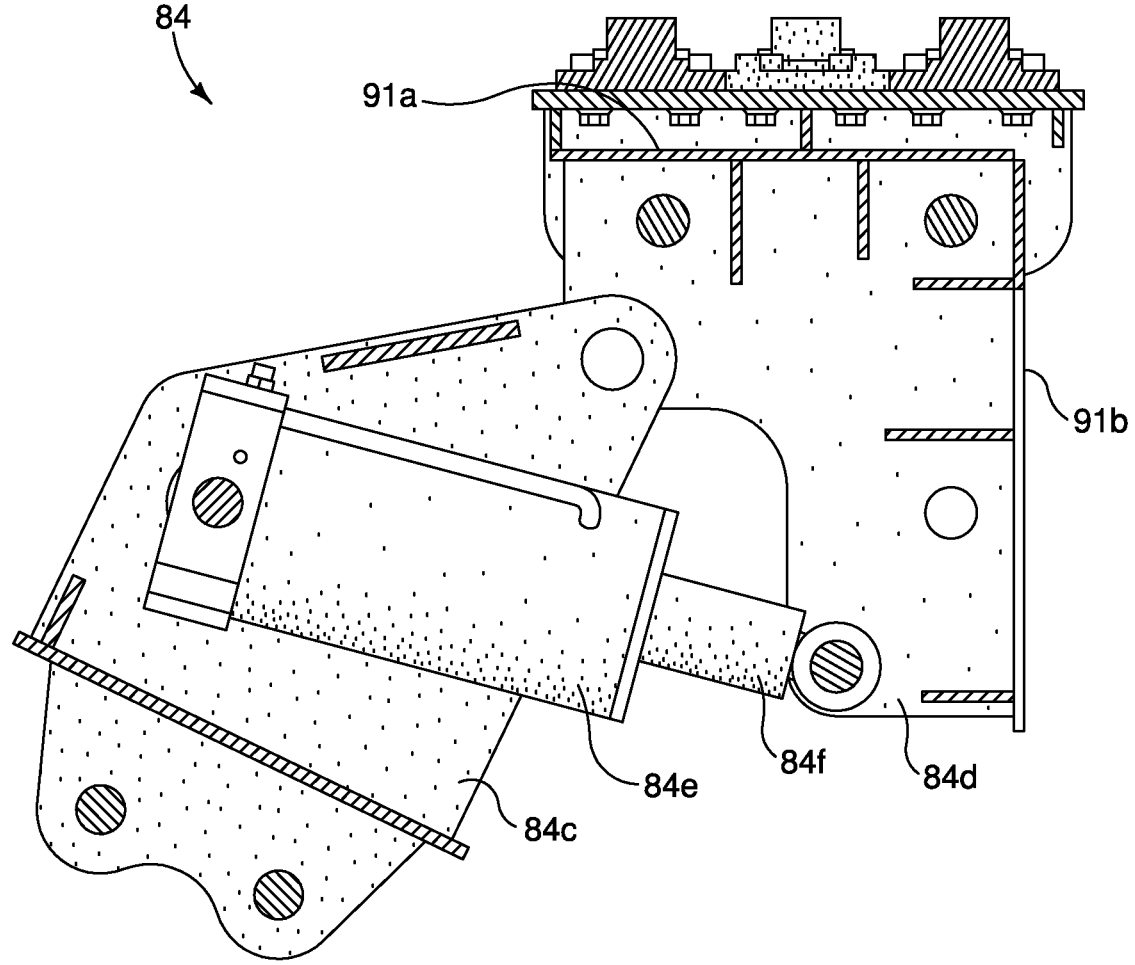

FIG. 47 is an enlarged partially cut away cross-sectional view of the single point lifter of FIG. 32, the cross section taken along line 47-47 of FIG. 46.

Figure 48:
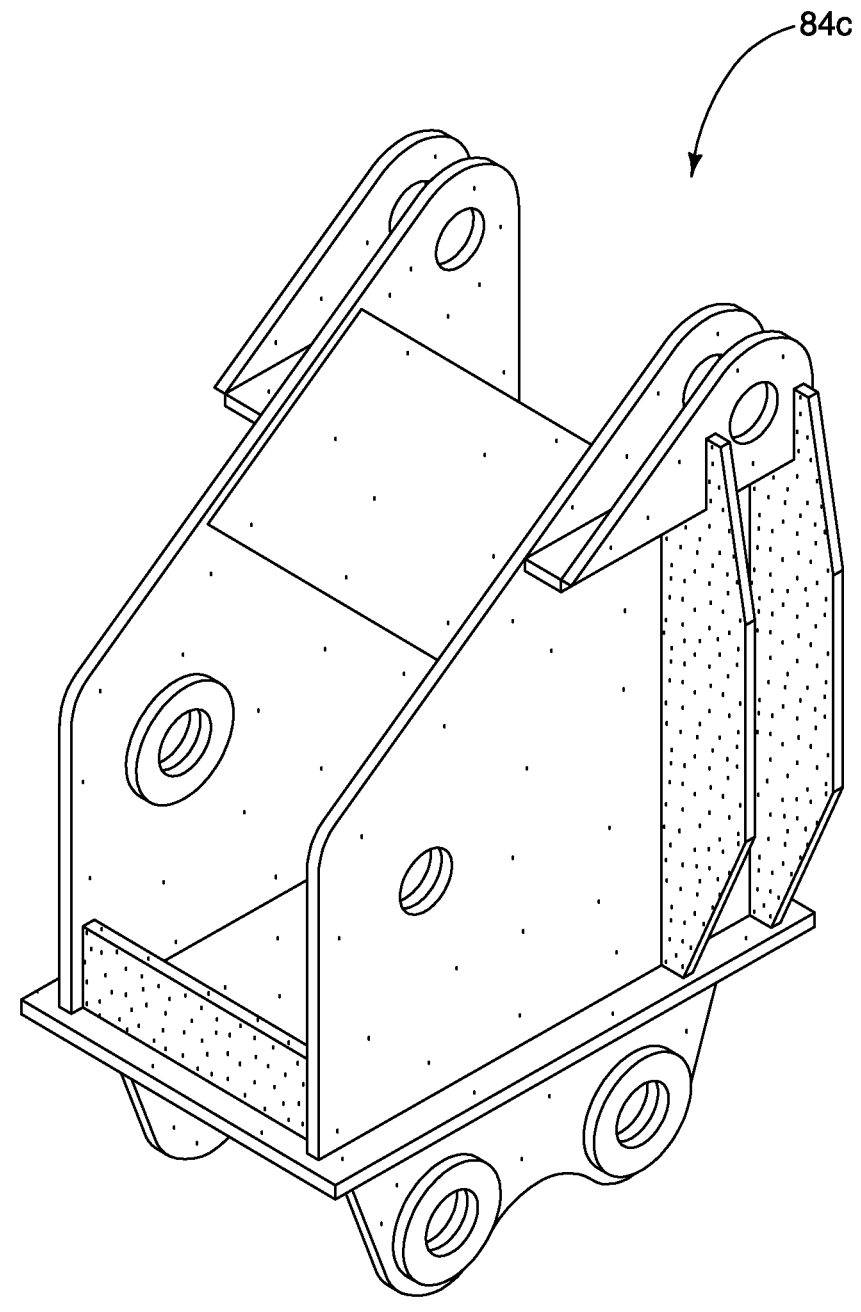

FIG. 48 is, in perspective view, the boom adapter shown in FIG. 45.

Figure 49:
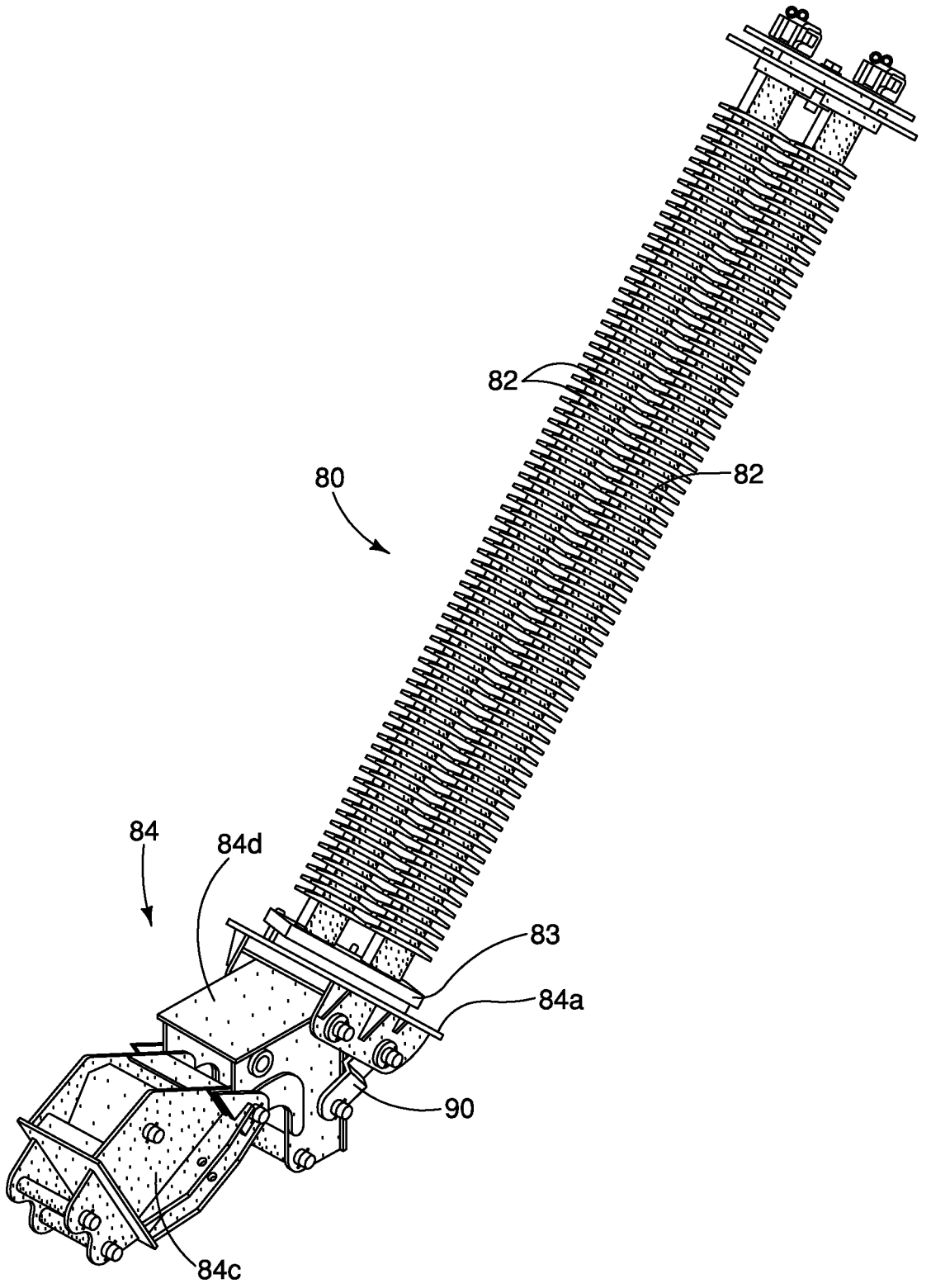

FIG. 49 is, in rear perspective view, the single point lifter of FIG. 34 showing the insulator base tilted upwardly 45 degrees by the use of an adapter link.

Figure 50:
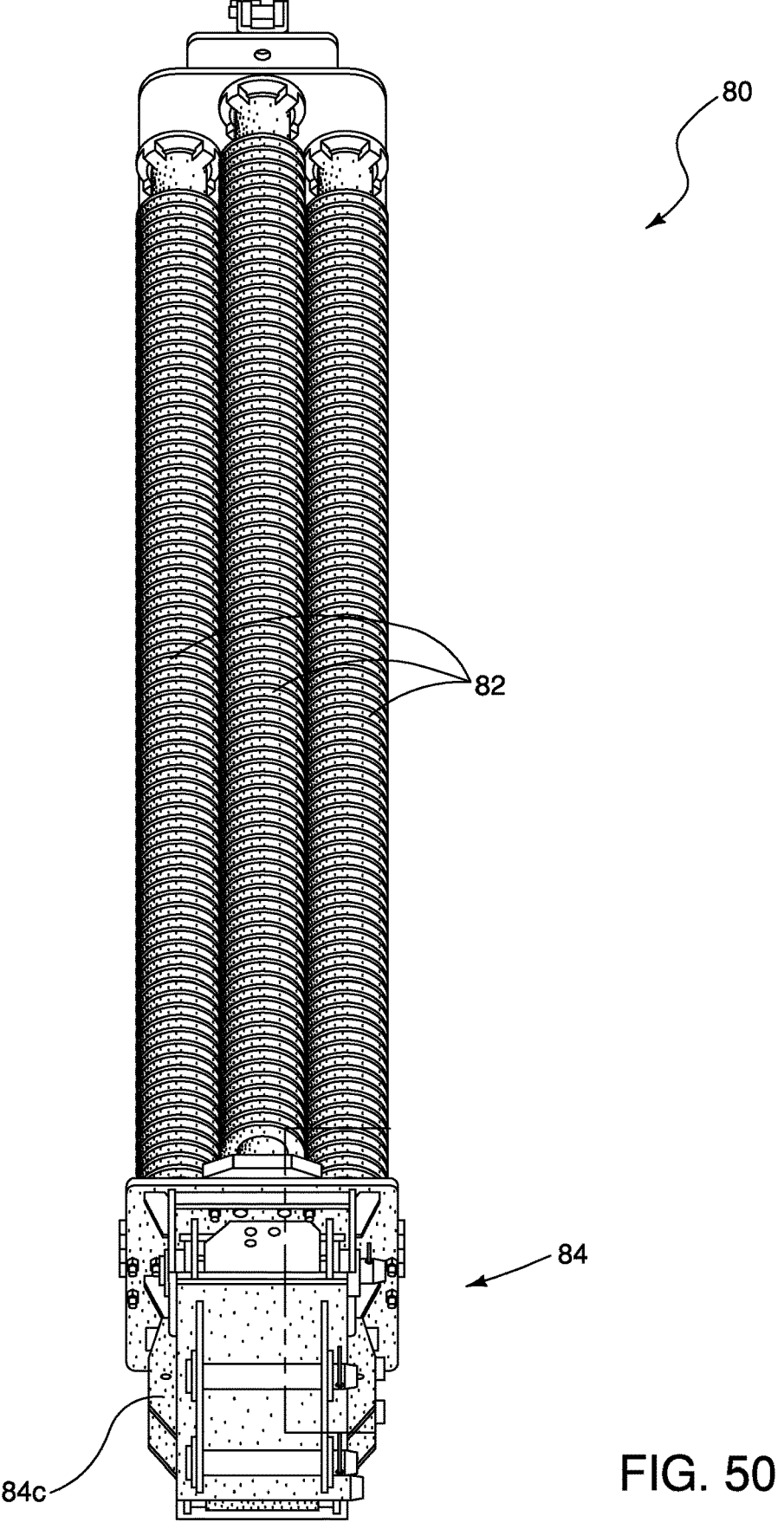

FIG. 50 is, in rear elevation view, the single point lifter of FIG. 46 showing the insulator base tilted using an adapter link.

Figure 51:
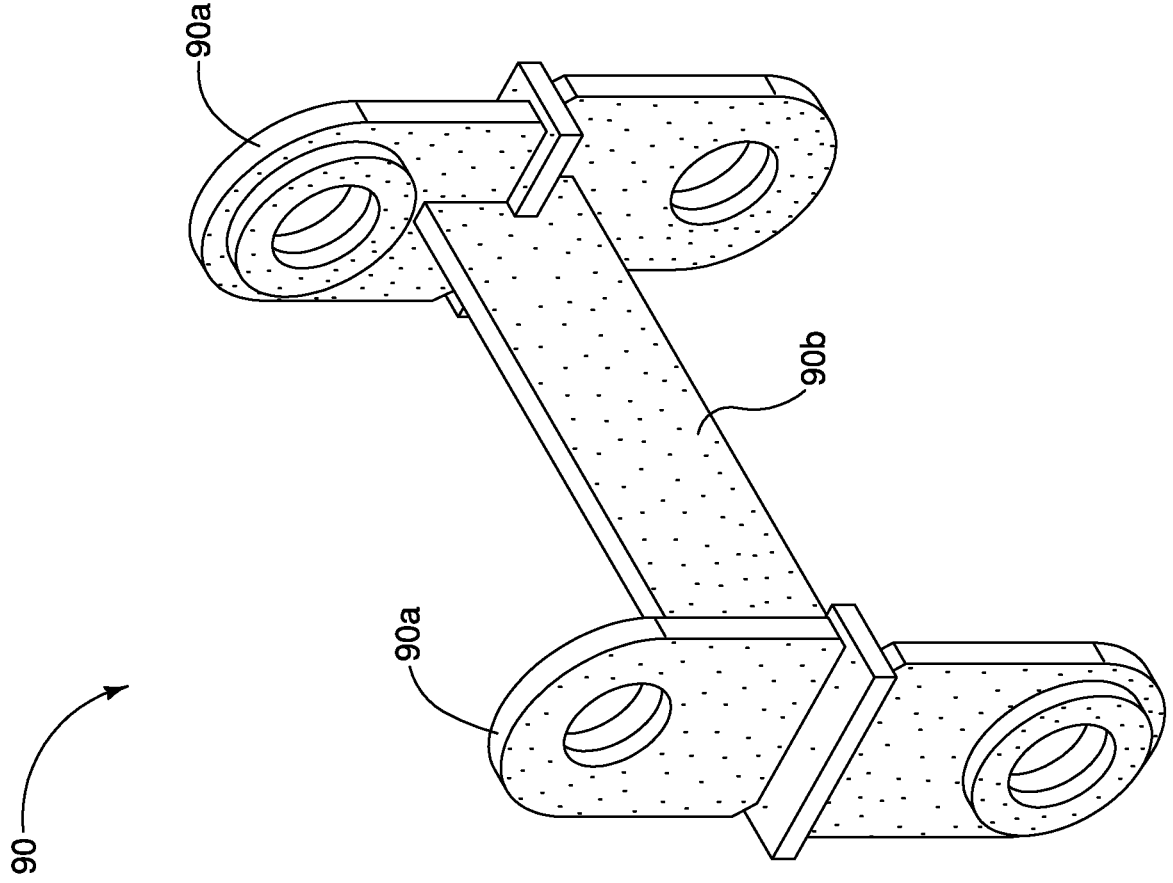

FIG. 51 is, in perspective view, an adapter link.

Figure 52:
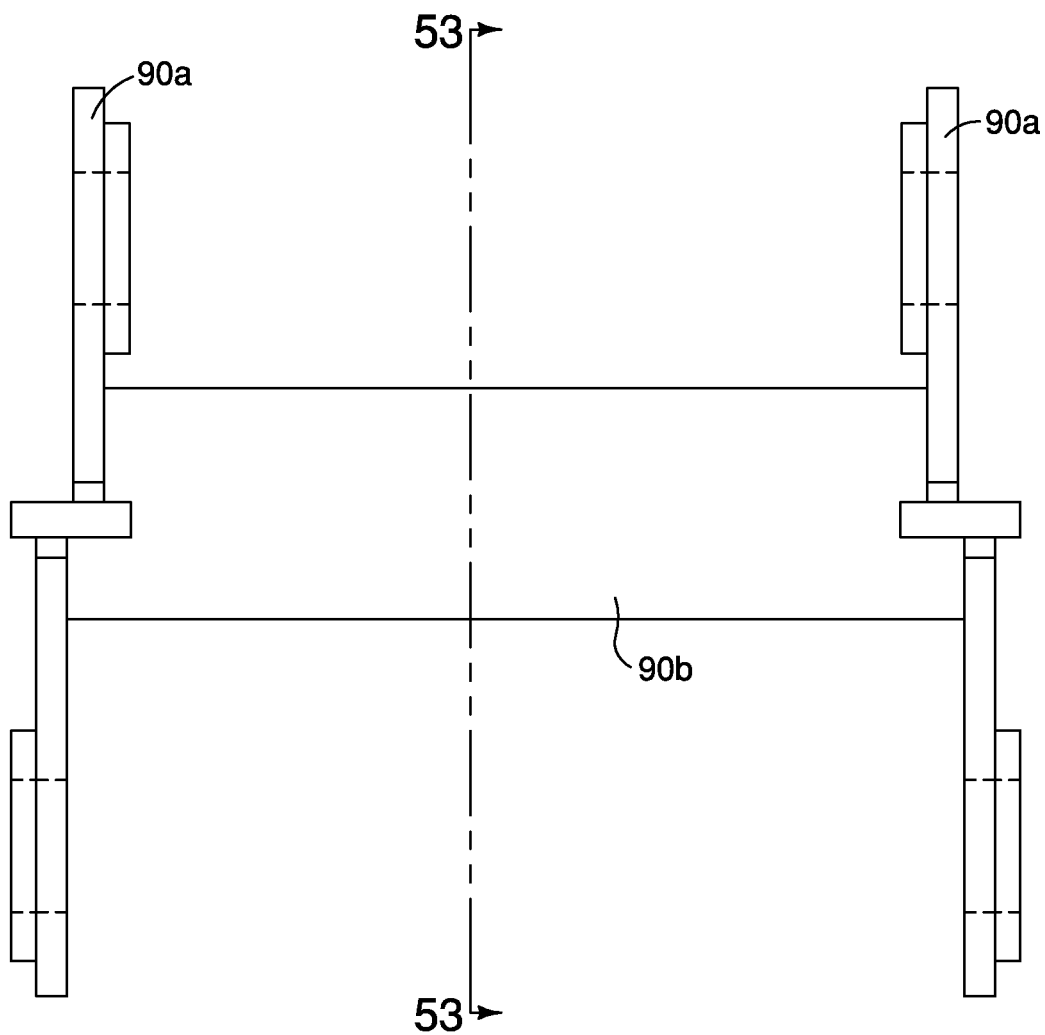

FIG. 52 is the adapter link of FIG. 51 in front elevation view.

Figure 53:
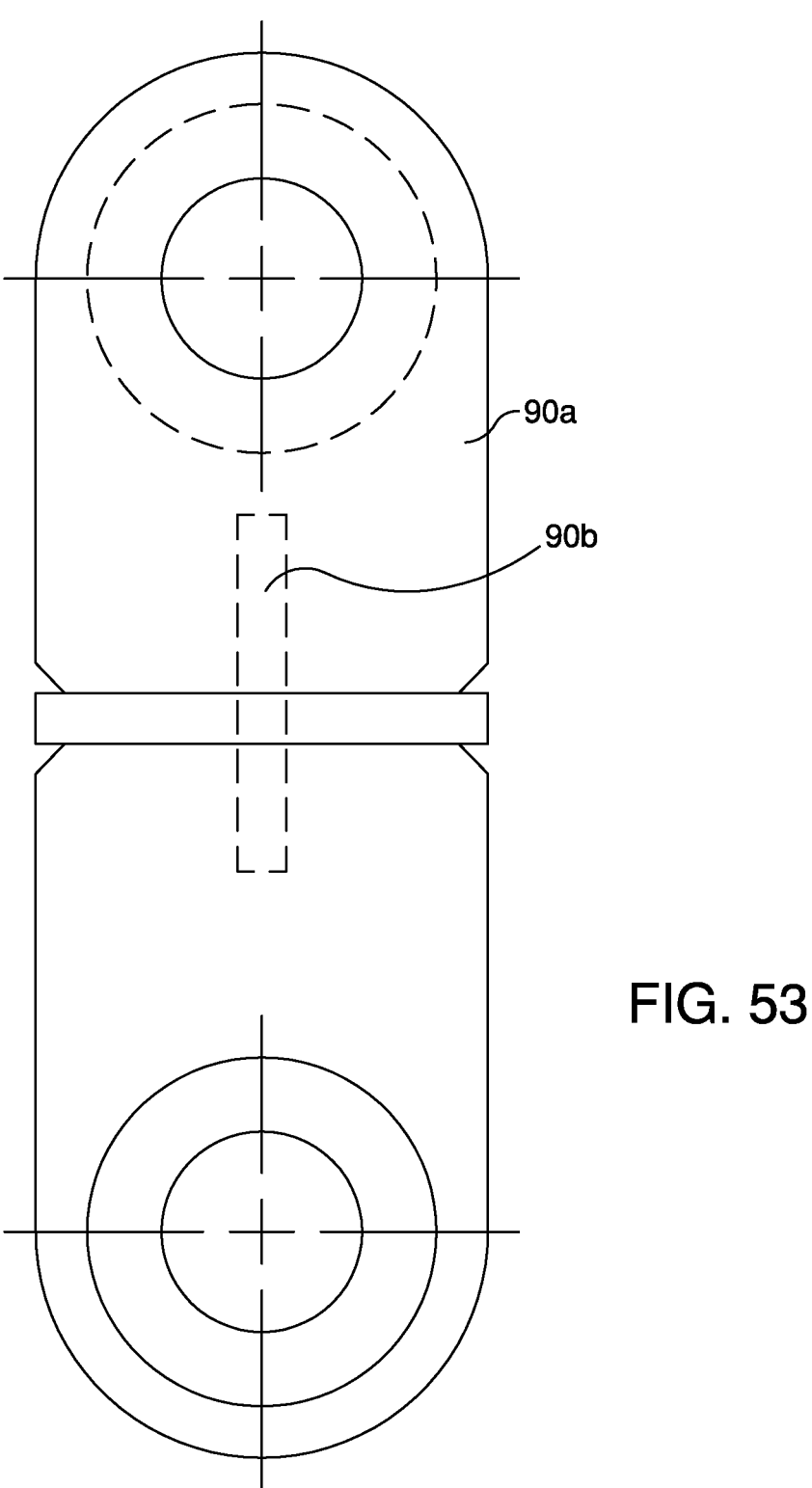

FIG. 53 is a cross-sectional view of the adapter link of FIG. 51 taken along line 53-53 of FIG. 52.

Figure 54:
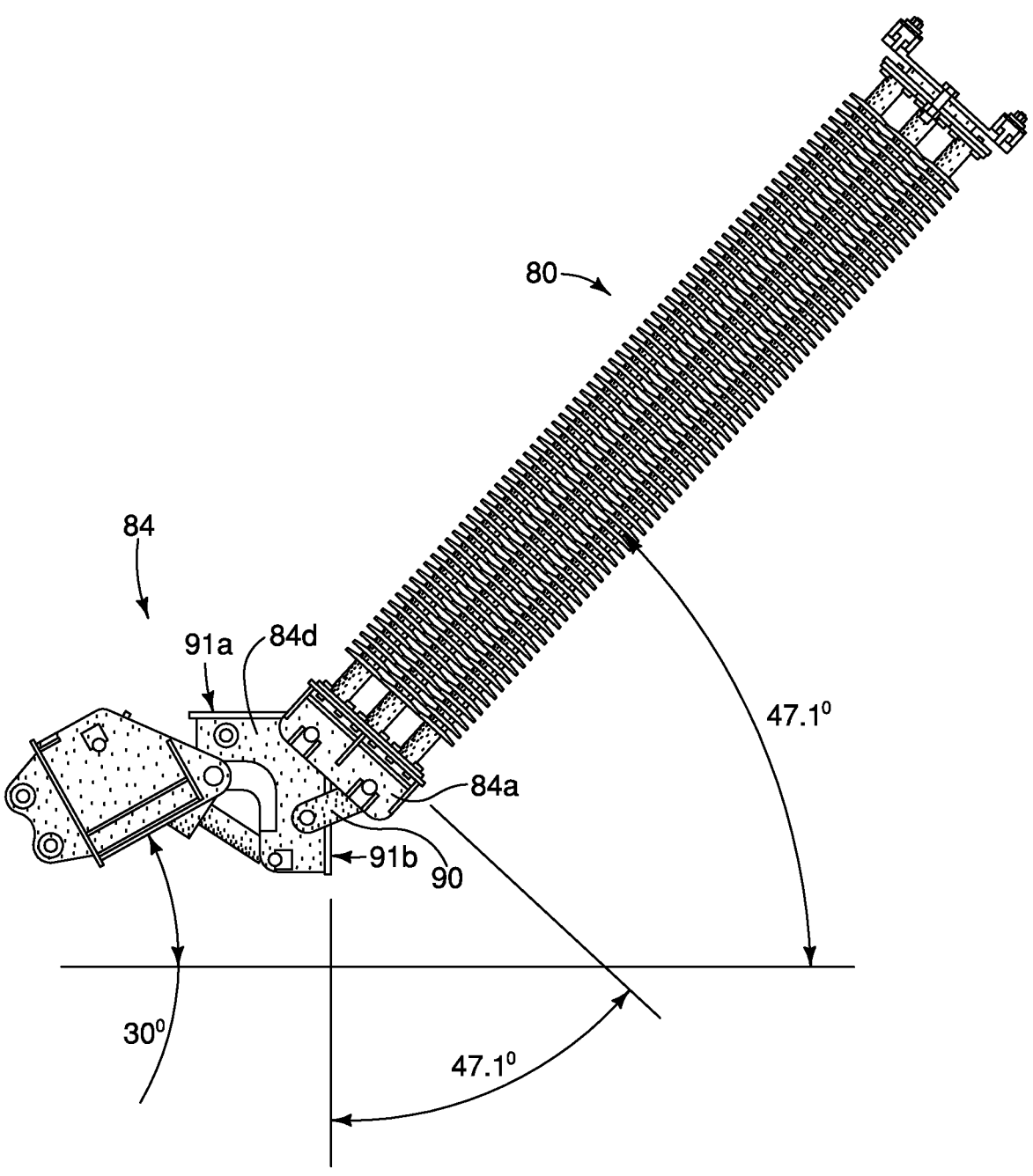

FIG. 54 is a side elevation view of the single point lifter of FIG. 45 showing the use of an adapter link to tilt the insulator base upwardly 45 degrees from the front mount position with a boom angle of 30 degrees and front mount at 90 degrees from horizontal.

Figure 55:
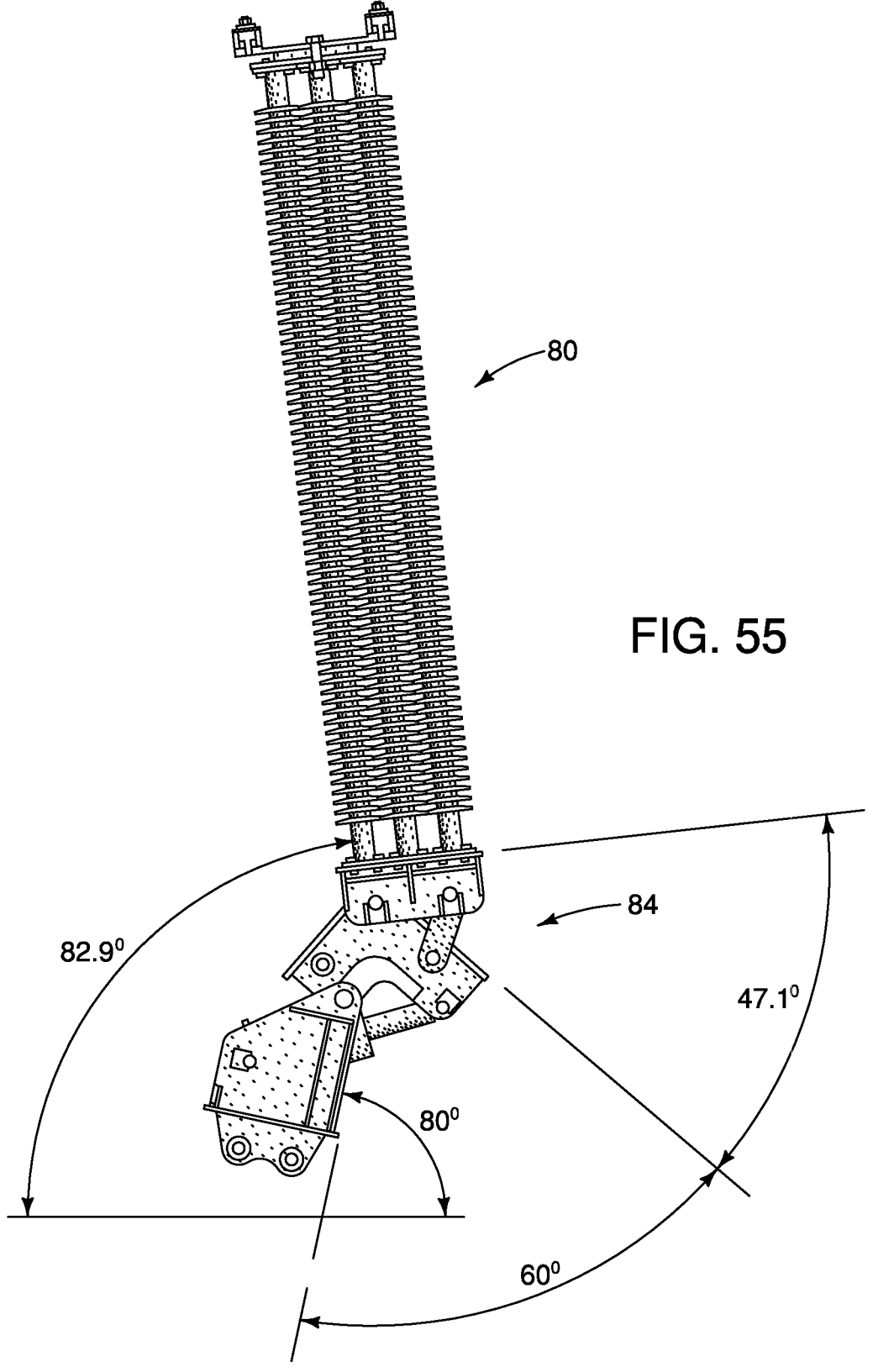

FIG. 55 is a side elevation view of the single point lifter of FIG. 45 showing the use of an adapter link to tilt the insulator base upwardly 45 degrees from the front mount position with a boom angle of 80 degrees and front mount at 30 degrees from horizontal.

Figure 56:
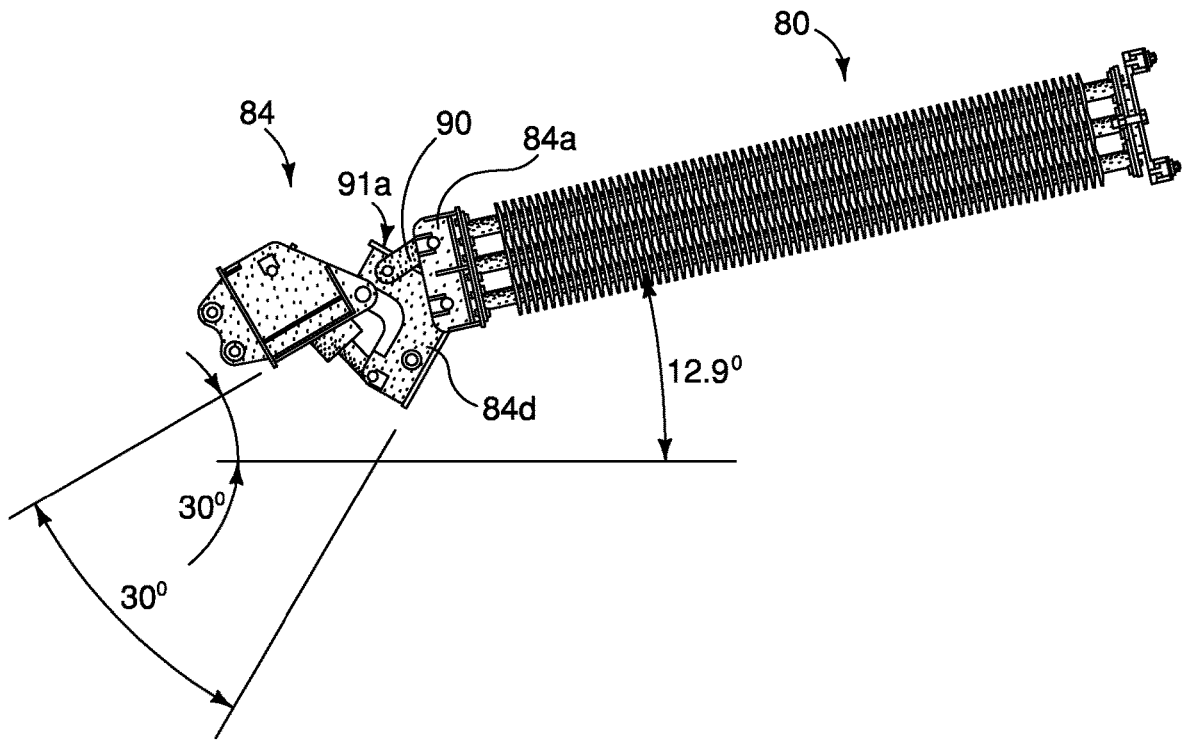

FIG. 56 is a side elevation view of the single point lifter of FIG. 45 showing the use of an adapter link to tilt the insulator base downwardly 45 degrees from the top mount position with a boom angle of 30 degrees and front mount at 30 degrees from horizontal.

Figure 57:
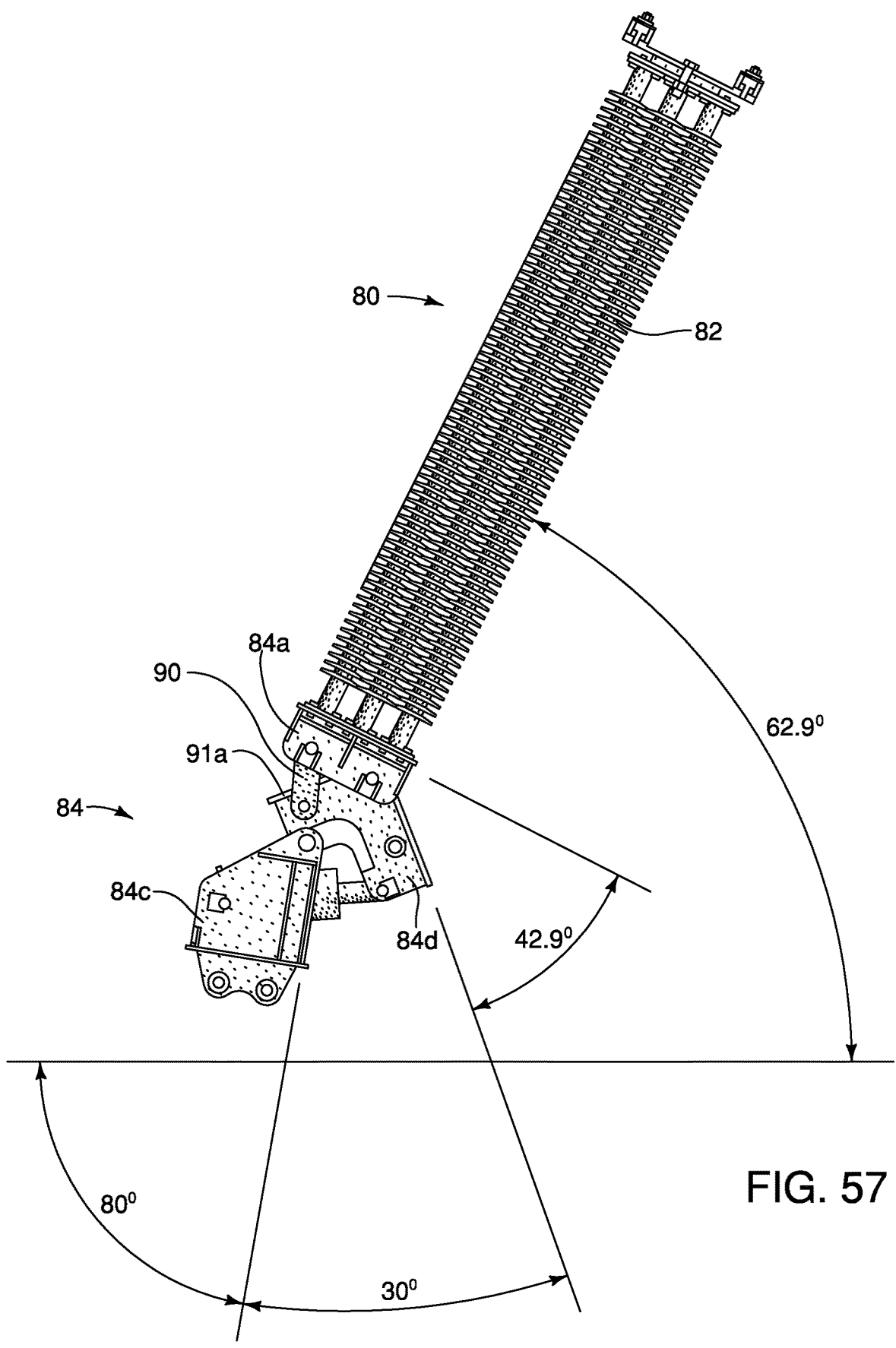

FIG. 57 is a side elevation view of the single point lifter of FIG. 45 showing the use of an adapter link to tilt the insulator base downwardly 45 degrees from the top mount position with a boom angle of 80 degrees and front mount at 30 degrees from the boom adapter.

Figure 58:
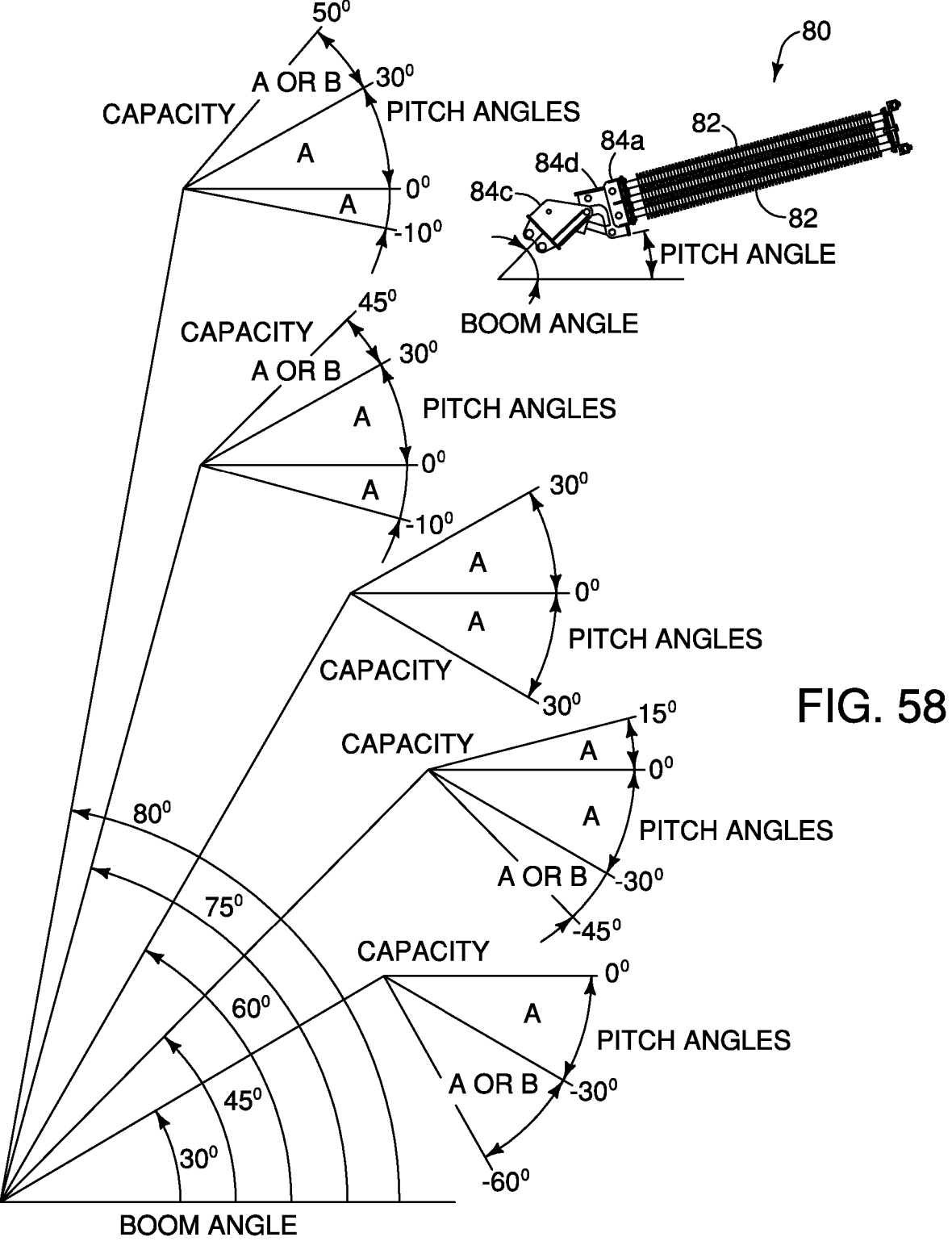

FIG. 58 illustrates the pitch and boom angles for the single point lifter of FIG. 45 in a front mount configuration.

Figure 59:
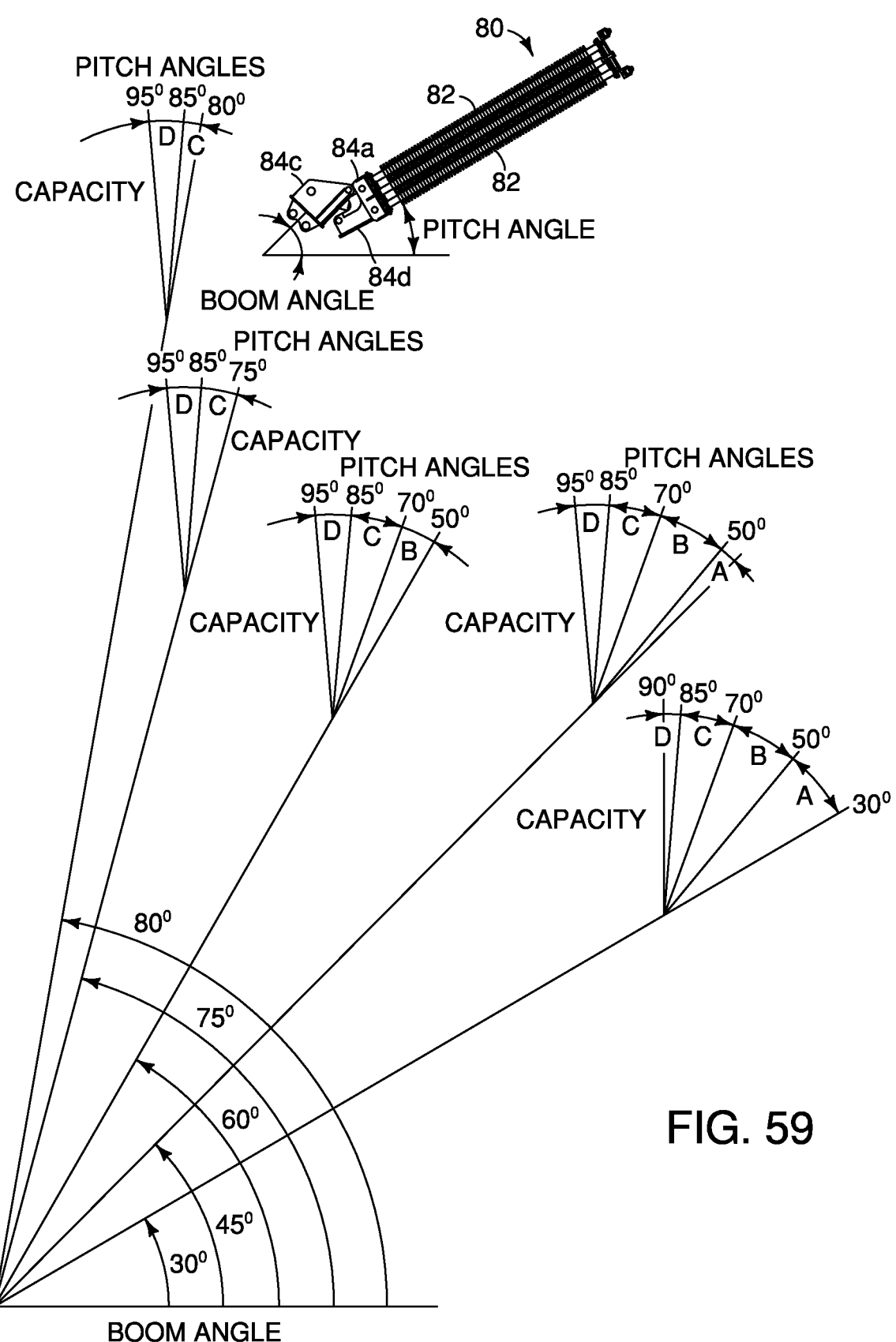

FIG. 59 illustrates the pitch and boom angles for the single point lifter of FIG. 45 in a top mount configuration.

Figure 60:
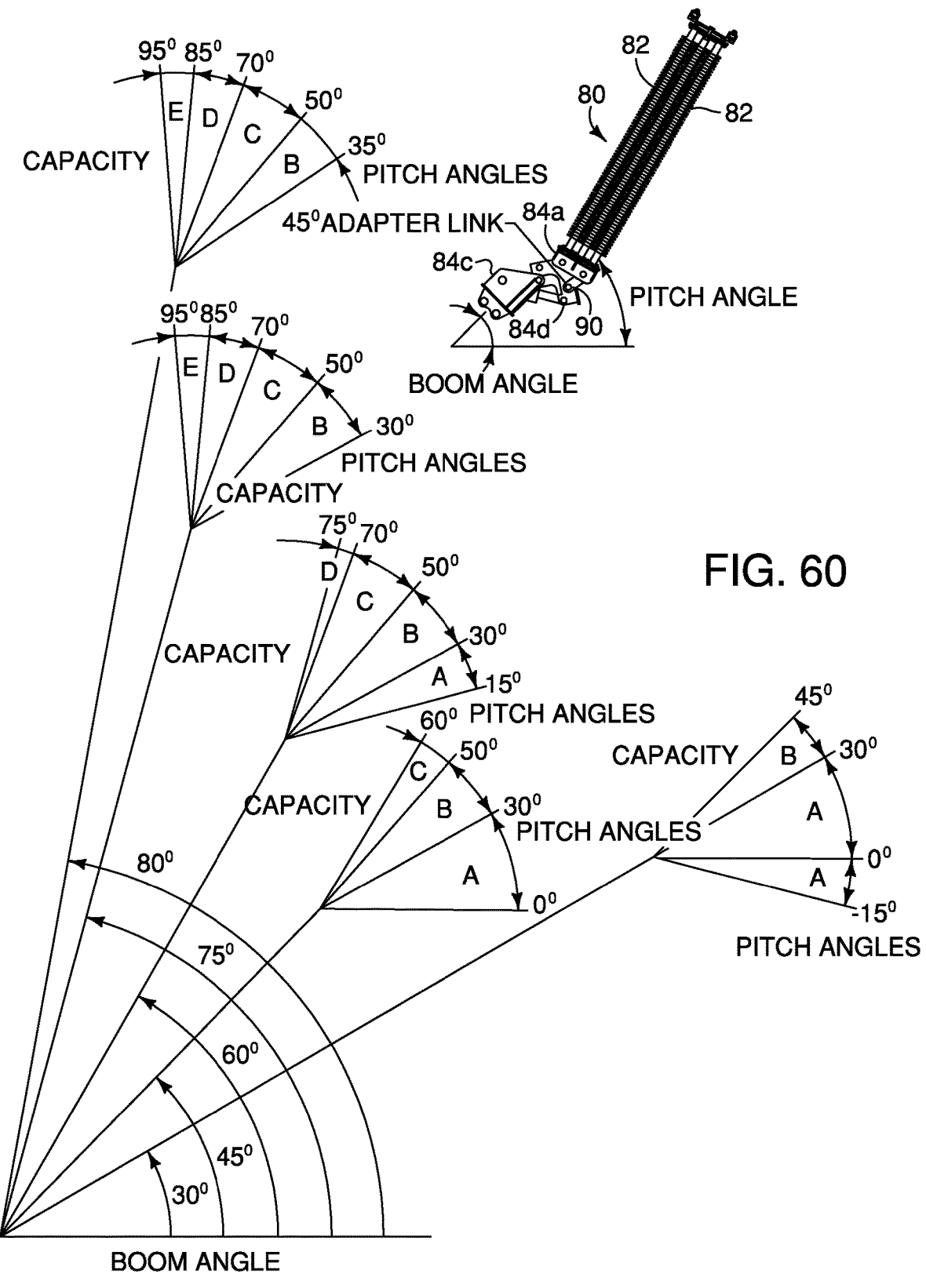

FIG. 60 illustrates the pitch and boom angles for the single point lifter of FIG. 45 using a 45 degree adapter link in the front mount position.

Figure 61:
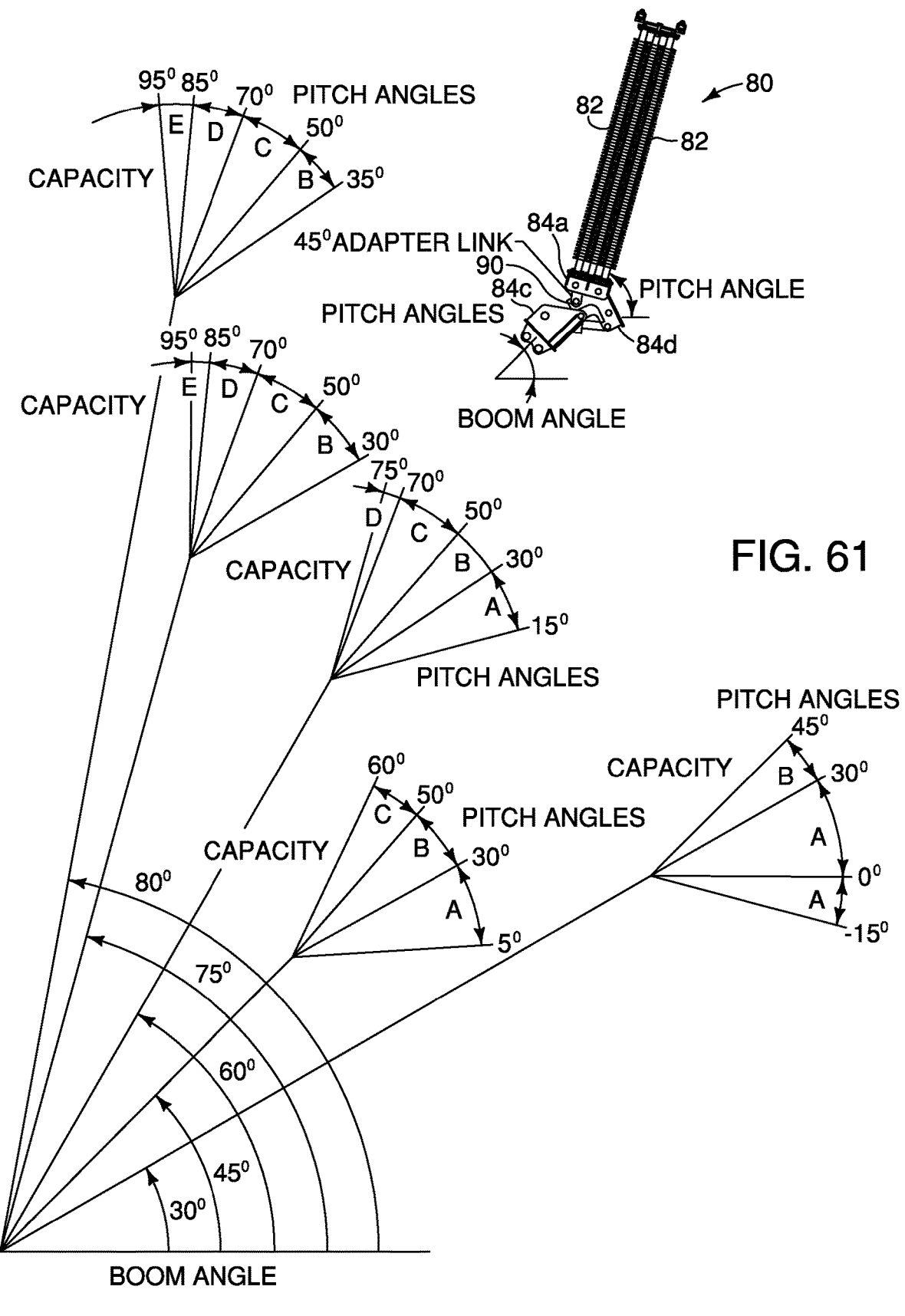

FIG. 61 illustrates the pitch and boom angles for the single point lifter of FIG. 45 using a 45 degree adapter link in the top mount position.

DETAILED DESCRIPTION

Single Point Lifter Comprising Stacked Insulators

In an aspect of the present disclosure, a stacked insulator conductor lifter for simultaneously supporting a plurality of sub-conductors in a sub-conductor bundle, in various orientations including when the elongate insulators are positioned at an angle off the vertical and the weight of the plurality of sub-conductors may be up to 25,000 lbs, will now be described, with reference to FIGS. 29-31. In a preferred embodiment, insulator stack 30 includes a lower or first tier 30a and an upper or second tier 30b. The first tier 30a comprises a plurality of parallel insulators 50 of equal length, arranged so as to extend orthogonally from an insulator adapter base 32a of single point lifter base 32. For example, without intending to be limiting, the plurality of insulators 50 in the first tier 30a may include six insulators. The six insulators 50 may be equally spaced apart, and arranged upon the insulator adapter base 32a in multiple rows. For example, the insulators 50 may be arranged in two rows of three insulators, or in other words, a 2×3 configuration, as shown in FIG. 29.

A transition plate 52 is mounted on the distal ends 50a of the plurality of insulators 50 in the first tier 30a, distal from the single point lifter base 32. Transition plate 52 is fastened to secure a distal end 50*a* of each insulator 50 to the transition plate 52. The second tier 30*b* of the insulator stack 30 adds an additional set of a plurality of parallel insulators 50 to insulator stack 30. For example, without intending to be limiting, the second tier 30*b* may comprise four insulators 50. The four insulators 50 are mounted spaced apart on the upper surface of the transition plate 52, and may be spaced apart by substantially the same distance as exists between the spaced apart insulators 50 on the first tier 30*a* in the insulator stack, arranged for example in a configuration of two rows of two insulators, or in other words, a 2×2 configuration, illustrated in FIG. 29.

The stack 30 thus is formed in a shape approximating a pyramid configuration, where the lower tier 30*a* has a greater number of insulators 50, spread over a greater area, as compared to the upper tier 30*b* of insulators 50. The pyramid configuration advantageously provides a triangle-like bracing for bending loads applied to the apex of the pyramid configuration. An accessory for holding sub conductors or conductors may be mounted on the apex of the insulator stack 30 to support and manipulate heavy loads.

This arrangement of insulators is not limited to six insulators 50 on the bottom tier 30*a* and four insulators 50 on the top tier 30*b*. Other examples of possible configurations include, but are not limited to: four insulators 50 on the bottom tier 30*a* and two insulators 50 on the top tier 30*b*, three insulators 50 on the bottom tier 30*a* and two insulators 50 on the top tier 30*b*, or two insulators 50 on the bottom tier 30*a* and one insulator 50 on the top tier 30*b*. The stacked insulator configuration may also include configurations having the same number of insulators on the upper and lower tiers; for example, there may be four insulators on the upper tier and four insulators on the lower tier. Also, the insulators 50 may be of different lengths or voltage rating on the bottom tier 30*a* as compared to the insulators in the top tier 30*b*, but the insulators 50 would be the same length on a given tier 30*a* or 30*b*, for embodiments where the insulators 50 are parallel to each other on each tier 30*a* and 30*b*.

Other embodiments (not shown) of the single point lifter having stacked insulators may also include elongate insulators in each of the first and second tiers wherein the insulators are not parallel to each other. For example, some embodiments may include two or more insulators on the bottom tier that are angled towards one another, such that the spacing between each insulator at the bottom end of the first tier is greater than the spacing between each insulator at the top end of the tier. Similarly, two or more insulators on the upper tier of the insulator stack may be angled towards each other, such that the spacing between each insulator at the bottom end of the second tier is greater than the spacing between each insulator at the top end of the tier. Advantageously, embodiments having elongate insulators that are angled towards each other in a single tier may also provide a triangle-like bracing for bending loads applied to the apex of the pyramid configuration; and in particular, may provide a truss or truss-like bracing for strength in vertical and bisect loading of an accessory mounted on the apex of the stacked insulators.

In the embodiment of FIG. 29, a three sub-conductor bundle wire holder 10*a*, such as disclosed in Applicant's U.S. Provisional patent application No. 62/989,190 and incorporated herein by reference, is an accessory mounted on the distal end 50*b* of the second tier 30*b* of insulators 50, distal from the transition plate 52. Optionally, the platform 14 may be mounted on a swivel plate 14*c*, thereby allowing for the three sub-conductor bundle wire holder 10*a* to rotate about the axis of rotation C in direction D while mounted on insulation stack 30. Although the illustrations herein show the three sub-conductor bundle holder 10*a* mounted to the distal end of the second tier 30*b*, it will be appreciated that other picking accessories for supporting and manipulating one or more sub-conductors, including but not limited to the rotating head described below or the four sub-conductor bundle wire holder accessory 10*b*, such as disclosed in Applicant's U.S. Provisional patent application No. 62/989, 190, may also be mounted to the distal end 50*a* of insulator stack 30.

As may best be seen in FIG. 30, the single point lifter base 32 includes an insulator adapter base 32*a*, which provides a support for the insulator stack 30. The insulator adapter base 32*a* is pivotally attached to a jib adapter 32*b* at a pivotal coupling 32*c*. A linear actuator 33, which for example may be a hydraulic cylinder, includes a cylinder 33*a* pivotally mounted at 32*e* to the jib adapter 32*b*, and a cylinder rod 33*b* pivotally mounted to the insulator adapter base 32*a* at a pivotal coupling 32*d*, spaced apart from the pivotal coupling 32*c* between the insulator adapter base 32*a* and jib adapter 32*b*. Thus, the angle of the insulator stack 30 may be angled relative to the vertical by extending or retracting the cylinder rod 33*b* of the linear actuator 33.

As an example of insulators that may be utilized in constructing the insulator stack 30, without intending to be limiting, each insulator 50 of the plurality of insulators may comprise an 80 inch (176 cm) polymer insulator rated for a line voltage of substantially 230 kV, thus giving the single point conductor lifter a rating of approximately 500 kV. However, it will be appreciated by a person skilled in the art that other insulators with different specifications (voltage rating and length), and other pluralities of insulators selected for the first and second tiers 30*a*, 30*b* of the stack 30, arranged in different configurations other than the 2×3, 2×2, 3×1 and 2×1 configurations, described above, may also be useful in the manufacture an insulator stack 30 capable of providing the combined tensile and torsion strength (vertical and bisect) required for supporting and manipulating a plurality of sub-conductors of a sub-conductor bundle.

Rotating Head Conductor Wire Lifter Accessory

As viewed in FIGS. 1-19, the rotating head conductor wire lifter accessory 60 allows at least one sub-conductor, for example a pair of sub-conductors 8, to be held in corresponding wire cages 65 to retain their original orientation as the single point lifter is rotated in an arc between, for example, vertical and horizontal positions. Accessory 60 includes a cart or carriage 62 and an arced raceway body 70. The carriage 62 is rotatably mounted to a curved track 72 of the raceway body 70, and is free to move along the track 72 in direction X. The raceway body 70 comprises the curved track 72 mounted on an L-shaped support plate 74. The L-shaped support plate 74 is mounted, on one side of the raceway body 70, to a first lifter mounting plate 75*a*, and the other side of the L-shaped support plate 74 is mounted to a second lifter mounting plate 75*b*. The L-shaped support plate 74 is mounted to each of the first and second lifter mounting plates 75*a*, 75*b* so as to be orthogonal to the respective surfaces of the first and second lifter mounting plates, as best viewed for example in FIG. 13. Each of the first and second lifter mounting plates 75*a*, 75*b* include a plurality of mounting bolt holes 75*c*, which may advantageously be provided in different configurations so as to enable mounting of the rotating head conductor wire lifter accessory 60 to the top of an insulator(s) 50 or 82, or to a support plate having a corresponding configuration of bolt holes. Stop plates 76a, 76b are mounted so as to abut against opposite ends 72a, 72b of the curved track 72 and which serve to limit the movement of the carriage through a travel arc of 90 degrees along the track. The first and second stop plates 76a, 76b are mounted to the first and second ends 74a, 74b of the L-shaped support plate 74, such that the L-shaped support plate 74 is orthogonal to the planar surfaces of the stop plates 76a, 76b as best viewed in FIG. 14.

FIG. 17 illustrates a cross-section of carriage 62 taken along line C-C of FIG. 15. The carriage 62 comprises a swivel plate 63. The swivel plate 63 is rotationally mounted to carriage mount plate 64d of carriage block 64, the mount plate 64d holding together the first and second portions of 64a, 64b of carriage block 64, as viewed in FIG. 16. A swivel wear pad 63a is sandwiched in between the swivel plate 63 and the carriage mounting plate 64d. On an upper surface 63b of the swivel plate 63 there is mounted a pair of spaced apart conductor wire cages 65.

As best viewed in FIG. 16, the carriage block 64 comprises first and second portions 64a, 64b. In some embodiments, the first and second portions 64a, 64b may have a substantially C-shaped cross-section, whereby the upper end 66a of each portion is proximate the swivel plate wear pad 63a, and the lower ends 66b of each portion are positioned proximate to the first or second lifter mounting plates 75a, 75b when the carriage 62 is coupled to the raceway body 70, depending on whether the carriage 62 is near the first or second ends 72a, 72b of track 72. There is a gap G between the lower ends 66b of the first and second portions 64a, 64b of the carriage 62. The gap G is sized so as to receive the flange 74d supporting curved edge 74c of the L-shaped support plate 74 when the carriage 62 is mounted to the raceway body 70.

An interior cavity 64c defined by the first and second portions 64a, 64b of the carriage block 64 is adapted to receive the curved track 72 when the carriage 62 is mounted to the raceway body 70. As best viewed in FIGS. 16-18, a set of bearings is rotatably supported within the interior cavity 64c of the carriage block 64. For example, not intending to be limiting, the bearings may include an upper set of roller bearings 68a and a lower set of roller bearings 68b. The upper and lower sets of roller bearings 68a, 68b are rotatably mounted to the opposed facing interior surfaces of the sidewalls of the first and second portions 64a, 64b of the carriage block. The set of upper roller bearings 68a is mounted so as to be adjacent the upper end 66a of the carriage block portions 64a, 64b, and are configured so as to slidingly engage the upper surface 72c of the track 72. The rollers 68a are arranged in a curved configuration so as to match the curve of track 72. The upper set of roller bearings 68a is configured so as to slidingly engage against the curved outer surface 72c of the curved track 72, facilitated by matching the curvature of the set of the upper roller bearings 68a to the curvature of the track 72. Similarly, a set of lower roller bearings 68b is also provided. The set of lower roller bearings 68b are mounted within the cavity 64c of the carriage block 64, on opposing inner side walls 66c of carriage block portions 64a, 64b, adjacent the lower end 66b of the carriage block so as to rotatably engage the undersurface 72d of the track 72, on either side of the L-shaped support plates 74. As with the upper roller bearings 68a, the set of lower roller bearings are also adapted to remain in rolling contact with the underside 72d of the track 72, by mounting the lower roller bearings 68b within the cavity 64c so as to correspond to the curvature of the underside 72d of the track 72. The edges of track 72 are thus sandwiched between the upper and lower roller bearings 68a, 68b.

Additionally, a further set of tracking side roller bearings 68c are mounted within cavity 64c to the lower interior walls 66d of first and second portions 64a, 64b of the carriage. An axis of rotation J of the tracking side roller bearings 68c is orthogonal to the axes of rotation K and L of the upper and lower roller bearings 68a, 68b, respectively. As best viewed in FIG. 16, tracking roller bearings 68c are mounted so as to slidingly engage opposing sides of flange 72d, thereby maintaining the carriage 62 in alignment on the track 72 as it rolls along the track 72. For example, as viewed in FIGS. 17 and 18, the set of tracking side roller bearings 68c includes two tracking side roller bearings positioned at either end of the set of lower roller bearings 68b, on each of the first and second portions 64a, 64b of the carriage.

FIGS. 1-6 show a pair of sub-conductors 8 held horizontally on the rotating head 60 and mounted on the end of a single point lifter 80, mounted by means of a boom adapter onto the end of a crane or truck boom. FIGS. 7-12 show a pair of subconductors 8 held vertically on the rotating head 60 and mounted on the end of a single point lifter 80. The single point lifter is mounted on the end of a crane or truck boom 24. Crane or truck boom 24 is mounted on truck 26. The rotating head conductor wire holder 60 maintains the conductor bundle in its original orientation (in other words, the sub-conductors are either horizontally spaced apart or vertically spaced apart relative to one another), when rotating the single point lifter 80 from horizontal to vertical or vice-versa.

In use, the rotating head sub-conductor wire holder 60 may be mounted as an accessory onto, for example, the end of a single point lifter, such as the single-point lifter 80 shown in FIGS. 1-12. The single-point lifter 80 may comprise of a plurality of insulators 82. Without intending to be limiting, the insulators 82 may include station class polymer insulators having a length of 122 inches (268 cm) and line voltage rating of 345 kV. However, it will be appreciated by person skilled in the art that other suitable insulators, selected for the line voltage rating and conductor or conductor bundle weight, may be selected for the single-point lifter when picking and manipulating a sub-conductor bundle.

The single-point lifter 80 further includes a single point lifter base 84, the single point lifter base including an boom adapter jib 84c to which the single point lifter is connected to the supporting crane or truck boom, a lifter base adapter 84d which allows the lifter insulator adapter base 84a to which the plurality of insulators 82 are mounted to be mounted on the top for vertical insulators or the front for horizontal insulators. For example, as shown in FIG. 33, the insulator adapter base 84a supports the four elongate insulators 82. Insulators 82 are spaced evenly apart from each other and adjacent to the outer perimeter edge 84b of the lifter insulator adapter base 84a. The single point lifter base 84 further includes a boom adapter jib 84c and a rotating body including a lifter base adapter 84d. A linear actuator selectively rotates the lifter base adapter 84d relative to boom adapter jib 84c about pivotal coupling 84g. The linear actuator includes a hydraulic cylinder 84e and the cylinder rod 84f. A distal end of the hydraulic cylinder 84e is pivotally mounted to the boom adapter jib 84c, and the distal end of the cylinder rod 84f, distal from the hydraulic cylinder 84e, is pivotally mounted to a lower end of the lifter base adapter 84d. The lifter base adapter 84d is coupled to, and extends beneath, the insulator adapter base 84a to which the insulators 82 are mounted. Insulator adapter base 84a is mounted onto lifter base adapter 84d in such a way so that the insulator adapter base 84a may be tilted relative to lifter base adapter 84d as shown for example in FIG. 6. For example, a pair of spaced apart bolts or pins 84i (see FIGS. 32 and 34) may be used. Single point lifter base 84 may also be used to support stacked insulators 30.

As shown in FIGS. 34 and 35, some embodiments of the single point lifter 80 may include an auxiliary lug 81a mounted to an insulator top plate 81. The auxiliary lug may optionally be used for the suspension of a conductor or sub-conductors using a vertical hanging traveller or travellers (not shown) mounted to the lug 81a. In some embodiments, the maximum capacity of a conductor or sub-conductors supported in a traveller or travellers on the lug 81a may be a lower capacity than the vertical loading capacity of the single point lifter, as a result of supporting the conductor load laterally of a central axis of the elongate single point lifter; for example, a maximum capacity of 3,200 lbs when supporting the conductor in the vertically hanging traveller mounted to lug 81a, as compared to a maximum capacity of 10,000 lbs when supporting a pair of conductors in the pair of wire cages 65. It will be appreciated by a person of skill that the maximum load capacities described herein are intended as illustrative examples only, and are not intended to be limiting, and that the maximum load capacities will depend on the specifications of a given single point lifter constructed in accordance with the present disclosure.

Also shown in FIGS. 34, 35 and 49 is an insulator clamp plate 83, used to secure the plurality of insulators 82 to the insulator adapter base 84a. It will be appreciated that other methods for mounting the insulators 82 to the insulator adapter base 84a, as are known to a person skilled in the art, may be utilized, such as directly mounting insulators 82 to the insulator adapter base 84a using bolts or other fasteners, such as shown in other figures of the present disclosure; for example, see FIG. 32.

The geometric arrangement of the pivotal coupling between the linear actuator 84e, 84f and the boom adapter jib 84c and the rotating lifter base adapter 84d provides for greater flexibility in the range of movement for rotating the position of the insulators 82 relative to the single point lifter base 84. For example, as may be shown in FIG. 34 to 44, the range of motion of the insulators, from completely vertical as shown for example in FIGS. 34 and 36, to completely horizontal, such as shown in FIGS. 40, 42 and 44, are possible, regardless of where the insulator adapter base 84a of the boom adapter jib 84c is positioned, relative to the ground. In part, the flexibility of the range of motion through which the insulators of the single point lifter may be rotated is facilitated by providing two mounting positions for mounting the insulators 82 to the single point lifter base 84; namely, the top mount position 88a, utilizing bolt holes 88c, 88d for mounting the insulator adapter base 84a to the top mount position 88a of lifter base adapter 84d; and the front mount position 88b, utilizing bold holes 88d, 88e for mounting the insulator adapter base 84a to the front mount position 88b of lifter base adapter 84d. Examples of the range of motion, with the insulators 82 mounted to the single point lifter base 84 in the top mount position 88a are illustrated in FIGS. 34-39, while examples of the range of motion achieved with the insulators 82 mounted to the single point lifter base 84 at the front mount position 88b are illustrated in FIGS. 40-44. As the single point lifter 80 is rotated, the conductors held in the wire cages on the rotating head conductor wire holder cart maintain their original orientation by the translation of the cart around the track.

In the embodiment of FIG. 49, the single point lifter base 84, which as before is for mounting on the distal end of a crane or truck boom and for supporting on the single point lifter base at least one tier of substantially parallel electrical insulators 82, includes:

a boom adapter jib 84c adapted to mount onto the distal end of the crane or truck boom, a lifter base adapter 84d pivotally mounted to the boom adapter jib 84c for rotation of the lifter base adapter relative to the jib in the plane of rotation of the insulators 82, a insulator adapter base 84a pivotally mounted to the lifter base adapter 84d and adapted for mounting of the insulators onto the lifter base, a selectively actuable actuator 84e, 84f cooperating between the boom adapter jib 84c and the lifter base adapter 84d, and an adapter link 90 mountable between the lifter base adapter 84d and the insulator adapter base 84a so as to selectively tilt the insulator adapter base 45 degrees relative to the lifter base adapter.

The insulators are adapted to support an accessory such as the two, three or four sub-conductor bundle holders or rotating head conductor wire lifter head on the distal end of the insulators distal from the single point lifter base.

FIG. 49 illustrates the use of an adapter link 90 in the mounting of insulators 82, to lifter base adapter 84d in single point lifter 80. Adapter link 90, seen for example in FIG. 51, includes a parallel pair of linkage members 90a, held spaced apart by a cross-brace 90b. Adapter link 90 is also shown in detail in the front and side elevation views of FIGS. 52 and 53. Adapter link 90 assists in varying the orientation of the range of pitch angles of the insulators as they are articulated about their axis rotation. The insulators rotate in pitch as the lifter base adapter 84d, rotates relative to boom adapter jib 84c upon actuation of actuator 84e, 84f.

The various orientations of the insulator pitch angle range of motion envelope are illustrated in FIGS. 54-57. In FIGS. 54 and 55, the adapter link 90 is absent so that the insulators 82, on their insulator adapter base 84a, are mounted with their base ends flush onto lifter base adapter 84d. FIG. 54 shows insulator adapter base 84a mounted onto the front face 91b of the lifter base adapter 84d, referred to in respect of FIG. 40 as the front mount position 88b. FIG. 56 shows insulator adapter base 84a mounted onto the top face 91a of the lifter base adapter 84d, referred to in respect of FIG. 34 as the top mount position 88a.

In FIG. 56 adapter link 90 is mounted between the lower mounting points on the top face 91a of the lifter base adapter 84d and insulator adapter base 84a so as to tilt insulator adapter base 84a 45 degrees and insulators 82 downwardly or closer to horizontal. In the illustrated example, adapter link 90 is sized by way of example so as to tilt insulator adapter base 84a up by 45 degrees relative to lifter base adapter 84d. Tilt angles other than 45 degrees would also work.

In FIG. 57, adapter link 90 is mounted between the top face 91a of lifter base adapter 84d and insulator adapter base 84a, in between the corresponding mounting points closest to boom adapter jib 84c. In this position, adapter link 90 tilts the insulators 82 away from vertical. Again, in the illustrated example, which is not intended to be limiting, the adapter link 90 is a 45 degree link as it is tilts insulator adapter base 84a by 45 degrees relative to the top face 91a of lifter base adapter 84d.

Due to the constraints of actuator 84e, 84f and the geometry of boom adapter jib 84c and lifter base adapter 84*d*, applicant has found that, advantageously, the loading capacity and range of motion of the single point lifter 80 is increased by use of, for example, a 45 degree adapter link 90. In particular, adapter link 90 sets the position of the insulators 82 relative to boom adapter jib 84*c* so that the insulators 82 may be rotated to, and inserted when, substantially horizontal into adjacent conductor phases or a sub-conductor bundle to pick, horizontally, one or more of the conductors or sub-conductors. Then, once picked, the conductor or sub-conductors may be removed horizontally and rotated to the vertical to provide working clearance for lineman to the picked conductor or sub-conductors. As can be seen by a comparison to the available ranges of motion in FIGS. 58 and 60, wherein FIG. 58 illustrates the available ranges of motion and loading capacities when the single point lifter 80 is mounted to the front face 91*b* of lifter base adapter 84*d* without link 90 (in FIG. 58) as compared to when the single point lifter 80 is mounted to the front face 91*b* with the 45 degree link 90 (in FIG. 60). Without the use of adapter link 90, horizontal picking followed by rotation to the vertical cannot be accomplished using the illustrated example of single point lifter 80. Furthermore, the vertical loading capacity and bisect capacity are both increased when link 90 is used, as shown for example in FIG. 60 as compared to FIG. 58.

Double Roller Wire Cage

Conductor holders, interchangeably referred to herein as "wire cages" or "cages," are known in the prior art to use a single roller within each cage, and to have a hinged cover or gate to close over a conductor when supported on the roller. Conductors may often be heavy; for example those spanning great distances and sized for carrying high voltage. These conductors may also be live, carrying their high voltage during, for example, a reconductoring project. It has been found that as the conductor weight load increases due to greater spans, or larger conductors to carry increasingly large currents, and because the conductor usually has an outer layer of strands of aluminium, that the pressure concentration caused by supporting the conductor on a prior art single roller wire cage may deform the aluminium strands, thereby damaging the conductor. It is consequently advantageous to distribute the weight load of the conductor over two rollers instead of a single roller per wire cage, so as to reduce by half the downward pressure applied to each roller by the heavy conductor at each point of support where the conductor is supported on the rollers. The result is to reduce or eliminate deformation damage to the outer aluminium strands of the conductor when the conductor is supported in the wire cage.

Another challenge faced by linemen while working with live conductors, and in particular while capturing a live conductor in a conductor holder, is in using a hotstick to close and secure the cover on the conductor wire cage in order to retain and secure the conductor within the conductor wire cage while supported in the conductor wire cage. It is consequently another object of the present disclosure to provide simplicity of manipulation for securing a latching cover over a double or single roller wire cage.

Thus as seen in FIGS. 20-23, an improved conductor wire cage 36 is provided having two side by side rollers 38 mounted in line within the channel 40*a* of channel block 40. A wire cage gate 42 (interchangeably referred to herein as a "cover", "door" or "closure"), is mounted to one wall 40*d* of channel block 40 by means of a hinge 42*a* so that the gate 42 may be selectively rotated in direction H about hinge 42*a* so as to engage the locking tab 42*b* of gate 42 within notch 40*b* in the opposite wall 40*e* of channel block 40.

In the illustrated embodiment of FIGS. 20-23, locking tab 42*b* is releasably retained within notch 40*b* by means of a movable pin 44 which is slidably mounted in bores 40*c* in the notched wall 40*e*, so that pin 44 may be selectively removed from bores 40*c* and notch 40*b* to thereby allow locking tab 42*b* to be inserted into the notch 40*b* so as to close the wire cage, or removed from the notch so as to open the wire cage. Locking tab 42*b* has a corresponding bore therethrough 42*c*, which aligns with bores 40*c* when the locking tab 42*b* is seated within notch 40*b*. With notch 40*b* receiving locking tab 42*b*, pin 44 is slid through the aligned bores 40*c* and 42*c* so as to retain gate 42 in its locked position over rollers 38.

Pin 44 may include a locking key protrusion 44*a* protruding from one end of the pin, and the bores 40*c* and 42*c* may be formed as a keyway 42*e*, 40*f* so that when pin 44 is journaled through bores 40*c* and 42*c*, so that the end 44*b* of the pin 44 is protruding from one end of block 40, opposite from the eye or loop in handle 44*c* of pin 44, the key protrusion 44*a* may be rotated out of alignment with the keyway so as to retain the pin in its locking position, thereby locking tab 42*b* into notch 40*b*. As seen in FIG. 21, the gate 42 is in its open position so as to receive a conductor down onto rollers 38. In FIG. 22 the gate 42 is in its closed position, but not yet locked, as it would be when a conductor was held on the rollers 38 and the gate 42 initially closed over the conductors. In FIG. 23, a hotstick (not shown) has been used to grasp the eye in handle 44*c* to slide pin 44 through bores 40*c* and 42*c* so as to lock the locking tab 42*b* into notch 40*b*. The pin 44 is thereafter locked into place by using the hotstick to rotate the handle 44*c* in direction H, rotating the key protrusion 44*a* out of alignment with the keyway 40*f*, 42*e* through bores 40*c* and 42*c*, respectively, thereby preventing pin 44 from being removed inadvertently.

In another embodiment of the double roller wire cage 36, illustrated in FIGS. 24-28, a latch locking mechanism is employed which differs from the latch lock of the embodiment shown in FIGS. 20-23. In particular, instead of using a pin journaled through aligned bores in the housing and cover, and that embodiment's inherent reliance on the shearing strength of the pin to restrain forces of the conductor pushing against the closed gate, in the embodiment illustrated in FIGS. 24-28 there is a latch hook pivotally mounted on the cover that releasably engages, so as to hook and lock over, a fixed, wall-mounted shaft mounted in the wall on the second side of the housing, opposite the first or hinge side of the housing.

Thus as seen in FIG. 24, the hinged cover, gate or door 42 is mounted to a first side 40*d* of the roller housing 40 by a robust hinge 42*a* for pivoting of the hinged cover 42 laterally relative to the axis A of the conductor on the rollers, from the open position of FIG. 24, to the closed position of FIGS. 27 and 28. The opening and closing of the hinged cover 42 is controlled by a hotstick grasping a first eye 43*a* mounted on the top of the cover 42. With the hotstick attached to the first eye 43*a*, the cover can be swung between the open and closed positions in a controlled manner. When closing the hinged cover 42, the lineman pulls on the hotstick to thereby pull on the first eye 43*a* to urge the cover into a pre-locked position with the latch arm hook 45*c* resting on a shaft 45*a* mounted in the housing wall 40*e*. The hotstick may then be used to grasp the second eye 43*b* mounted on the latch arm 45*b* and the hotstick pulled so as to open the latch 45 while lowering the latch arm hook 45*c* over the shaft 45*a*, thereby bringing the cover 42 into a closed position. The cover 42 is locked into the closed position once the pulling on the second eye 43*b* is released, allowing the hook 45*c* on the latch arm 45*b* to seat over the shaft 45*a*. The latch arm 45*b* is spring loaded so as to urge the hook 45*c* over the shaft 45*a* when the pulling on the second eye 43*b* is released.

To unlock and open the wire cage 36, the second eye 43*b* mounted on the latch arm is used by the lineman, using a hotstick, to unlock the latch arm 45*b* from the shaft 45*a*. In particular, with the hotstick grasping the second eye 43*b*, the lineman pulls the second eye 43*b* outwardly away from the wall of the housing to release the hook end 45*c* of the latch arm 45*b* from the wall mounted shaft 45*a*. Pulling on the second eye 43*b* pivots the latch arm outwardly in direction Y by rotation of the latch arm about, or on, it's correspond mounting shaft, against the return biasing force of the helical springs 45*e* mounted on the mounting shaft 45*d*, as better seen in FIG. 25. The cover 42 may then be lifted open using the first eye 43*a*.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

The invention claimed is:

1. An electrically insulated lifting support adapted for mounting to a distal end of a crane or a truck boom for providing electrical isolation during energized maintenance at a transmission voltage of an overhead transmission voltage conductor or a transmission voltage sub-conductor bundle, the support comprising:

an insulator stack comprising:

a first tier of elongate insulators, wherein the first tier comprises a first set of elongate insulators, the first set having a boom end mounted to a single point lifter base and a tier end mounted to a second tier of elongate insulators; and the second tier of elongate insulators, wherein the second tier comprises a second set of elongate insulators, the second set having a tier end mounted to the first tier and a distal end adapted to be mounted to an accessory for supporting the overhead transmission voltage conductor or the transmission voltage sub-conductor bundle, wherein the insulator stack has a pyramidal configuration having an apex at the distal end of the second tier, wherein the first tier forms a base of the pyramidal configuration by including a greater number of insulators compared to the second tier to thereby provide a triangular bracing for bending loads applied to the apex of the pyramidal configuration, wherein the single point lifter base includes a pivotal coupling for selective tilting of the insulator stack from vertical so as to enable an angular range of motion of the insulator stack for picking and removal to a temporary location of the overhead transmission voltage conductor or transmission voltage sub-conductors in the transmission voltage sub-conductor bundle without disturbing adjacent other overhead transmission voltage conductors or other transmission voltage sub-conductors in the transmission voltage sub-conductor bundle, respectively, and wherein, in a use position of the support when the single point lifter base is mounted to the distal end of the crane or the truck boom:

the insulator stack mounted to the single point lifter base extends upwardly from the single point lifter base, wherein the first tier is located below the second tier and tilts on the single point lifter base, and the accessory, when mounted to the distal end of the second tier of elongate insulators, is electrically isolated from the crane or the truck boom.

2. The support of claim 1, wherein each set of insulators of the first and second sets is arranged in a matrix, each matrix comprising at least two rows and two columns.

3. The support of claim 2, wherein the matrix of the first set of insulators comprises two rows and three columns, and the matrix of the second set of insulators comprises two rows and two columns.

4. The support of claim 1, wherein the second tier is centered on the first tier.

5. The support of claim 1, wherein the insulators in the first tier are parallel and spaced apart from each other by a first predetermined spacing, and wherein the insulators in the second tier are parallel and spaced apart from each other by a second predetermined spacing.

6. The support of claim 5, wherein the first predetermined spacing is equal to the second predetermined spacing.

7. The support of claim 5, wherein the insulators in the first tier and second tier are of equal length.

8. The support of claim 1, wherein the insulator stack further comprises a transition plate mounted to the tier end of the first tier of elongate electrical insulators and to the tier end of the second tier of elongate electrical insulators.

9. The support of claim 1, wherein the insulator stack further comprises a swivel plate mounted to the distal end of the second tier of elongate electrical insulators, wherein the swivel plate is configured to permit the accessory to rotate.

10. The support of claim 1, wherein the insulators in the first tier and second tier are of differing lengths.

11. A method of electrically isolating an overhead conductor or a sub-conductor bundle from a distal end of a crane or a truck boom during energized maintenance of the overhead conductor or the sub-conductor bundle, the method comprising:

providing a support adapted for mounting to a distal end of the crane or the truck boom, the support comprising:

an insulator stack comprising:

a first tier of elongate insulators, wherein the first tier comprises a first set of elongate insulators, the first set having a boom end mounted to a single point lifter base and a tier end mounted to a second tier of elongate insulators; and the second tier of elongate insulators, wherein the second tier comprises a second set of elongate insulators, the second set having a tier end mounted to the first tier and a distal end adapted to be mounted to an accessory for supporting the overhead conductor or the sub-conductor bundle, wherein the insulator stack has a pyramidal configuration having an apex at the distal end of the second tier, wherein the first tier forms a base of the pyramidal configuration by including a greater number of insulators compared to the second tier to thereby provide a triangular bracing for bending loads applied to the apex of the pyramidal configuration, wherein the single point lifter base includes a pivotal coupling for selective tilting of the insulator stack from vertical so as to enable an angular range of motion of the insulator stack for picking and removal to a temporary location of the overhead conductor or sub-conductors in the sub-conductor bundle without disturbing adjacent other overhead conductors or other sub-conductors in the sub-conductor bundle, respectively, and wherein, in a use position of the support when the single point lifter base is mounted to the distal end of the crane or the truck boom:

the insulator stack mounted to the single point lifter base extends upwardly from the single point lifter base, wherein the first tier is located below the second tier and tilts on the single point lifter base, and the accessory, when mounted to the distal end of the second tier of elongate insulators, is electrically isolated from the crane or the truck boom;

mounting the accessory to the distal end of the second tier of elongate insulators;

mounting the single point lifter base to the distal end of the crane or the truck boom; and manipulating the crane or the truck boom to locate the accessory adjacent the overhead conductor or sub-conductor bundle while isolating the accessory from the distal end of the crane or the truck boom via the insulator stack.

12. The method of claim 11, wherein the step of providing the support further comprises centering the second tier on the first tier.

13. The method of claim 11, wherein the step of providing the support further comprises:

arranging the insulators in the first tier so as to be parallel and spaced apart from each other by a first predetermined spacing; and arranging the insulators in the second tier so as to be parallel and spaced apart from each other by a second predetermined spacing.

14. The method of claim 13, wherein the first predetermined spacing is equal to the second predetermined spacing.

15. The method of claim 11, wherein the step of providing the support further comprises arranging the insulators in the first and second tiers of elongate insulators in a matrix, each matrix comprising at least two rows and two columns.

16. The method of claim 15, further comprising:

arranging the first tier of insulators in two rows and three columns; and arranging the second tier of insulators in two rows and two columns.

17. The method of claim 11, wherein the insulator stack further comprises a transition plate mounted to the tier end of the first tier of elongate electrical insulators and to the tier end of the second tier of elongate electrical insulators.

18. The method of claim 11, wherein the insulator stack further comprises a swivel plate mounted to the distal end of the second tier of elongate electrical insulators, wherein the swivel plate is configured to permit the accessory to rotate.

19. The method of claim 11, wherein the insulators in the first tier and second tier are of differing lengths.

\* \* \* \* \*